(12) United States Patent
Ratcliffe et al.

(10) Patent No.: US 12,456,189 B2
(45) Date of Patent: Oct. 28, 2025

(54) COMPOSITION-GUIDED POST PROCESSING FOR X-RAY IMAGES

(71) Applicant: IBEX INNOVATIONS LTD, Stockton-on-Tees (GB)

(72) Inventors: Adam Ratcliffe, Stockton-on-Tees (GB); Richard Mcwilliam, Stockton-on-Tees (GB); Chris Egan, Stockton-on-Tees (GB)

(73) Assignee: IBEX INNOVATIONS LTD, Stockton-on-Tees (GB)

( * ) Notice: Subject to any disclaimer, the term of this patent is extended or adjusted under 35 U.S.C. 154(b) by 707 days.

(21) Appl. No.: 17/782,863

(22) PCT Filed: Dec. 4, 2020

(86) PCT No.: PCT/GB2020/053133
§ 371 (c)(1),
(2) Date: Jun. 6, 2022

(87) PCT Pub. No.: WO2021/111152
PCT Pub. Date: Jun. 10, 2021

(65) Prior Publication Data
US 2023/0007835 A1    Jan. 12, 2023

(30) Foreign Application Priority Data

Dec. 6, 2019 (GB) ...................................... 1917920
May 22, 2020 (GB) ...................................... 2007725

(51) Int. Cl.
G06T 7/00 (2017.01)
G06T 5/50 (2006.01)

(52) U.S. Cl.
CPC .............. *G06T 7/0012* (2013.01); *G06T 5/50* (2013.01); *G06T 2207/10116* (2013.01); *G06T 2207/20221* (2013.01)

(58) Field of Classification Search
CPC ..................... G06T 7/0012; G06T 5/50; G06T 2207/10116; G06T 2207/20221
See application file for complete search history.

(56) References Cited

U.S. PATENT DOCUMENTS

2016/0086328 A1* 3/2016 Enomoto ................ G06T 11/60
                                                              382/132
2017/0238894 A1* 8/2017 Scott ..................... G06T 7/0012

FOREIGN PATENT DOCUMENTS

| CN | 105488765 A1 | 4/2016 |
| EP | 2567659 A1 | 3/2013 |
| WO | 2016/051212 A1 | 4/2016 |

OTHER PUBLICATIONS

International Searching Authority. International Search Report and Written Opinion, issued in PCT Application No. PCT/GB2020/053133 on Feb. 19, 2021. 16 pages.

(Continued)

*Primary Examiner* — Casey L Kretzer
(74) *Attorney, Agent, or Firm* — Meunier Carlin & Curfman LLC

(57) ABSTRACT

A method of enhancing an x-ray image is disclosed. The method involves obtaining an input image based on a source x-ray image of an object. Compositional information representing physical characteristics of the object is also obtained. An image enhancement process is applied to the input image to generate a processed image. Application of the image enhancement process is controlled by one or more parameters determined in dependence on the compositional information. An output image is then provided based on the processed image.

19 Claims, 21 Drawing Sheets

(56) References Cited

OTHER PUBLICATIONS

UK Intellectual Property Office. Combined Search and Examination Report, issued in GB Application No. 1917920.9 on May 19, 2020. 5 pages.

UK Intellectual Property Office. Search Report, issued in GB Application No. 2007725.1 on Oct. 22, 2020, 4 pages.

Burt, P. and Adelson, E., 1983, "The Laplacian pyramid as a compact image code", IEEE Transactions on communications, 31(4), pp. 532-540.

Cribari-Neto, Francisco, and Achim Zeileis. "Beta regression in R." Journal of statistical software 34 (2010): 1-24.

Schlick, Christophe. "Fast alternatives to Perlin's bias and gain functions." Graphics Gems IV 4 (1994): 401-403.

Stahl, M., Aach, T., Buzug, T.M., Dippel, S. and Neitzel, U., 1999, "Noise-resistant weak-structure enhancement for digital radiography", Medical Imaging 1999: Image Processing, 3661, pp. 1406-1417.

Vital, Daniel Aparecido, Barbara Teixeira Sais, and Matheus Cardoso Moraes. "Robust pulmonary segmentation for chest radiography, combining enhancement, adaptive morphology and innovative active contours." Research on Biomedical Engineering 34 (2018): 234-245.

\* cited by examiner

Simulator          Real World X-ray Image

COMPOSITION-GUIDED POST PROCESSING FOR X-RAY IMAGES

CROSS-REFERENCE TO RELATED APPLICATIONS

This application is a national stage application filed under 35 U.S.C. § 371 of PCT application No. PCT/GB2020/053133, filed Dec. 4, 2020, which claims priority to GB application Nos. 1917920.9 and 2007725.1, filed Dec. 6, 2019 and May 22, 2020, respectively.

BACKGROUND

The present invention relates to systems and methods for enhancing x-ray images.

SUMMARY

X-ray images are commonly used for medical diagnostics. To improve the usefulness of images and the quality of diagnostics, it is generally desirable to reduce imaging artefacts and noise (e.g. due to scatter) in the images. Nevertheless, even with high-quality images, the nature of x-ray images means that details such as fine structures and differences in tissue types can be hard to discern from an image. Image manipulations such as contrast enhancements can somewhat improve the situation, but such approaches have limitations since the x-ray image is fundamentally a two-dimensional projection of the object being imaged and retains no information on the object's three-dimensional structure. This can make accurate interpretation and hence diagnosis more difficult.

Embodiments of the invention seek to ameliorate these problems and provide new approaches to the enhancement of x-ray images.

Accordingly, in a first aspect of the invention, there is provided a method of enhancing an x-ray image, comprising:
  obtaining an input image, wherein the input image is based on a source x-ray image of an object;
  obtaining compositional information representing physical characteristics of the object;
  applying an image enhancement process to the input image to generate a processed image, wherein application of the image enhancement process is controlled by one or more parameters determined in dependence on the compositional information; and
  providing an output image based on the processed image.

The input image may be the source x-ray image or may be derived from the source x-ray image via one or more pre-processing steps. Similarly the output image may simply be the processed image, or one or more post-processing steps may be applied to the processed image to generate the output image.

The compositional information may, for example, specify characteristics pertaining to shape and/or size of the object (e.g. thickness which may be defined as physical extent in the x-ray beam direction/direction orthogonal to the image plane), and/or pertaining to internal structure, material content and/or material composition, as discussed in more detail below.

The image enhancement process preferably comprises processing the input image using one or more image enhancement operations, wherein one or more or each of said operations are controlled in dependence on the compositional information. For example, this may entail determining one or more parameter values for control parameters determining how an operation is performed or applied. Control parameters may e.g. include weight value(s) for weighting application of an operation (e.g. a filter), blend coefficients, filter coefficients etc. Control parameters may be in the form of values in a lookup table (LUT), e.g. for mapping input intensity/pixel values to output intensity/pixel values. Control parameters may be computed directly from compositional data or be selected from preconfigured parameter sets based on the compositional data (e.g. selecting from different predefined filter kernels or LUTs depending on values of compositional data).

In an embodiment, the image enhancement process may comprise a (preferably linear) blending operation, the one or more parameters preferably comprising blending coefficients. The blending operation may comprise computing pixel values for the processed image based on pixel values of first and second images derived from the input image and based on a set of blending coefficients, wherein the blending coefficients are determined in dependence on the compositional information. The blending coefficients may be in the form of a matrix of blending coefficients, e.g. at the image resolution (with an individual coefficient per pixel), or at a different (e.g. lower) resolution. The first or second image derived from the input image may be the input image itself. More generally, references to a given image being "derived" from or "based on" another image (or similar) shall be understood to encompass the given image being the same as that other image.

In a further aspect of the invention, there is provided a method of enhancing a source x-ray image, comprising.
  obtaining first and second input images, wherein the first and second input images are based on a source x-ray image of an object;
  obtaining compositional information representing physical characteristics of the object;
  determining one or more blending coefficients in dependence on the compositional information; and
  performing a blending operation to generate a processed (blended) image, the blending operation comprising computing pixel values for the processed image based on pixel values of the first and second input images and based on the blending coefficients.

The following features may be applied to any of the above aspects of the invention.

Blending coefficients are preferably numerical values specifying a relative contribution of pixel values from the first and/or second image to the blended image.

The term "pixel values" as used herein may comprise values indicative of colour and/or intensity, e.g. colour component values (e.g. red/green/blue values for RGB colour), luma/chroma component values, hue/saturation/brightness values, intensity values etc. In typical examples described herein, source images are X-ray images and hence monochrome, in which case each pixel is typically represented by a single intensity value. However, described methods can be applied to other contexts using other pixel representations, including colour.

Preferably, at least one of the first and second images is derived from the source image using an image enhancement process, optionally wherein the other of the first and second images is the source image; or wherein the first and second images are processed images derived from the source image using respective different image enhancement processes.

The method may comprise determining respective blending coefficients used at each of a plurality of image locations in dependence on compositional information specified for the respective image locations. Performing the blending operation preferably comprises: computing, for each of a plurality of output pixels (in the blended image), a pixel value based on the corresponding pixel values of the first and second images (where "corresponding pixels" are those at the same pixel locations) and based on a blending coefficient determined for the respective output pixel using composition information corresponding to the location of the output pixel.

In some embodiments, application of the image enhancement process may be controlled variably across the image in dependence on the compositional information.

In a further aspect of the invention, there is provided a method of enhancing an x-ray image, comprising.
  obtaining an input image, wherein the input image is based on a source x-ray image of an object;
  obtaining compositional information representing physical characteristics of the object; and
  applying an image enhancement process to the input image to generate a processed image, wherein application of the image enhancement process is controlled variably across the image in dependence on the compositional information; and
  providing an output image based on the processed image.

The following features may be applied to any of the above aspects of the invention.

Controlling the image enhancement variably across the image preferably encompasses controlling the image enhancement operation in accordance with one or more parameters; such that the parameters used to control the operation vary across the image. The variation of the parameters itself is preferably a result of variation of compositional information across the image plane. Thus the same underlying operation may be applied differently at different locations depending on the locally determined control parameter(s).

The compositional information is thus preferably also defined to be location-dependent. In particular, the compositional information may comprise respective compositional data defined for multiple respective image locations of the input image, and/or wherein application of the image enhancement process is controlled at each of a plurality of image locations using compositional data specified for the respective location, optionally wherein the image enhancement process is applied at each pixel location based on compositional data defined for the pixel location.

Compositional data could be defined at the image resolution, e.g. one or more compositional data values defined per pixel, or at some other (possibly lower) resolution, e.g. with one or more compositional data values defined per image region.

The image enhancement process may comprise a filter operation, wherein application of the filter is controlled in dependence on the compositional information. The image enhancement process may comprises one or more of: a denoise filter, optionally wherein application of the denoise filter is locally varied in dependence on scatter data; a gain correction; a contrast enhancement operation, a scatter removal operation; a sharpening operation; a gradation operation; a linear blending operation, where blend coefficients are preferably determined according to local composition information; and application of a convolution kernel where the kernel is weighted according to local composition information. Any such operation may be applied in a locally variable fashion based on locally varying compositional information as previously described.

The one or more parameters may comprise one or more weights for controlling an enhancement operation. In particular, the method may comprise determining one or more weighting coefficients based on the compositional data, and controlling an image enhancement operation based on the weighting coefficient(s), the weighting coefficient(s) preferably used to modify (e.g. amplify and/or attenuate) the effect of the enhancement operation, optionally using respective weighting coefficients determined for each of a plurality of image locations (e.g. per pixel) to control the image enhancement operation at the respective location.

The one or more parameters may alternatively or additionally comprise a mapping, optionally a lookup table, which maps input pixel values to output pixel values, the image enhancement process comprising determining pixel values for the processed image using the mapping, the mapping selected or determined based on the compositional information.

The image enhancement process may further be performed in dependence on segmentation information defining a segmentation of the input image into image regions, the image regions corresponding to pixels representing different image content types, preferably including one or more of: collimator pixels, open beam pixels, and object pixels, wherein the content types for object pixels optionally correspond to a plurality of material types for the imaged object, optionally at least soft tissue pixels and bone pixels.

The compositional information may comprise a set, preferably a two-dimensional array, of compositional data specifying respective physical characteristics of different parts of the object corresponding to respective different locations of the image plane. A part of the object may correspond to a location of the image plane in the sense of a projection into the image plane from the object; e.g. the x-ray direct beam passing through a given part of the object reaching a given location on a detector corresponding to a given location (e.g. pixel coordinates) in the image plane.

The compositional information may comprise one or more compositional data values for each of a plurality of pixels or groups of pixels of the input image. As such, compositional data may form one or more "images", but with compositional data instead of colour/intensity data (e.g. thickness and alloy images as described in more detail later).

Preferably, the compositional information comprises one or more of:
  a material thickness data set comprising thickness values specifying respective thicknesses of parts of the object corresponding to respective locations of the image plane;
  a material composition data set comprising composition values specifying respective material compositions of parts of the object corresponding to respective locations of the image plane, each composition value optionally specifying a proportion or fraction of a given material type with respect to a total material quantity or volume or with respect to another material type; and
  a scatter data set comprising scatter values specifying respective scatter contributions to the source image at respective locations of the image plane.

Instead of overall object thickness, equivalent thickness data may be obtained for a specific material type, e.g. equivalent bone thickness or equivalent tissue thickness as described later (these may be computed from the overall thickness and the composition (e.g. alloy) values.

Preferably, the compositional information comprises one or more of: a material thickness image, a material composition image (e.g. material fraction/alloy image) and a scatter image, each optionally provided at the resolution of the input image and/or processed image.

Obtaining the input image preferably comprises generating a composition-derived image based on the compositional information and optionally based on the source image. The composition-derived image may be a scatter-to-primary ratio, SPR, image.

The compositional information may comprise a scatter image indicating contributions of scattered radiation to the source x-ray image, the method optionally comprising: computing a scatter-to-primary ratio, SPR, image based on pixel-wise ratios of scatter image pixel values and pixel values of a direct beam image, wherein the direct beam image is preferably an image representative of a contribution of non-scattered radiation to the source image and/or is obtained based on applying a scatter correction to the source image using the scatter image, and applying the image enhancement process to the SPR image.

The method may comprise applying a correction to the input image or an image derived therefrom, optionally the composition-derived image or SPR image, based on the compositional information. In particular, the correction may be applied based on material thickness data, preferably wherein the correction comprises dividing the image to be corrected, optionally the SPR image or other composition-derived image, by a material thickness image and optionally scaling the resulting image e.g. by the mean value of the thickness image values, the material thickness image preferably corresponding to the material thickness data or obtained by transforming the material thickness data, optionally to modify the range and/or scaling of thickness values.

The method may comprise determining one or more boundary image regions corresponding to a boundary between distinct region types, preferably between object regions (where the object being imaged is represented) and other regions (e.g. open beam and/or collimator regions), optionally based on segmentation data for the input image (e.g. derived by image segmentation as described below), the method preferably comprising applying different enhancement processing to pixels in the boundary regions than to pixels in object regions.

The method may comprise substituting pixel values of the processed image, optionally the processed SPR image or other composition-derived image, in the boundary regions with pixel values of a further image, the further image preferably derived from the input image using a different image enhancement process than the processed image. The processed image may correspond to a version of the input image with the thickness correction applied and the further image may correspond to a version of the input image without the thickness correction. For example, the further image may be the SPR image or a processed version of the SPR image without the thickness correction.

The method may comprise performing scatter correction based on a scatter image indicating contributions of scattered radiation to the source x-ray image, the scatter correction controlled based on the compositional information. This may include subtracting a scatter contribution derived from the scatter image from the input image, wherein the subtracted scatter contribution varies across the image in dependence on a variable weighting determined based on local compositional information at respective image locations.

Preferably, the method comprises determining the compositional information using a scatter correction algorithm, the scatter correction algorithm determining the compositional information based on the source image and using the compositional information to determine a scatter estimate indicating contributions of scattered radiation to the source x-ray image, wherein the input image is optionally based on a scatter-corrected version of the source image generated by the scatter correction algorithm using the scatter estimate.

The compositional information may define (or form part of) a model of the object.

In a further aspect of the invention (which may be combined with any of the above aspects), there is provided a method of enhancing an x-ray image comprising:
  receiving an input image, wherein the input image is an x-ray image of an object and comprises a plurality of image pixel values;
  receiving a model of the object comprising:
    a thickness data set comprising thickness values specifying respective thicknesses of portions of the object corresponding to respective locations of the image plane, and
    a composition data set comprising composition values specifying respective material compositions of portions of the object corresponding to respective locations of the image plane, wherein the composition data set is defined at a first resolution;
  deriving, based on image pixel values of the input image, the thickness data set and the composition data set, a mapping which maps an image pixel value and a corresponding thickness value specified for a given location in the image plane to a corresponding composition value for the location;
  using the derived mapping to determine a second composition data set comprising composition values at a second resolution, wherein the second resolution is higher than the first resolution; and
  determining image pixel values for pixels of an output image at the second resolution based on the second composition data set.

This approach allows a model of the object to be used to guide creation of an enhanced x-ray image, even where the model information is not necessarily available at the full required resolution of the output image. Use of the model allows parts of the image to be emphasised or de-emphasised visually based on the material composition of the corresponding portions of the object, for example to enhance bone regions in the image.

The following features may be applied to any of the above aspects of the invention.

The model comprises thickness and composition values for portions of the object corresponding to respective locations of the image plane. Typically the thickness and composition data sets are each two-dimensional arrays defined in the image plane of the input image, corresponding to a two-dimensional projection of the object being imaged onto the image plane. Thus each portion may essentially correspond to a volume of the object that projects to a particular location on the image plane (e.g. corresponding to a direct beam path of the x-ray imaging beam through the volume to that location). Such a volume is also referred to below as a volume element or voxel. In the model, each such volume is characterised by thickness and composition of the material making up the volume. Note the term "object" as used herein is intended to refer to any entity being imaged—this could be a discrete entity but more typically (e.g. in a medical imaging scenario) the object may be a part (e.g. head, torso, hand) of a larger entity (e.g. patient body). The image plane is the plane in which the input and output image are defined and may thus typically correspond to the plane of the x-ray detector used to acquire the image.

Preferably, the thickness data set is also specified at a resolution lower than the second resolution, optionally at the first resolution. Thus, the model may be at a relatively low resolution compared to the input/output image. The input image is typically at the second resolution of the output image, though scaling could be employed if this is not the case. The term resolution herein generally refers to image resolution (typically expressed in terms of horizontal/vertical pixel resolution) or to an equivalent resolution (in the image plane) of a two-dimensional array of data values forming the thickness data set or composition data set (these data sets can thus be considered to define a thickness image or composition image, since they are defined in the same plane as the input/output image).

Preferably, the method comprises deriving the mapping using the thickness and composition data sets at the first resolution. The step of using the derived mapping preferably comprises applying the mapping to pixel values and thickness values at the second resolution. The method may comprise upscaling the thickness data set to the second resolution, preferably by interpolation of the thickness values (i.e. without use of the mapping used to generate high-resolution composition data). Thus, for efficiency, the higher-resolution thickness values are computed solely from the lower-resolution thickness values without use of the image pixel values or composition values. Interpolation may e.g. simply involve averages or weighted averages of adjacent pixels (using nearest neighbour interpolation) or a more complex interpolation filter may be applied.

Using the mapping preferably comprises generating composition values for a plurality of pixels (at the second resolution) by applying the mapping to corresponding image pixel values and thickness values (at the second resolution). In other words, an image pixel value and thickness value for a location are provided as input to the mapping, which produces a corresponding composition value as output. The term "corresponding" in this and similar contexts typically means that the pixel/thickness/composition values are defined for the same location in the image plane.

The step of deriving the mapping preferably comprises deriving one or more parameters defining a mathematical relationship between image pixel values, composition values and thickness values, preferably defining a function mapping a pair of image pixel and thickness values to a composition value. This may comprise fitting a three-dimensional surface to a set of data tuples, each tuple comprising an image pixel value, a thickness value and a composition value, optionally wherein the one or more parameters comprise coefficients of a polynomial function characterising the surface. Each tuple may comprises image pixel, thickness and composition values specified for the same location in the image plane, the thickness and composition values taken from the thickness and composition data sets at the first resolution, and preferably wherein the image pixel values are sampled at the first resolution from the input image (which is typically though not necessarily at the second resolution). In this way, a relationship between thickness, composition and pixel values can be trained at the lower resolution of the model, and then applied at the higher resolution of the output image to generate high-resolution composition data.

Determining image pixel values using the second composition data set preferably comprises processing values to convert composition values associated with respective locations in the image plane to image pixel values at the corresponding respective locations of the output image. In this approach, a composition value for a location is essentially translated to a pixel value at that location in the output image. The conversion may involve a one or more processing operations, including any one or more of the following, which may be combined in any order.

Processing values may comprise converting values to an integer data type, preferably an integer data type associated with a predetermined image format. Processing values may comprise performing one or more scaling operations, optionally including one or more of: a non-linear scaling operation or gamma correction, and a linear scaling operation, optionally to scale the values to a predetermined value range. The image pixel values of the output image may be represented by a data type having a first value range, the predetermined value range being a subrange of the first value range. Processing values may comprise removing one or more outliers of the processed values, optionally by setting outlier values to zero, with the method optionally comprising identifying a set of values outside a predetermined value range or outside a predetermined percentile of the processed values as outliers. For example, the pixel values may be intensity values in a range from zero to a maximum value, the subrange extending from zero to a value less than the maximum value. The subrange preferably covers no more than 95%, optionally no more than 92%, of the predetermined range. In particular examples the subrange may cover no more than 90%, preferably no more than 85% or even no more than 80% of the range. Processing values may comprise encoding the output pixel values as intensity values, optionally in accordance with a predetermined image format.

Various such operations may be applied in any order (e.g. scaling prior to integer conversion or vice versa). Multiple scaling operations may be performed (e.g. a non-linear scaling for the purposes of gamma correction and a linear scaling operation to scale values to a required value range for intensity values of the output image).

Processing values preferably comprises computing the image pixel values for the output image from the composition values of the second composition data set without further reference to the input image pixel values and/or the thickness values of the model. Thus, while the input image (and optionally thickness model) may be used in determining the mapping, the final output pixel values may then be computed solely from the high-resolution composition data produced by the mapping without reference to the input image (and optionally thickness model). In another example both the thickness data and composition data are used to generate the final output image pixels but again without reference to the input image.

In an example of the latter approach, each composition value may represent a proportion of a given material type present in a respective portion of the object, and the converting comprises computing for each of a plurality of the composition values a respective material thickness value indicative of a thickness of material of the given material type in the respective portion. The material thickness values are preferably computed based on the second composition data set at the first resolution and the thickness data set, preferably upscaled to the first resolution, preferably without reference to the input image pixel values.

Preferably, the image pixel values of the input image and/or output image are intensity values. Thus, the image is typically a monochrome image. However, the described techniques could be adapted to colour images using any suitable colour encoding format, in which case image pixel values may include colour values.

Preferably, each thickness value specifies a spatial extent of a portion of the object in a direction substantially orthogonal to the image plane and/or substantially parallel to a beam direction of an x-ray beam used to acquire the input image. Viewed another way, each thickness value for a portion may specify a distance of the passage through the portion of the object of x-ray photons of the beam impinging on a corresponding location of the image detector (in turn corresponding to a given location of the image). Thus thickness may typically be specified numerically using an appropriate distance measure/unit (e.g. metres or centimetres).

Preferably, each composition value numerically specifies a quantity of a given material type in a given portion of the object, optionally as a relative quantity relative to a total quantity of material in the portion (e.g. as a fraction) or relative to a quantity of a second material type present in the portion (e.g. as a ratio). The quantity could also be specified in relation to multiple different other material types. Preferably, the composition value specifies a material fraction of the given material type in the portion (also referred to below as an alloy fraction). Quantity of material may be expressed in relation to thickness (e.g. a material fraction may specify the fraction of the overall thickness of a volume that is made up of a particular material type, or an absolute thickness of that material may be specified such as a bone thickness measured in cm or other appropriate unit which is distinct from the total object thickness indicated by the thickness data). Alternatively such a quantity could be expressed in relation to some other measure e.g. a fraction of a mass of a particular material type compared to the total mass of the volume.

Preferably, the given material type is bone or soft tissue. In that case, the step of determining image pixel values for pixels of the output image may comprise converting the composition values of the second composition data set (e.g. bone fraction or bone thickness values) to image intensity values wherein: composition values indicative of a high proportion of bone are converted to higher intensity values than composition values indicative of a low proportion of bone; and/or composition values lower than a predetermined threshold are converted to a predetermined low intensity value, optionally zero.

The method may further comprise storing, outputting and/or displaying the output image. For example, the image may be displayed in a user interface of a computing device providing user tools for image processing, such as contrast manipulation.

The model (thickness and composition data sets) and/or input image may be obtained using a scatter-correction process which generates a scatter-corrected version of a source image using a model of the object being imaged.

In a further aspect of the invention (which may be combined with any of the above aspects or any of their optional features), there is provided a method of enhancing an x-ray image, comprising:
receiving an input image, wherein the input image is an x-ray image of an object and comprises image pixel values;
performing a model-based scatter correction process, based on the input image, the scatter correction process comprising:
determining a model of the object including composition data indicative of a composition of the object, wherein the composition data comprises a plurality of composition values, each composition value specifying a composition of a respective portion of the object corresponding to a respective location in the image plane, and wherein determining the model comprises iteratively refining the composition data until a termination criterion is met in a final iteration; and generating a scatter-corrected image from the input image using the composition data determined in the final iteration;
wherein the method further comprises generating an output image corresponding to the scatter-corrected image using the composition data determined in the final iteration, the generation comprising:
generating pixel values for the output image based on the scatter-corrected image and the composition data determined in the final iteration.

Preferably, generating image pixel values for the output image comprises processing values to convert composition values associated with respective locations in the image plane to image pixel values at the corresponding respective locations of the output image, preferably after upscaling the composition data of the model to a target resolution for the output image to produce the composition values that are converted (alternatively no upscaling may be performed, e.g. if the model is already at the required resolution). Processing values may comprise one or more of: applying a non-linear scaling operation to the values; applying a linear scaling operation to the values, preferably to scale the values to a predetermined value range, optionally being a subrange of a data range of a target data type; converting values to an integer data type, preferably an integer data type associated with a predetermined image format; removing one or more outliers of the processed values, optionally by setting outlier values to zero; and encoding the output pixel values as intensity values in accordance with a predetermined image format. More generally, output pixel values may be computed as set out in relation to the first aspect of the invention above.

The model preferably further comprises thickness data comprising a plurality of thickness values, each thickness value indicative of a spatial extent of a respective portion of the object corresponding to a respective location in the image plane, the thickness data iteratively refined together with the composition data, wherein the pixel values for the output image are further generated based on the thickness data determined in the final iteration.

The input image and/or the output image are preferably at a first resolution, and wherein the composition data and/or thickness data are at a second resolution different from (preferably lower than) the first resolution, the method preferably further comprising rescaling the composition data and/or thickness data to the first resolution and using the rescaled composition and/or thickness data in the generation of the output image pixel values. Thickness data is preferably rescaled by interpolation of thickness values (without reference to image pixel and composition values). Composition data is preferably rescaled by deriving a mapping relating thickness, composition and pixel values and using the mapping to generate composition data at a higher resolution, as set out in relation to the first aspect of the invention. Alternatively, in either aspect, this approach could be reversed with composition data upscaled by direct interpolation and thickness data by use of the mapping. More generally, the more smoothly varying quantity is preferably directly interpolated whilst the mapping approach is preferably used for the more discontinuous (e.g. abruptly changing) quantity (the choice may thus depend e.g. on the type of object being imaged).

Converting composition values may comprise computing the image pixel values for the output image directly from the composition values at the output resolution (after rescaling of the composition data of the model, if needed) without further reference to pixel values of the scatter-corrected image.

The scatter correction process preferably comprises iteratively refining the composition data until a simulated x-ray image generated based on the composition data matches the input image e.g. to within a predetermined error. In an embodiment, the scatter correction process comprises: obtaining an input image for processing based on a source X-ray image of a sample acquired using an X-ray detector; and determining the model of the sample based on the input image. The model is then evaluated by a process comprising: computing, based on the model, simulated X-ray image data; evaluating the simulated image data against the input image to determine whether a convergence criterion is fulfilled; and generating an updated model of the sample if the convergence criterion is not fulfilled. The method may further comprise repeating the model evaluating process based on one or more successive updated models until the convergence criterion is fulfilled in a final iteration; and performing scatter correction on the source X-ray image using simulated image data computed during the final iteration. The scatter-corrected image and model are then used as input to the enhancement process as set out above.

The method in this aspect may include any of the additional optional steps or features of the first aspect of the invention and/or may include performing a method according to the first aspect.

The invention also provides a computer readable medium comprising software code adapted, when executed on a data processing apparatus, to perform any method as set herein. The invention further provides a system, apparatus, or computing device having means, optionally in the form of one or more processors with associated memory, for performing any method as set out herein.

BRIEF DESCRIPTION OF THE DRAWINGS

Preferred features of the present invention will now be described, purely by way of example, with reference to the accompanying drawings, in which:—

DETAILED DESCRIPTION

Overview

Embodiments of the invention provide a system for processing an x-ray image of an object—e.g. a patient or part of a patient's body in a medical imaging scenario—to enhance the image, based on the material composition of the object (the object is also referred to below as the imaging sample or the subject of the image). The described techniques can be used, for example, to enhance visibility of particular structures and materials for diagnostic purposes. One embodiment enables image enhancement to emphasise visibility of bone whilst de-emphasizing soft tissue. However, the techniques could similarly be applied to enhance soft tissue over bone, or to enhance contrast/visibility for any particular materials compared to other materials in the subject being x-rayed. Furthermore, the techniques are not limited to human tissue but could be used in other contexts (such as for product inspection on assembly lines, baggage security inspections etc.)

Described techniques may be more effective for x-ray images with no or limited scatter and thus may advantageously be applied after scatter correction has been performed on an acquired x-ray image to suppress the contribution of scattered radiation in the image. However, instead of scatter correction post-processing, other scatter suppression approaches are possible, such as use of an anti-scatter grid to limit scatter reaching the x-ray detector, or a combination of anti-scatter grid and software scatter suppression techniques.

Described techniques use a model of the object being imaged as a basis for enhancement of the image. The model comprises information on the shape and composition of the object. This model information may be obtained in any appropriate way. However, in one preferred embodiment, a particular software based scatter correction technique is applied that derives a model of the object (referred to below as a tissue model) as part of the scatter correction process and uses it to compute the scatter contribution that is removed from the x-ray image. This technique can thus produce both a compositional model of the subject and a scatter-corrected x-ray image which can be used by the described x-ray image enhancement process.

To allow a full understanding, the following sections therefore describe a preferred embodiment of the scatter correction technique in detail. The scatter correction generates both a scatter-corrected image and model information of the object being imaged as outputs. Subsequent sections then describe the x-ray image enhancement process which uses the scatter-corrected image and model information output by the scatter correction process to produce an enhanced X-ray image.

Imaging System

Figure 1:
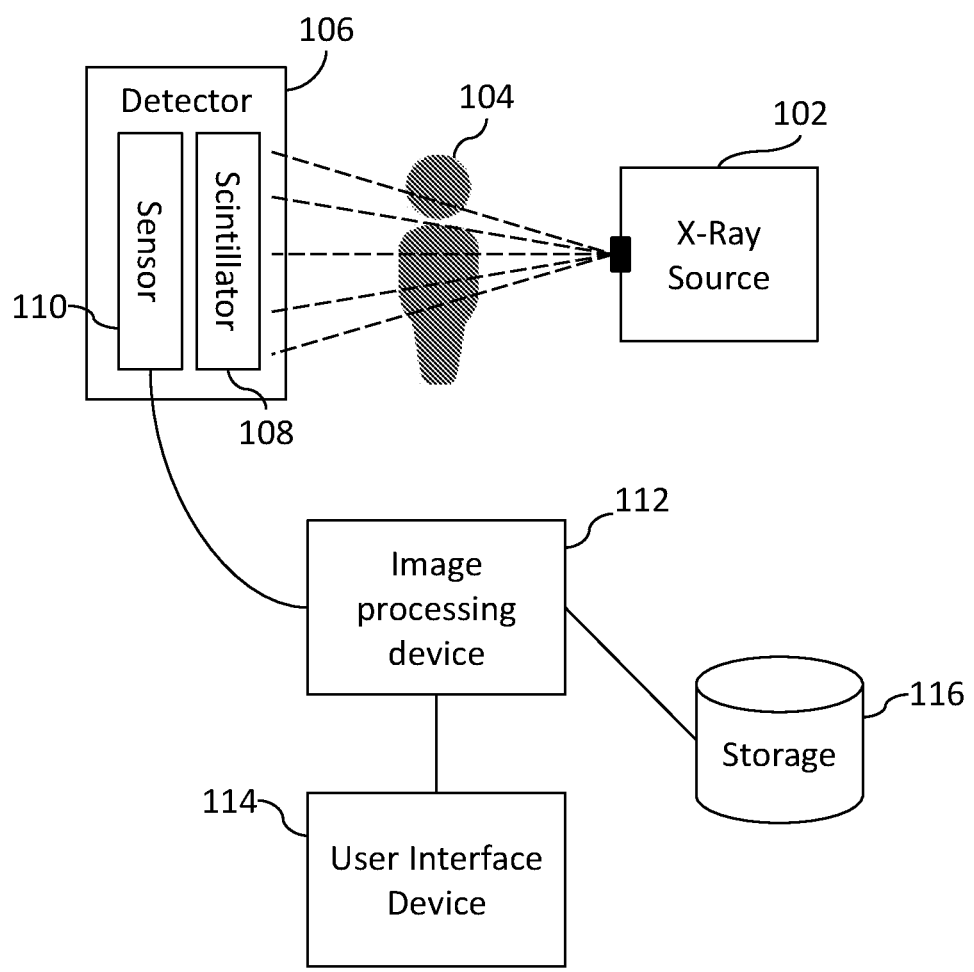
FIG. 1 illustrates an x-ray imaging system in overview.

An imaging system for implementing described techniques is illustrated in overview in FIG. 1 and comprises an x-ray source (emitter) 102 and a detector 106 for acquiring an x-ray image of a sample 104 (e.g. a biological tissue sample in the form of a human or animal subject, typically in a specific body region being imaged). In the present example the detector comprises a scintillator 108 which re-emits absorbed x-ray energy from the x-ray beam as visible light, and an image sensor 110 (e.g. a conventional CCD, charge-coupled-device, sensor) for producing digital image information based on the re-emitted light. The result is a visual image representation of the total x-ray energy incident on the detector over the x-ray exposure time. The detector typically records a single intensity value per pixel and thus the final image is essentially a greyscale image, each pixel specifying an intensity value representative of the total x-ray radiation energy incident on that pixel.

The digital image is processed by an image processing device 112 (e.g. a PC or server cluster), under control of an operator utilizing a user interface device 114 (e.g. a client workstation). Acquired and processed images are stored in storage 116 (e.g. part of the image processing device or a separate storage server).

The X-ray source 102 may be configurable to operate at a range of output settings (e.g. peak energy), for example by configuring the voltage applied at the X-ray emitter. This input voltage is also referred to as the "kV" (or "kVp", peak kV) setting since it is commonly specified in units of kilo volts (alternatively, the X-ray source may operate at a fixed kV setting). In practice, the emitted X-rays may additionally be filtered by the addition of a filtration material, typically a sheet/block of aluminium, close to the source 102, through which X-rays pass soon after being emitted and before spreading out and passing through the sample 104. This filtration is usually quoted in millimetre thickness of aluminium (Al), or equivalent thickness of Al if the material used is not actually Al. The purpose of the filtration layer is to increase the average energy of the X-rays without changing the peak energy, which it does by removing low energy X-rays.

Additionally, a collimator may be present (in the beam path after the x-ray source) to control the shape and extent of the beam (and thus the size of the beam cross section as detected by the sensor).

Scatter Correction Process

Figure 2:
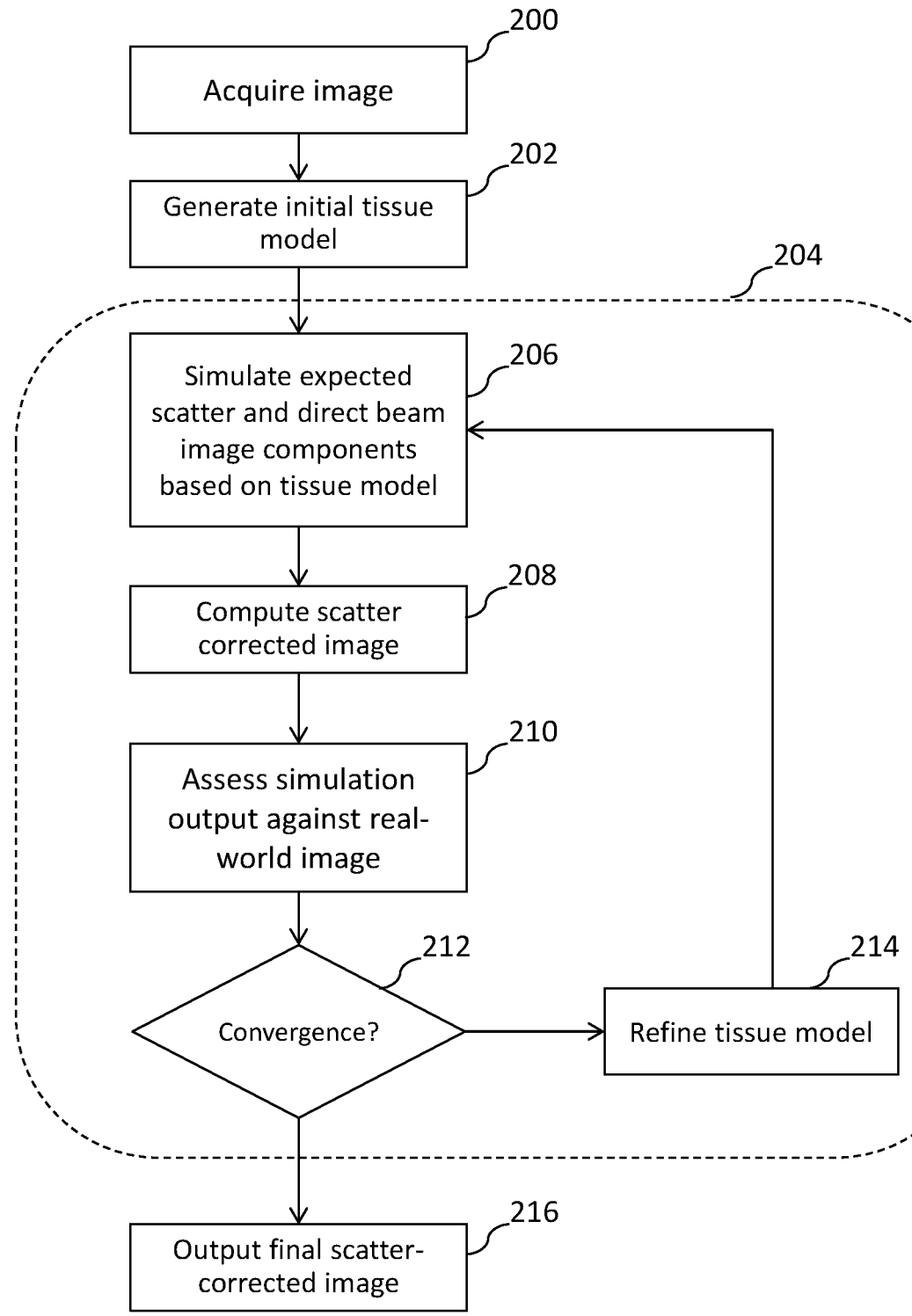
FIG. 2 illustrates a scatter correction process.

The scatter-correction process is illustrated in overview in FIG. 2, and begins in step 200 with the acquisition of an X-ray image (radiograph) of the sample (the "real" image, denoted I) using the image detector. The image may be pre-processed, e.g. by downsampling.

In step 202, an initial tissue model of the tissue being imaged is created. The tissue model provides a simplified representation of the tissue shape, composition and/or densities at different locations of the image. In particular embodiments, an initial estimate of the thickness and material composition at each pixel location is made as explained in more detail below. Note that while for clarity reference is made throughout this disclosure to a tissue model, the image sample need not be biological tissue but could be any sample or object, and thus the model may represent shape and/or composition information of any relevant material(s) of the sample. The initial model is derived from the X-ray image and thus the algorithm does not require any prior information relating to the morphology of the sample.

In step 206, the imaging process is simulated based on the initial tissue model (e.g. initial thickness and material composition estimates) to produce simulated image data. The simulated image data includes a first image component (D) representing the direct beam contribution to the final image and a second image component (S) representing the contribution of the scattered portion of the beam. Specifically, the direct beam component comprises estimated pixel data resulting from the (simulated) passage of the direct beam through the tissue (corresponding to non-scattered X-ray photons of the beam), and the scattered component comprises estimated pixel data resulting from the part of the beam that is scattered by the tissue (i.e. the scattered photons of the beam), with the extent and spatial distribution of the scattering determined based on the tissue model. These components are also referred to herein as the direct beam estimate and the scatter estimate and are represented as separate images recording the direct beam and scatter components (such that, when combined, a complete simulated image including scatter results).

The scatter estimate is then used in step 208 to compute a scatter-corrected image ($I_C$), by subtracting the scatter estimate from the real acquired image ($I_C=I-S$). This leaves a corrected version of the real image from which the simulated scatter has been removed.

In step 210, the output of the simulation is assessed against the real-world image to determine how similar the simulation output is to the real image. The comparison is based on the assumption that, as the tissue model becomes increasingly representative of the actual tissue distribution in the sample, the simulation of the imaging process will produce an increasingly accurate estimate of the direct beam and scatter components, which will result in an improved scatter corrected image.

In an embodiment the assessment is performed by computing the sum D+S of the simulated direct beam and scatter images, producing a complete simulated image, and subtracting the complete simulated image from the real world image to produce an error image ($I_E=I-(D+S)$), which indicates the difference or error between the simulation output and real image (this is of course equivalent to subtracting D and S from the original image individually, i.e. $I_E=I-S-D$). In essence, this step thus involves comparing the source image to the full simulated image (or equivalently, comparing the scatter-corrected source image to the direct beam estimate).

The error image resulting from that calculation provides an indication of the simulation accuracy and can be converted to a single value error measure in any suitable way, for example by computing a sum of error image pixels (corresponding to a sum of pixel differences across the real and simulated images). A "perfect" simulation would yield a zero error image and hence a zero result for the error measure, and thus the distance from zero in the error measure (i.e. the magnitude of the error measure since the error measure may be negative) is used to provide a measure of how well the simulated output has converged on the real image. Note, however, that both the x-ray image and the simulation are random processes so even with a perfect representation of the sample by the algorithm a minimum error related to the randomness of the real world and simulator would still be present. This limit thus typically defines the limit within which we can discriminate between different results.

A convergence criterion is used to determine in step 212 whether the simulation of the imaging process has sufficiently converged with the real acquired image. Where an error measure is used as described above, the convergence criterion may be a threshold; if the magnitude of the calculated error measure (e.g. sum of pixel differences) falls below the threshold, then the simulator can be considered sufficiently converged. Note that other approaches to comparing simulation output and real image, and other corresponding error measures and/or convergence criteria, may be used.

If the convergence criterion is not met, then the tissue model is refined in step 214. The simulation of the image process is then repeated in step 206, to produce an improved scatter and direct beam image based on the refined tissue model, with the corresponding scatter corrected image being computed and the simulation output tested against the real image as already described in steps 208-212. This iterative refinement loop (shown collectively as 204) is repeated until the convergence criterion is met in step 212 (other termination criteria may of course be used additionally or alternatively, e.g. a maximum number of iterations, maximum compute time etc.)

Once satisfactory convergence is achieved the iterative refinement ends and the final scatter-corrected image (as computed in step 208) can be output (e.g. to user interface device 114 for display to an operator) and/or stored in storage 116 for subsequent use or further processing. However, in some embodiments, as described in more detail below, the iterative refinement loop 204 operates on a reduced resolution version of the image, in which case the final scatter-corrected image may be regenerated in step 216 at full resolution, based on the final tissue model.

The above overview assumes that the outputs of the simulator are directly comparable to the real-world image but this may typically not be the case since the simulator characteristics will generally not accurately match the characteristics of the real-world imaging system. To address this, an empirically obtained transfer function is applied to the simulator outputs to make them comparable, as will be described in more detail later.

Modelling the Composition of the Sample

The simulation of the imaging process depends on a tissue model of the tissue being sampled. While a wide variety of modelling approaches could be used for modelling the distribution of different tissue types, densities etc. throughout the three-dimensional sample, a highly simplified model is preferred to allow efficient computation of the simulation results and reduce the search space for the refinement of the tissue model which occurs in step 214 of the refinement loop 204.

Figure 3:
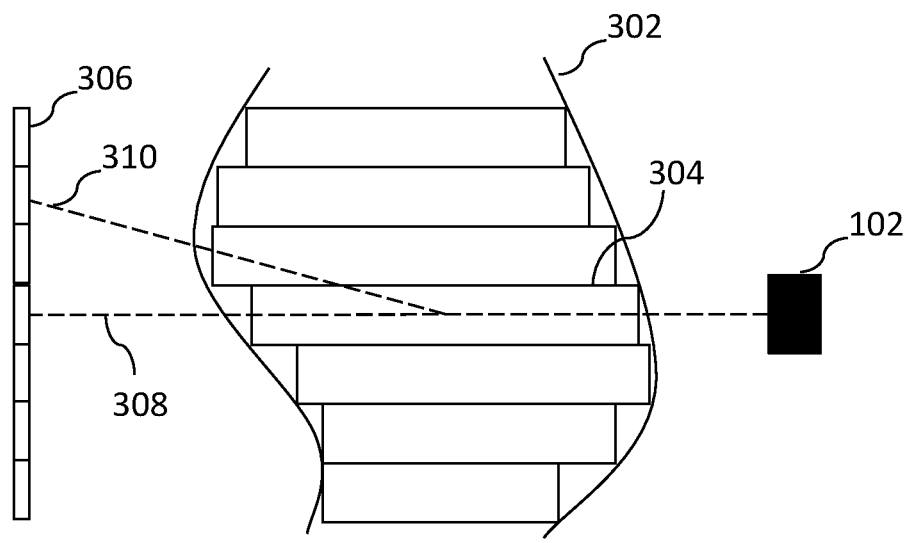
FIG. 3 schematically illustrates the imaging process.

Thus, in an embodiment, the sample volume containing the imaged sample is divided into a set of voxels (volume elements). However, instead of a true three-dimensional array of voxels, the model in essence comprises a two-dimensional voxel array, forming a grid of m×n voxels, one voxel deep, in a plane perpendicular to the x-ray beam. This is illustrated in cross section in FIG. 3. Thus each voxel, e.g. voxel 304 in FIG. 3, extends front to back across the entire extent of the sample in the direction parallel to the beam (and thus only a single voxel is defined in that direction at each of the m×n locations of the perpendicular plane). As illustrated (in simplified form), according to the model, the beam from the x-ray source 102 passes through a given voxel 304 in a straight path, forming a direct beam contribution 308 to the pixel grid 306 of the image acquired by the detector. Additionally, the material in a voxel may scatter some of the incident beam, resulting in a scattered beam contribution 310 to the pixel grid. During simulation, direct beam contributions and scatter contributions from each voxel are computed and summed as needed to produce the complete direct beam image and scatter image respectively.

Each voxel within the sample contains a unique mixture of materials with a unique total thickness. The material composition and thickness of a given voxel determines the way in which the sample transmits and scatters incident x-rays. The intensity measured at a given pixel of the detector is a function of the material composition and thickness of the corresponding voxel of material plus the contribution due to scatter from all neighbouring voxels.

As such the intensity measured at each pixel is a function of the unique combination of materials at every location within the sample. This is a very large convolution problem with very high degrees of freedom.

To simplify the problem, the model used assumes that each voxel of material is comprised of a combination of two materials (in the present example bone and soft tissue). In the model, the percentage of each material can vary freely and the total thickness of each voxel can also vary freely.

More specifically, in a preferred embodiment, the model is implemented such that each voxel is characterised by two values:
  a "thickness" value (denoted t); this indicates a thickness of the sample at that voxel (i.e. its spatial extent in the beam direction); and
  an "alloy" value (denoted p); this indicates the material composition of that voxel as a fraction or proportion of one of the two materials A or B relative to the total thickness, as a value between 0 and 1. In the examples herein the alloy indicates the fraction of the material in the voxel that is soft tissue.

The model further assumes a symmetric arrangement of material along the beam axis (the "z" direction). Specifically, the thickness and alloy values together describe the voxel as a symmetric sandwich of the materials (A-B-A, e.g. soft tissue-bone-soft tissue). For example, a thickness of 10 cm and alloy value of 0.8 would suggest a simplified model of 4 cm soft tissue, followed by 2 cm of bone, followed by 4 cm of soft tissue. However, it should be understood that this is a modelling approximation (based in part on typical distributions in biological tissue samples) and will usually not be exactly representative of the real tissue distribution.

Note that in one simplification of this model, the z-location (location in the direction of the beam) of the voxel is not represented (only the thickness in that direction), further reducing the problem space. However, alternative embodiments could additionally represent voxel location on the z-axis.

While described as a grid of voxels, since the model is one voxel deep, this could equivalently be understood as a two dimensional element grid with each element providing a tissue model (as thickness/alloy values) for that grid location.

The tissue model in this embodiment thus consists of a two-dimensional array of thickness values (also referred to as a thickness image) and a two-dimensional array of alloy values (also referred to as an alloy image). The dimensions of the thickness and alloy images correspond to the pixel plane of the acquired image. However, to reduce computational complexity, the tissue model resolution may be reduced compared to the resolution of the original image acquired by the X-ray detector (and hence the process depicted in FIG. 2 may operate on a downsampled version of the original acquired image, at the same resolution as the tissue model). The alloy and thickness images can essentially be thought of as the outputs of two additional, lower resolution detectors occupying the same space as the X-ray detector, that give values of alloy fraction (unit-less) and thickness (e.g. in cm) respectively rather than intensity.

Thus, references to the "tissue model" in the following shall be understood to refer to a model as described above, comprising arrays of thickness and alloy values describing material shape/composition across the image plane of the source image (but typically at lower resolution). However, other approaches to modelling tissue could be employed, for example representing each voxel as an A-B-A tissue sandwich with explicitly defined material thicknesses, or as a three-dimensional voxel array with voxels having individual alloy values, etc. Furthermore, models with a single material type (e.g. modelling only thickness of each voxel, each voxel assumed to consist entirely of a single material), or models with three or more material types could be used, e.g. defined by multiple material fractions or other structural information per voxel (at the cost of increased computational complexity). In other examples, constant thickness may be assumed (or known/measured) for the entire sample, with only material composition defined for each voxel of the model. The term "tissue model" thus encompasses any suitable representation of the arrangement of material in a sample, the shape of the sample, the distribution of tissue types (or other material types) and/or of tissue/material densities in a sample.

Simulation

Figure 4:
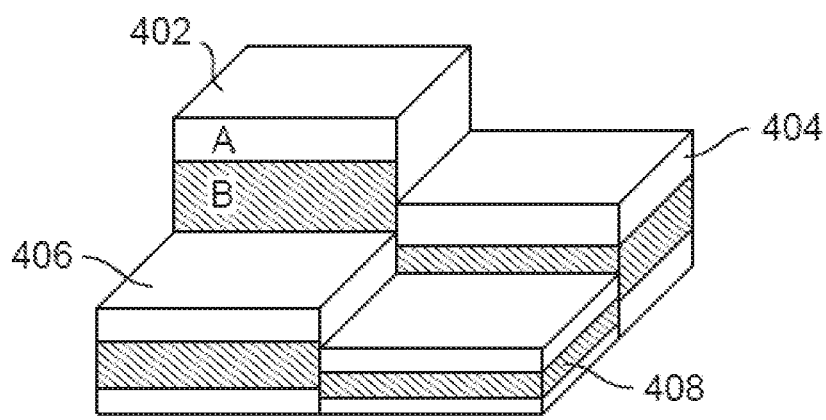
FIG. 4 illustrates a tissue model.
Figure 4:
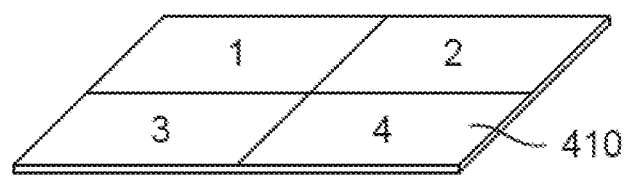

FIG. 4 illustrates the tissue model using a simplified case with four voxels of material 402, 404, 406, 408, and four corresponding simulated output pixels 410.

The model assumes each voxel of the sample to be comprised of two materials, "A" (e.g. soft tissue) and "B" (e.g. bone). The overall thickness of each voxel, as well as the thickness of each material, $t_A$ and $t_B$ can vary from one voxel to the next. Here we assume that we know the materials A and B and we know the individual thicknesses, $t_A$ and $t_B$ for each voxel. In the simplified model described above, each voxel is characterised by the total thickness and the alloy value which specifies the proportion of material A within the voxel, providing equivalent information on the assumption of a symmetric sandwich structure.

Based on the geometrical and material information in the model, the x-ray interactions with this sample and the detector are simulated using a Monte Carlo model. The outputs of the simulator are calibrated to the outputs from the real world imaging system by application of a transfer function (as will be described in more detail later), which allows the outputs of the simulator to be applied directly to the real world image. In other words the simulator and real world information become interchangeable.

To create a simulated x-ray image of the sample, the simulator sums up a series of pencil beams $P_1$, $P_2$, $P_3$ and $P_4$. Here a pencil beam is defined as a collimated beam of x-rays with zero degrees of divergence.

Figure 5A:
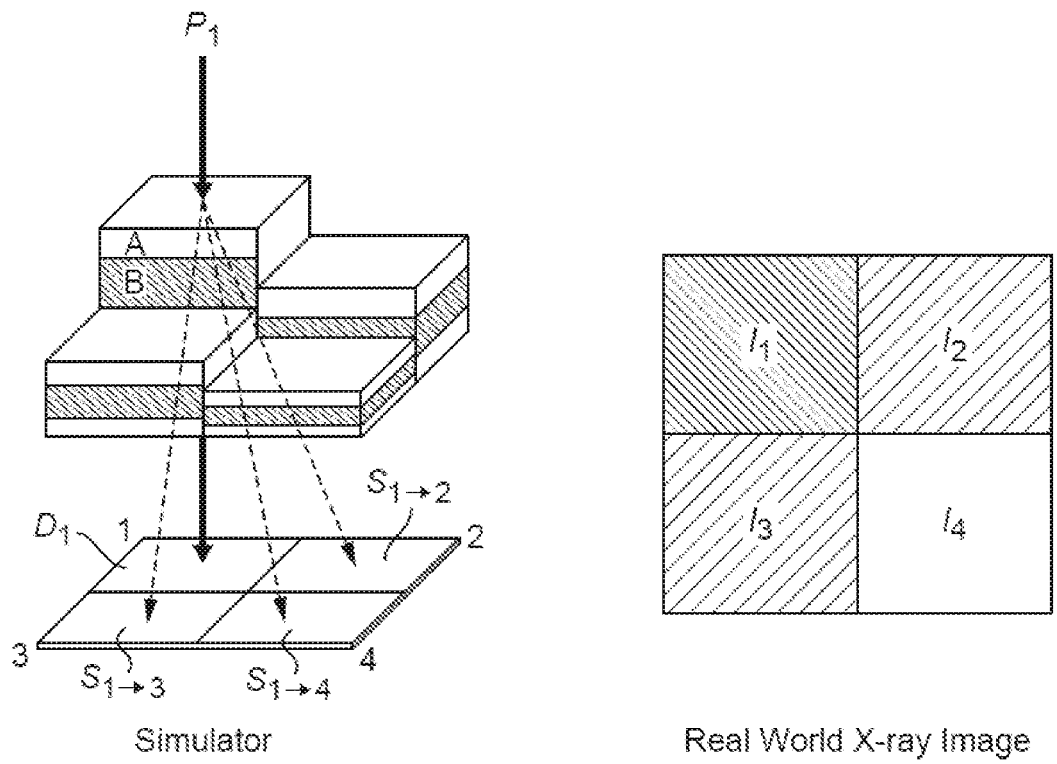
FIG. 5A illustrates use of the tissue model to simulate x-ray imaging.

FIG. 5A shows the case where pixel 1 is irradiated with a pencil beam, $P_1$.

Figure 5B:
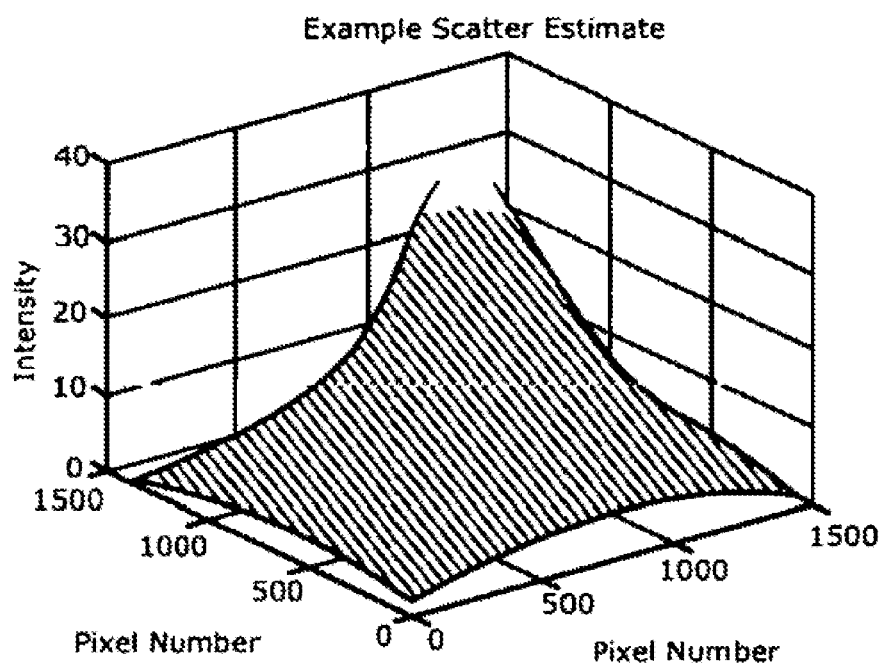
FIG. 5B illustrates a scatter kernel.

This can be repeated for each pixel in order to produce scatter kernels $K_1$, $K_2$, $K_3$ and $K_4$. The simulated intensity at each pixel is then given by the convolution of all scatter kernels. As shown in FIG. 5A, the scatter kernel is a point spread function, containing direct and scatter x-rays. In the case of pencil beam $P_1$ there is a direct component, $D_1$, incident on pixel 1 and scattered components $S_{1 \rightarrow x}$, emanating from pixel 1 to pixels x=2, 3 and 4. FIG. 5B provides an illustration of a more realistic higher-resolution scatter kernel.

The intensity recorded at each pixel is therefore the direct beam at a given pixel plus the scatter contribution from every neighbouring pixel:

$$\begin{bmatrix} I_1 \\ \vdots \\ I_n \end{bmatrix} = \begin{bmatrix} D_1 + S_{2 \rightarrow 1} + S_{3 \rightarrow 1} + S_{4 \rightarrow 1} & \ldots & S_{n \rightarrow 1} \\ & \vdots & \\ D_n + S_{1 \rightarrow n} + S_{2 \rightarrow n} + S_{3 \rightarrow n} & \ldots & S_{n-1 \rightarrow n} \end{bmatrix} \quad [1]$$

Given that we have calibrated our simulator to the real world, the convolution of kernels $K_1$, $K_2$, $K_3$ and $K_4$ will produce an image, $I_{Sim}$, which resembles that of the real world x-ray image, I within a margin of error, ε.

$$I_{sim} + \varepsilon = I \quad [2]$$

The system uses the Monte Carlo truth to separate out the contribution into each pixel due to scatter and the contribution into each pixel due to direct beam as illustrated in equation [1]. From this, a simulated direct beam image, D, and a simulated scatter image, S are generated.

The scatter corrected real world image, $I_C$, is then calculated by:

$$I_C = I - S \quad [3]$$

Note that these examples assume a straight line beam passing through each voxel but corrections could be made for a non-straight beam, e.g. a beam spreading from a central source resulting in a beam path with different angles through different voxels.

An accurate simulation would of course require full knowledge of the thickness and materials composition of each voxel which would generally not be available in a real world sample.

Instead, embodiments may use a simplified modelling approach which considers all possible combinations of the two materials A (e.g. soft tissue) and B (e.g. bone) for each voxel. With sufficient computational power the x-ray image arising from each of these combinations can then be simulated. The best combination of materials and thicknesses across all pixels can then be evaluated using equation 4. The minimum value of $I_E$ relates to the simulated image which most closely matches the real world x-ray image, where $I_E$ indicates the simulation error:

$$I_E = I - I_{sim} \quad [4]$$

The modelled sample composition (i.e. the tissue model) which minimises the magnitude of $I_E$ across the image (i.e. that is closest to a zero image) is the closest estimation we can produce to the real world, given the errors associated with our calibration of the simulator to the real world and the stochastic nature of both the simulator and real world measurements.

Using this approach it is possible to see that it would in theory be possible to understand the sample composition and x-ray interactions using only a Monte Carlo model and a calibration of the simulator to the real world.

Once an acceptable minimisation of $I_E$ has been found (e.g. based on a convergence threshold as discussed above) then the system has converged on a reasonably accurate knowledge of the tissue model of the sample and how x-rays interact with it.

One difficulty with this approach is the problem of high dimensionality i.e. the number of possible solutions that need to be evaluated using equation 4 is very large. Thus, to reduce the search space, embodiments of the invention adopt the following strategies:

1. Deriving an initial tissue model as a starting point for the iterative refinement process, based on image features of the original acquired image. In particular, this involves deriving initial estimates for alloy and thickness model parameters (in an example this is done based on a prior classification of pixels which have an alloy value of 1, i.e. 100% soft tissue composition),
2. Iterative refinement of the tissue model (specifically the alloy and thickness estimates) guided based on observed improvement of the simulated x-ray image (see step 214 in FIG. 2)

These two components will be described in more detail later.

Generation of Simulated Direct-Beam and Scatter Contributions by the Simulator

In one approach, an approach based on ray-tracing could be used to generate the direct beam and scatter estimates, by computing the paths of x-rays through the material based on a given 3D model of the subject (e.g. derived from the tissue model). This may involve building the given 3D model of the sample in the Monte Carlo simulator and then simulating the direct and scatter components for each pixel location. However, this approach would typically be very computationally demanding (especially given that the simulation may be repeated many times during the iterative refinement of the tissue model, and given that this approach may necessitate using divergent beams to simulate the x-ray image arising from a given sample, rather than pencil beams which reduce the number of events to be simulated).

Embodiments of the invention thus provide an alternative, more efficient approach to the creation of the simulated x-ray image. The approach is based on efficient creation of non-stationary non-symmetric kernels, by combining precomputed symmetric kernels for specific material combinations.

In an embodiment, a Monte Carlo simulation package called GEANT4 is used to simulate X-ray interactions. As described above, this involves simulating pencil-beams so that the way in which the sample scatters can be observed. X-rays are created at the source as a narrow beam directed at a pixel on the detector denoted the "central pixel". X-rays which are not scattered will hit the central pixel.

While in principle, simulation could be performed "online", during the iterative refinement loop 204, this may be computationally very demanding. To reduce the computational burden of simulation, an alternative approach performs simulation "offline", i.e. prior to running the iterative refinement. In this approach, simulation is performed in advance for a predefined set of alloy and thickness combinations ($\mu$, t) to obtain a set of scatter kernels for each ($\mu$, t) combination (e.g. across defined ranges and step sizes of $\mu$, t values). The resulting scatter kernels are stored in a database. In certain preferred embodiments, the predefined set of parameters for which scatter kernels are stored in the database is chosen to be a sparse mesh which can later be interpolated for any desired $\mu$, t combination.

In an embodiment, unless simulating the effect of only air, the simulation places a sample in the path of the X-ray beam. The sample consists of a cylindrical core with a given radius (e.g. 1 μm) of one material surrounded by an annulus of another radius (e.g. 50 cm) of another material. This allows the system to simulate what it is like to scatter in one material and then immediately continue the rest of the path to the detector in another material. Embodiments may generate scatter kernels for different combinations of core and annulus compositions (alloy) and/or different combinations of core and annulus thicknesses (in an alternative embodiment a common thickness may be specified for core and annulus). For example, simulations may be performed from 1 cm to 20 cm in steps of 1 cm for overall thickness, 0% to 100% in steps of 10% for the core alloy value and 0% to 100% in steps of 10% for the annulus alloy value—this example would mean there would be 20*11*11=2420 simulations required for direct beam and scatter kernels. The central pixel of the simulation is the direct beam value and everything else is the scatter kernel (though for convenience the direct beam value may be recorded as the central pixel of the scatter kernel).

The precomputed scatter kernels are then used subsequently to obtain simulated image data. This involves modifying the shape of the kernels according to the 2D ray path; in particular, the intensity of the tails of the kernel is modified according to the 2D voxels in the tissue model, as described in more detail below.

Specifically, during the iterative refinement process 204, in particular the simulation step 206, the system looks up the relevant direct beam values and scatter kernels for each pixel of the tissue model and generates simulation results by convolving (e.g. summing) the scatter kernels and separating the direct beam and scatter components as previously described. Additional scatter kernels not generated by the simulation may be produced by a process referred to as emulation, based on adjacent scatter kernels (this is analogous to interpolation). Such emulated/interpolated scatter kernels can be generated in advance (and stored in the database), online during operation of the process 204, or both. Thus, references to simulation herein include making use of pre-calculated simulation results when generating simulation output.

In more detail, during the iterative refinement loop, for given estimates of $\mu$, t, the stored direct beam values in the database can be used to get the corresponding estimate for direct beam at a pixel for any given combination of $\mu$, t. Repeating this process for every pixel of our $\mu$, t alloy and thickness estimates and writing the intensities in to the corresponding pixels produces the direct beam estimate D. Note that for both scatter and direct beam, the system does not make corrections for a divergent beam, choosing instead to treat each pixel as if it had its own independent source so incident rays to different pixels are parallel to each other. The further away the source is from the object, the less of an issue this is, though other embodiments could apply corrections for this if required.

The scatter estimates may be obtained as follows. The aim is to obtain the scatter kernel caused by the sample at any given pixel (x,y). To know what intensity the kernel has at pixel (x', y') when scattering from pixel (x,y), the scatter lookup database is used. First, the kernel scatters from pixel (x,y) with (a) alloy $\mu$ with (b) thickness t. It then travels through (c) an average alloy $\mu_r$ for (d) a distance r (where the average is determined from the alloy values of voxels on the path from x,y to x', y' as specified in the tissue model). The system identifies the intensity corresponding to these four values and interpolates from the scatter lookup table in the database if it does not exist. This is done for every pixel the X-ray could scatter to (x', y') and every pixel an X-ray could scatter from (x,y). Summing up all these values gives the scatter estimate. Further improvements to calculating the intensity of the scatter could be made, such as including the effect of (e) the average thickness $t_r$ the ray travels through but such improvements add another dimension which may be computationally expensive and adds further processing time.

Matching the experimental setup described in relation to FIG. 1, the simulator is configurable in terms of the input energy level (peak kV) and the applied filtration (specified as Al thickness in mm). Where scatter kernels are pre-calculated, this may thus be done across a range of energy level and filtration values, with the scatter kernel database storing the scatter kernels for the different simulator settings.

Calibration

The refinement loop described above relies on comparison of the simulated image data to the real-world acquired image to determine when the simulation—based on the tissue model of the imaged tissue—is considered sufficiently accurate that the simulated scatter estimate can be used for scatter-correction of the real acquired image.

A calibration process is performed to ensure comparability of the real imaging output of the detector and the simulated imaging output of the simulator. Calibration involves determining a transfer function which can be applied to the simulator output to make it comparable to the real-world image (equivalently, an inverse of that transfer function could of course be applied to the real-world image for comparison to the simulator image).

In preferred embodiments, the simulator is based on a Monte Carlo model, and the purpose of calibration is to match the behaviour of the Monte Carlo model to the observed real world behaviour. More precisely, the purpose is to match the underlying energy spectrum between the model and the real world. This is carried out using an indirect method as it is typically difficult (and requires costly additional equipment such as a multi-spectral detector) to observe the energy spectrum in the real world.

The calibration process is based on the assumption that, by identifying suitable parameters for the model which provide a material-invariant transfer function between the simulator output and the real world output, then the underlying energy spectrum of the real world imaging system has been matched to within random error. This is considered a reasonable assumption because different materials have different energy-dependent attenuations of x-rays and hence the only way in which the simulator output can match the real world for more than one material is if the energy spectrums match.

Figure 6:
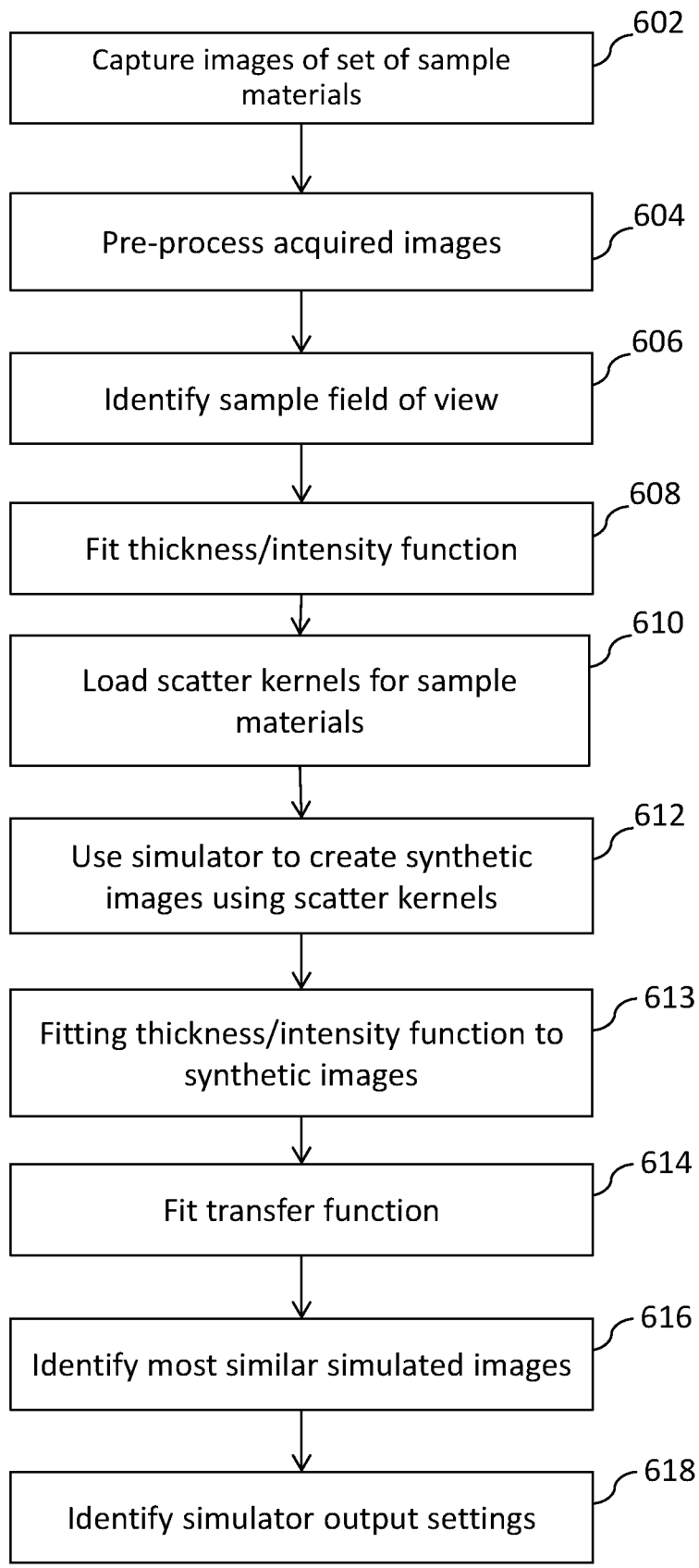
FIG. 6 illustrates a calibration process.

The calibration process is illustrated in FIG. 6.

Calibration starts (step 602) with capturing a set of real world images of at least two different materials, each with a number of different thicknesses. In an embodiment, images of flat blocks of PMMA (polymethyl methacrylate or perspex) and aluminium at 5 different thicknesses are captured, plus an image with no sample in the beam. Example thicknesses are:

PMMA: 5, 10, 15, 20, 25 cm

Al: 1, 2, 3, 4, 5 cm

Thicknesses are selected in order to span the range of attenuations which can be expected to be encountered in the samples that are to be imaged. Also the attenuation range of the two materials should preferably be approximately matched.

Note other materials may be used, and the choice of materials need not specifically relate to the materials being imaged (e.g. bone and soft tissue), but rather the aim is to match the real-world and simulator spectra for two distinct materials to allow a material invariant transfer function to be identified that is applicable to any material.

In step 604, the acquired images may be pre-processed to make them more suitable for subsequent processing. For example, the raw images may be gain- and offset-corrected.

In step 606, the sample field of view is identified. This is the region of the detector which is illuminated by x-rays. The field of view is the only region considered as being the origin of scatter so this marks the boundary of where data processing is performed. All regions outside of this field of view are ignored. In some embodiments, when actual test samples are processed, the collimation can be smaller than that defined by the field of view but not larger, though this restriction may be removed in other embodiments.

In an embodiment, it is assumed that in calibration the X-ray images will appear either as a "flat" image if the entire detector was hit by direct X-rays or as an illuminated rectangle surrounded by a shadow if a collimator was used. The field of view (FoV) is thus defined using a logical image (e.g. a mask) with 0 for pixels which were in the collimated region and not hit by direct X-rays and 1 for pixels which were hit by direct X-rays. A corresponding reduced resolution (sub-sampled) version of this image is created for use in the simulation. The FoV image can either be found by a simple threshold of the image where all pixels above a given intensity are 1 and all those below are 0. Alternatively, edge detection methods can be used. In calibration, a transfer function can generally only be found at illuminated pixels as no information is available at dark pixels (according to the FoV). Therefore calibration is preferably run with collimators opened.

In step 608, the system fits a function to the source image data $f(thickness)=\log(I)$, where I is the average intensity over repeated frames of the sample images. The function is fit for every pixel in the field of view. Working in $\log(I)$ space makes emulation easier and keeps the values to roughly the same order making calculations on a computer more numerically stable.

In step 610, a prebuilt calibration training database is loaded. This is comprised of scatter kernels for each of the materials measured in the real world across a predetermined set of kV values and filtrations. These values cover a predetermined range of kV and filtration values in predetermined step sizes. The appropriate simulator settings may be chosen depending on the real world system settings of the detector setup. Purely by way of example, if the user intends to run the real world system at 80 kV with roughly 2 mm filtration, the simulation may search kV values ranging from 70 kV to 90 kV in steps of 1 kV and filtration of 0 mm to 5 mm in steps of 0.25 mm. On the other hand, if the system is run at 60 kV, a range of 45 kV to 75 kV may be searched in the simulator. The ranges can be narrowed or widened depending on familiarity with the system (search range can potentially also be narrowed with a more accurate model of the real world system).

In step 612, synthetic images of the same size as the real world images are created by convolving the scatter kernels together. This step is performed for each kV and filtration value, using the scatter kernels for the given kV and filtration, and for the relevant material. Thus, the synthetic images are created for each material, at each thickness, at each filtration and kV combination. Each synthetic image represents a block of constant thickness of a single material, just like the real world set of images obtained in step 602. The aim is to reproduce the real sample images in the simulator (whilst limiting the computational cost, which is achieved by use of convolution kernels).

In step 613, a thickness/intensity function is fit for the synthetic images in the same way as done is step 608 for the source image in step 608.

In step 614, the system then fits a transfer function between the real world images and the synthetic images for each kV and filtration value in the kV and filtration ranges.

The purpose of the transfer function is to take up any remaining discrepancy between the simulator and the real world. The underlying assumption is that if the energy distribution of the model has been matched to the real world then there will only be scalar discrepancies between the model and the real world, or in the worst case the discrepancies may be invariant to the sample material.

In one implementation, each pixel has its own transfer function which is a quadratic function. All of the transfer functions are stored as a 3D array of size nr*nc*3 where nr and nc are the number of rows and columns according to the pixel/voxel resolution used for deriving the tissue model in the FIG. 2 process, and the third dimension is three, holding the three parameters for the quadratic function. The fitting process involves using the simulator to reproduce the real world calibration samples in the simulator space. The function is built by fitting log(I) in the real world as a function of log(I) in the simulator. However, other forms of transfer function could be used (e.g. using transfer functions based on functions other than quadratic functions, e.g. higher-order or lower-order polynomials; preferably a polynomial of at least second degree is used).

In step 616, the system identifies the set of synthetic images which are most similar to the real world in terms of an implausibility metric. This provides a non-implausible set and defines all of the kV and filtrations which can be used in the simulator to match the real world output within the errors associated with the real world and simulator measurements. The implausibility metric is a measure of similarity between a real world observation and a simulator output (usually similar to the Mahalanobis distance). This step produces a set of non-implausible solutions rather than a single solution due to the fact that there are two random processes (simulator and real world). As such all solutions can be deemed non implausible given the error.

In an embodiment, the implausibility metric for selecting kV, filtration and transfer functions is that the maximum distance between the real world log(I) curve and the transferred log(I) curve from the simulator cannot be more than a distance of 2 scaled by an uncertainty. This typically means that many transferred log(I) curves from the simulator (each at a different kV and filtration) will be sufficient up to the given uncertainty at the time, providing a non-implausible set.

In step 618, the system identifies the lowest implausibility transfer function, kV and filtration. These kV and filtration values, together with the transfer function, are then defined as the simulator output settings.

Detailed Description of the Scatter Correction Algorithm

Figure 7A:
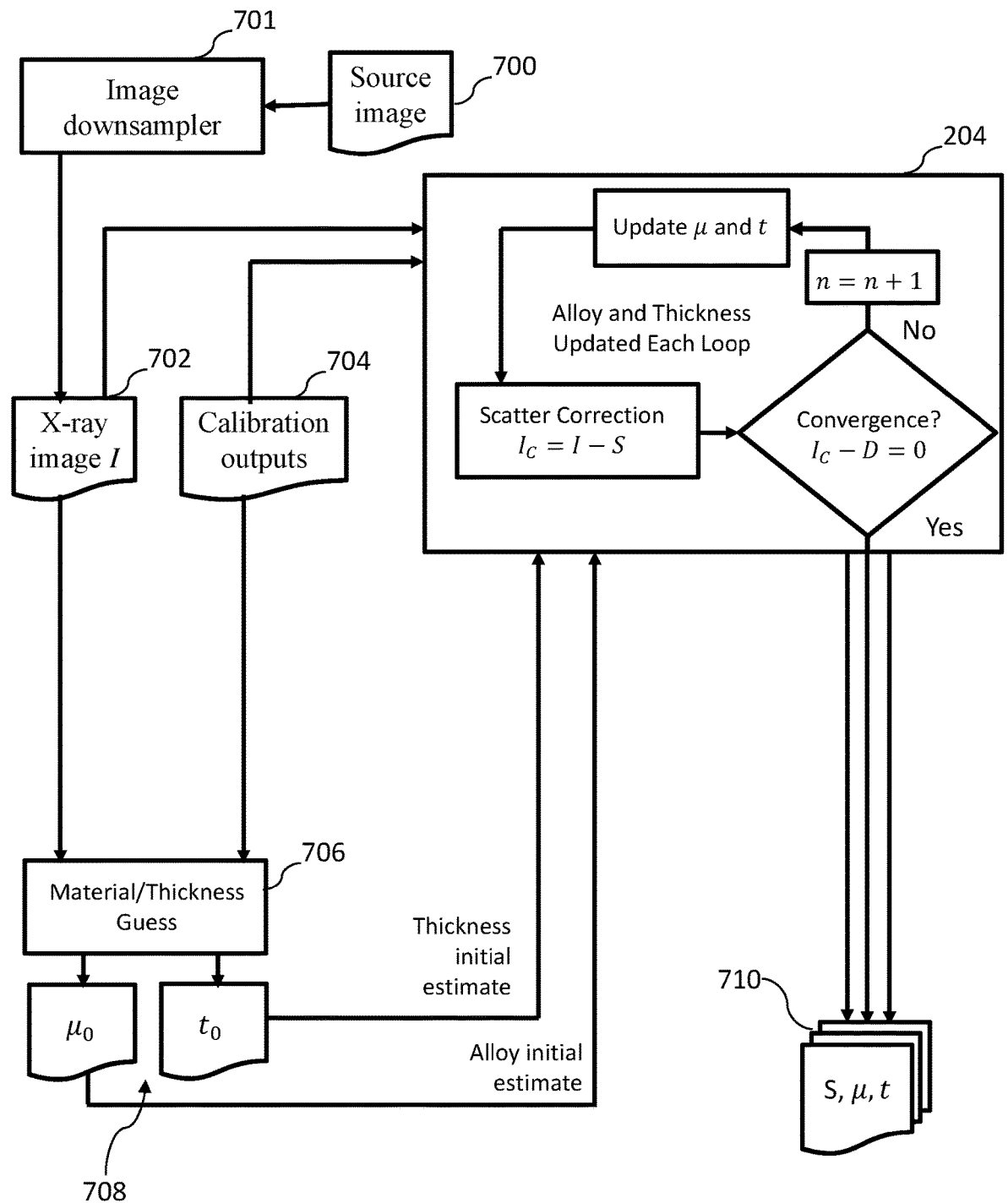
FIGS. 7A and 7B illustrate the scatter correction process in more detail.

FIG. 7A provides an overview of the process for generating and iteratively refining the tissue model in accordance with an embodiment. The process is based on an input x-ray image 702, along with the outputs 704 of the calibration process described previously, in particular the database of scatter kernels and the transfer function.

A sub-process 706 establishes an initial estimate (or guess) of the tissue model, specifically the material composition (alloy) and thickness for each voxel. Determination of the initial tissue model estimate will be described in more detail later. This produces a pair of values for each voxel, $\mu_0$ and $\mu_0$. $\mu_0$ is the alloy value characterising the material composition for the voxel and in a preferred embodiment indicates a proportion (e.g. as a fractional value or percentage) of soft tissue within the voxel (or vice versa; instead of a fractional value of one tissue type, a ratio of the two tissue types could also be specified). More generally this could indicate proportions or ratios of any two tissue or material types depending on the nature of the subject being imaged. $t_0$ characterises the thickness of the material at that voxel. The zero subscript indicates that these are initial estimates of the relevant values prior to iterative refinement of the tissue model.

Since the model assumes that the bone material is centrally located and surrounded by soft tissue, the thickness t and alloy $\mu$ together completely characterise the three layer tissue model for a given voxel (as depicted in FIG. 4). Note throughout this description the terms t and $\mu$ are used as shorthand for an array of such values, it being understood that there is one set of t and $\mu$ values for each voxel/pixel. As will be described in more detail below, the initial tissue model estimate is based on an a priori soft tissue classifier which classifies image regions based on pixel intensities.

The iterative refinement loop 204 uses the initial thickness and alloy estimates as a starting point for analysing the input image 702. As described previously, the direct beam and scatter components are estimated by simulating x-ray interaction using the initial estimated tissue model. Generation of the direct beam and scatter estimates involves translating the simulator output using the transfer function derived by the calibration process (essentially translating simulated image data into the domain of the real x-ray image data), to ensure the simulated data can be evaluated against the real x-ray data of the input image 702 (alternatively a corresponding inverse translation could be applied to the real x-ray data 702). It will be understood that the transfer function is used to enable comparison/evaluation of real and simulated image data and use of the transfer function should therefore be understood as implicit even where not explicitly mentioned.

The scatter estimate is used to perform scatter correction of the input image to produce a corrected image $I_C$. In this example, convergence is checked by comparing the scatter-corrected image to the direct beam image (indicated in shorthand as $I_C-D=0$; however, in practice complete convergence may not be achievable, and instead the process preferably tests whether the difference between the scatter-corrected image and the direct-beam simulated image is below a threshold where the threshold is determined by the estimated errors). As previously described, the convergence test may equivalently compute a complete simulated image from direct beam and scatter components and compare this (by subtraction) to the input image.

If the convergence criterion is not met, the tissue model (i.e. the $\mu$ and t values for each voxel) are updated and the loop is repeated, by regenerating the simulated direct beam and scatter components using the updated tissue model. Once the convergence criterion is met, the process ends, and the final tissue model $\mu$, t and scatter estimate S are provided as output 710.

Note that for computational efficiency, the tissue model is preferably at a lower resolution than the source image 700 acquired by the detector and thus to match the tissue model resolution the input image 702 is generated by downsampling (701) the original high-resolution source image 700. Operating at reduced resolution can significantly reduce the search space when refining the tissue model and reduces the number of elements required in the scatter kernel convolution.

Figure 7B:
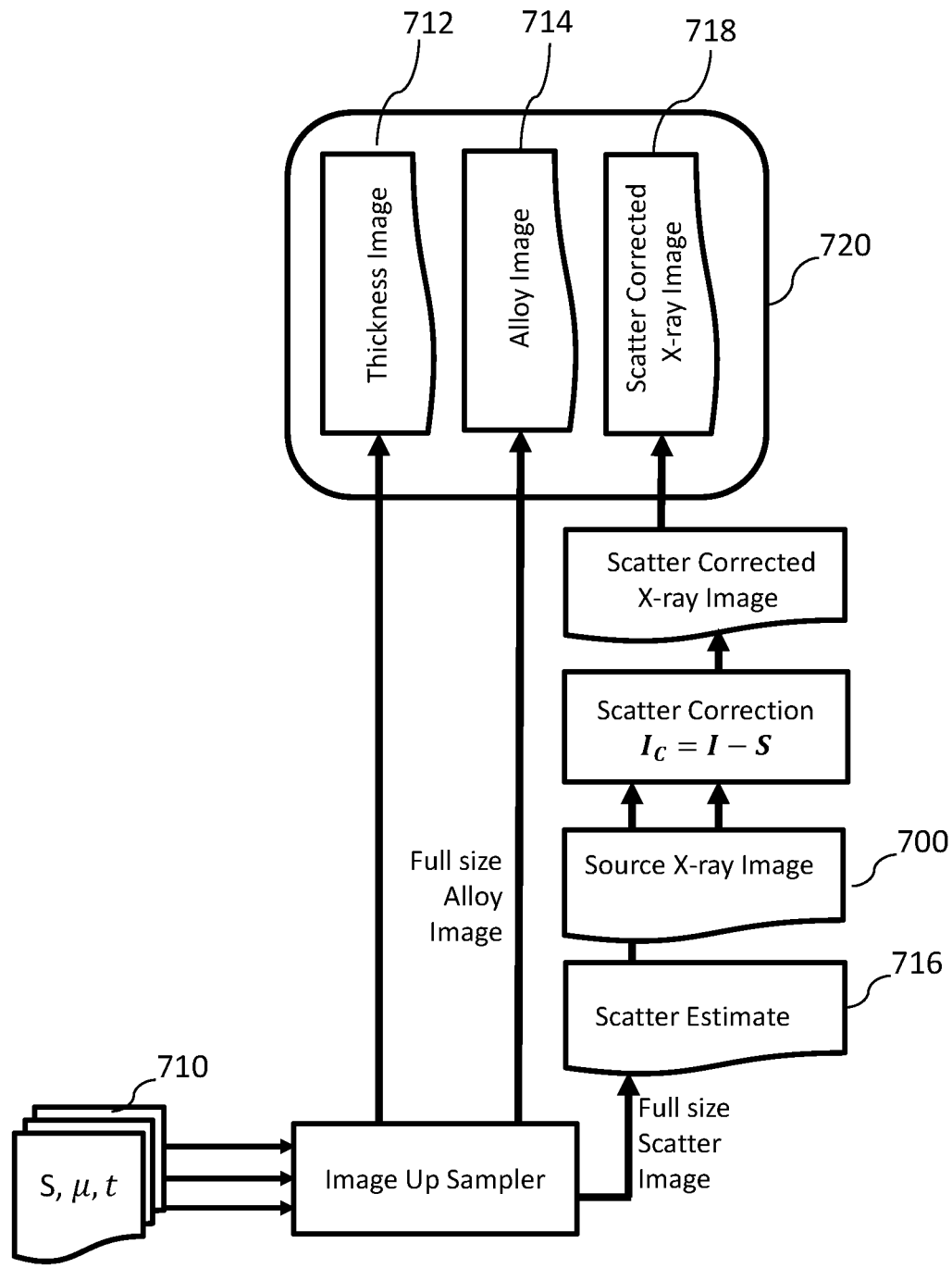

FIG. 7B illustrates processing applied to the output of the iterative refinement loop. The outputs 710 may be scaled to the original image resolution to produce full resolution thickness and alloy images (or maps) 712, 714 and a full resolution scatter estimate 716. This may be achieved by upsampling the scatter estimate and the thickness and alloy images. The upscaled scatter estimate 716 is then used to perform scatter correction of the full resolution source X-ray image 700 (by subtracting the scatter estimate from the source image), to form the final scatter corrected x-ray image 718.

In an embodiment, the alloy and thickness estimates are not simply upsampled to the full original resolution as is done to obtain the scatter estimate. The scatter estimate is a low frequency function and thus simple upsampling can be effective; however, the materials information represented by the tissue model is not generally as low frequency as the scatter estimate. Thus further post processing is preferably performed to obtain higher resolution alloy and thickness images (these need not necessarily be at the full resolution of the source image):

1. After upsampling the scatter estimate, it is downsampled to the required final resolution of the alloy and thickness images (if lower).
2. $I_c$ (the corrected image) is created at this intermediate resolution.
3. The non-implausible sets of alloy and thickness values are identified by comparing $I_c$ to a direct beam database at this resolution (as described later in relation to the generation of an updated model during the main refinement loop).
4. These sets are refined to a single estimate at each pixel using a spatial model.
5. The alloy and thickness estimates are then output at this resolution The thickness image 712, alloy image 714 and scatter corrected image 718 together form the main outputs 720 of the algorithm. These may be further processed as needed and/or output to an operator (for example, the thickness/alloy images could be used to generate colour coded scatter corrected images showing tissue density distributions or other visualizations useful to an operator).

Initial Estimate of the Tissue Model

The initial tissue model estimate—i.e. the initial set of thickness and alloy values—is determined based on a prior classification of image pixels likely to correspond to 100% soft tissue (i.e. an alloy value of 1), since these are generally easier to detect than intermediate alloy values. Embodiments may use thresholding of pixel intensity values in the recorded image to identify the regions of the image that are assumed to correspond to 100% soft tissue (on the assumption that very bright regions are likely to be 100% soft tissue). Machine vision techniques such as edge detection or neural networks may additionally be used.

Detection may also use stored data defining predetermined ranges ("non-implausible sets") of alloy and thickness values that could give rise to the recorded intensity at each pixel.

In one approach, the system can detect the thickness at particular points (i.e. x,y coordinates in the image plane), to give a constrained initial model of thicknesses. The system then uses the thickness values to infer alloy values.

Specifically, the prior 100% soft tissue classified regions are used as training data combined with the non-implausible sets obtained from comparing the image to a direct beam database (as described below). A non-implausible set is a set of all possible inputs which could give rise to what is observed, given applicable uncertainties. For example, a direct beam pixel intensity of some particular value might plausibly be caused by a range of specific tissue distributions. E.g. an intensity of 50 could hypothetically be caused by 10 cm of 100% soft tissue, 9 cm of 95% soft tissue and 5% bone, 8 cm of 90% soft tissue and 10% bone, or 1 cm of 55% soft tissue and 45% bone (note that these numbers are chosen purely for illustrative purposes and real values may differ), if only the direct beam is considered and there is zero uncertainty. If there is slight uncertainty about the observed intensity values (e.g. measurement error), and/or some uncertainty due to errors in interpolation or randomness of the simulator, then these sets could grow slightly e.g. by around +/−1 cm for a given alloy composition.

For prior-classified 100% soft tissue regions, the non-implausible sets are narrowed down by removing all thickness-alloy pairs which are not close to 100% soft tissue, producing a smaller collection of possible thicknesses which the algorithm then averages over. These thickness values are used as training points to fit a surface (referred to as a spatial model) which predicts thickness from (x,y) coordinates. This then provides an estimate of thickness for pixels which were not 100% soft tissue. For those pixels, the non-implausible sets are again narrowed down by removing all thickness-alloy pairs which are not close to the thickness estimate given by the derived surface, producing a smaller collection of possible alloy values for which an average is computed to yield the final alloy estimate.

The above process thus refines the thickness-alloy non-implausible sets to a single pair of thickness/alloy values at each coordinate, which are used as the tissue model for the initial iteration of the iterative refinement loop 204.

On subsequent iterations of the process, the same process can be repeated based on the scatter-corrected image instead of the original image (corrected using the scatter estimate determined in the current iteration) to produce a new tissue model as is discussed below.

Figure 8A:
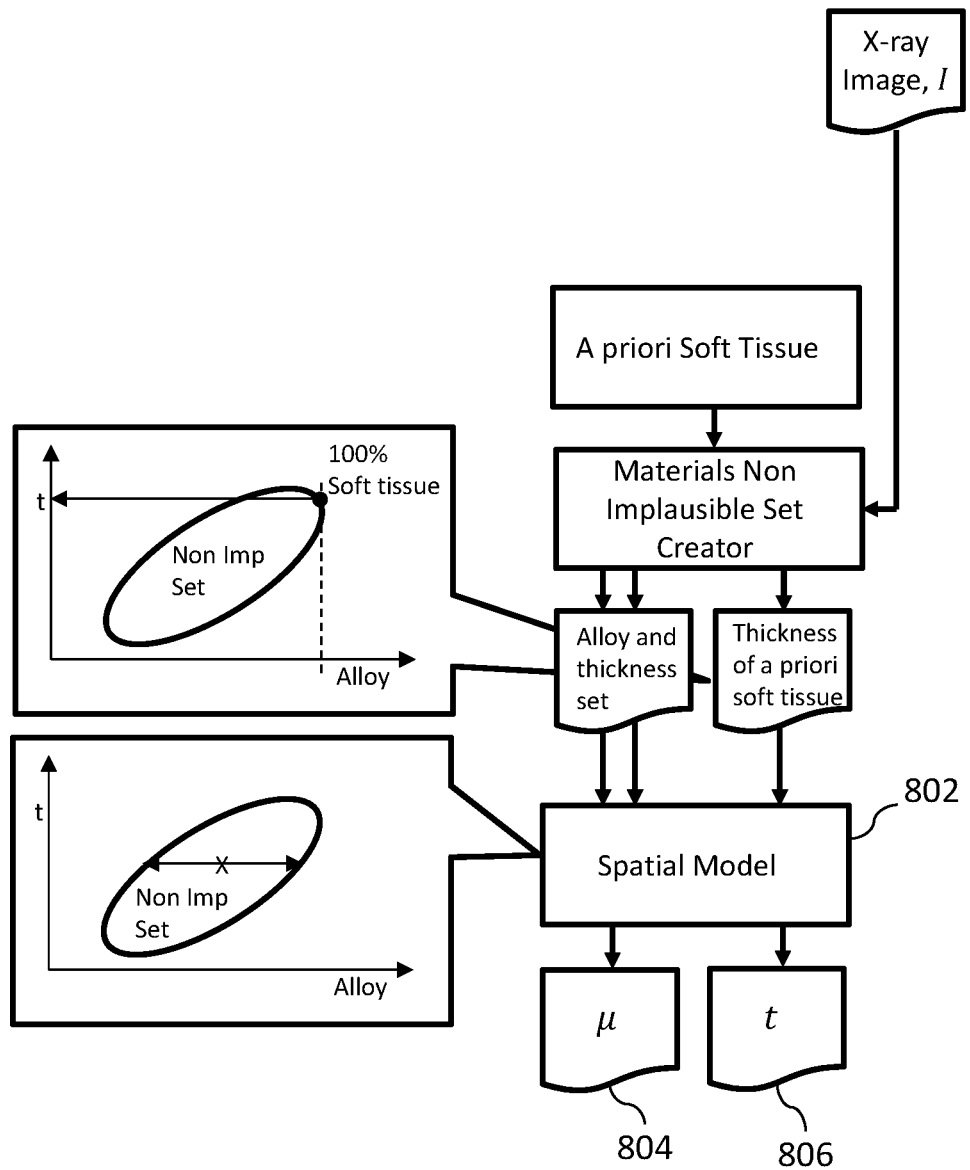
FIGS. 8A and 8B illustrate in more detail the creation and iterative refinement of the tissue model used for scatter correction.

The process is illustrated in FIG. 8A in generalised form. Specifically, FIG. 8A illustrates the creation of a tissue model for a current iteration n of the iterative refinement process. As described above for the creation of the initial issue model estimate, a spatial model 802 is obtained by constraining non-implausible sets of alloy and thickness values based on a priori classification of 100% soft tissue regions, averaging remaining plausible thickness values for 100% soft tissue pixels and fitting a thickness function to the image indicating an estimate of thickness at each pixel. From this, the tissue model comprising alloy and thickness images p 804 and t 806 are derived as previously described.

Iterative Refinement of the Tissue Model

Figure 8B:
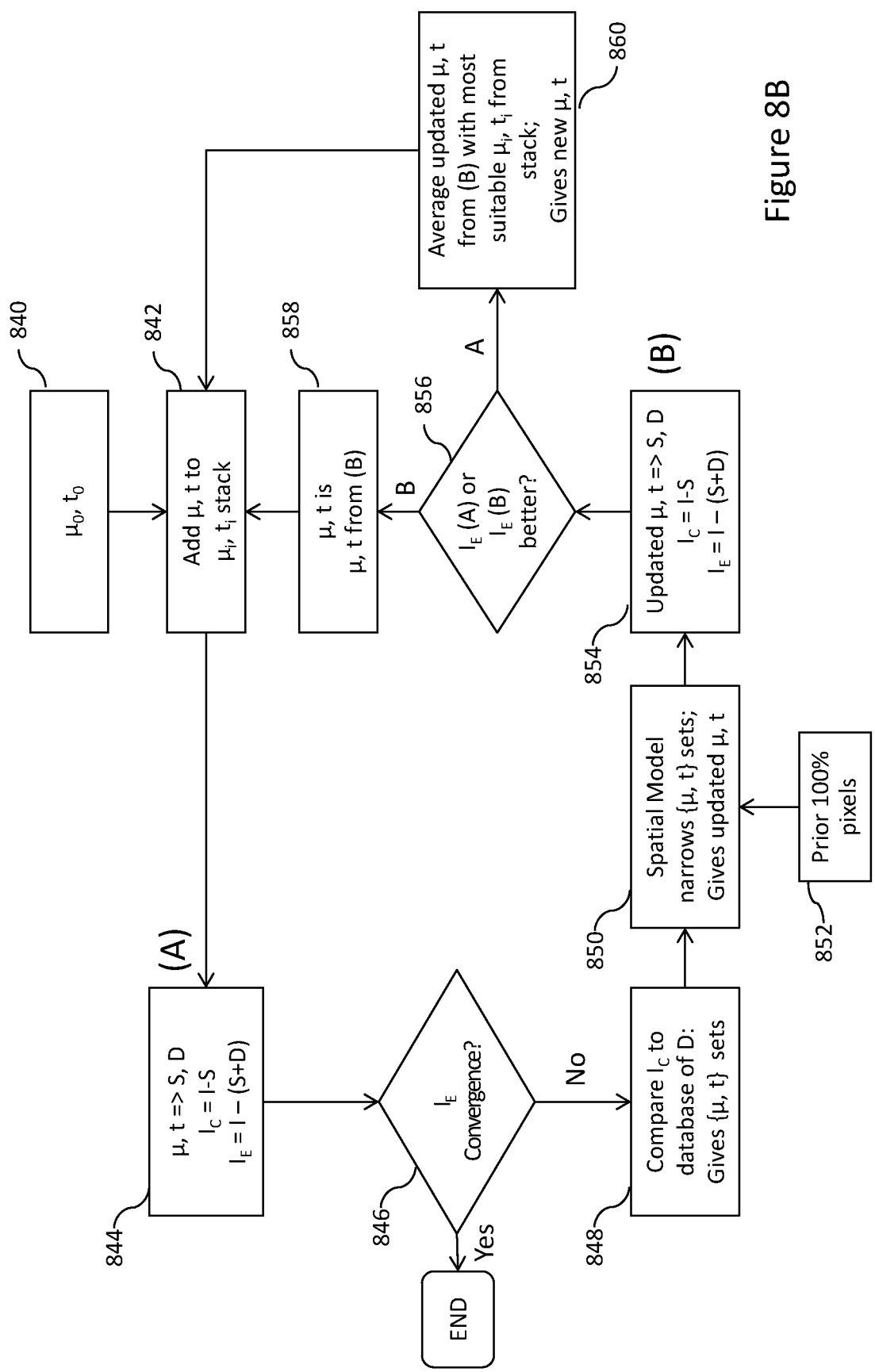

FIG. 8B illustrates the refinement loop 204 of FIG. 2 in greater detail in one embodiment. The process starts in step 840 with the initial estimate of the tissue model, i.e. the initial set of alloy and thickness values, $\mu_0$, $t_0$. The closer to the actual answer the initial estimate is, the quicker the algorithm should converge. The initial estimate of the tissue model is derived as described above and thus $\mu_0$ will contain information based on the prior-classified 100% soft tissue pixels ($\mu=1$), with non-100% soft tissue pixels having best guess thickness and alloy values.

The main loop then begins using the initial estimates $\mu_0$, $t_0$ as the current values $\mu$, t on the first iteration.

At step 842, the current $\mu$, t is added to a stack of $\mu$, t estimates. Thus on the first iteration, $\mu_0$, $t_0$ become the first entry of the stack.

In step 844, the simulated scatter image (S) and direct beam image (D) are computed by the simulator for the current estimates μ, t (this involves applying the transfer function to translate the simulation output into the real x-ray image domain). The scatter corrected real image ($I_C$) is then computed as the difference between the real source image I and the scatter estimate S. Additionally an error image ($I_E$) is computed by generating the full simulated image as the sum of the direct beam estimate D and scatter estimate S, and subtracting this from the real source image I. This error image therefore indicates the difference between the simulation output and the real image. The processing results of this step (scatter estimate S, direct beam estimate D, and corresponding corrected image $I_C$ and error image $I_E$) are collectively labelled (A) to distinguish from the alternative computation detailed below.

In step 846, a convergence test is performed to determine how close $I_E$ is to a zero image (i.e. an image having zero intensity at each pixel). The closeness may be computed as a single value error measure summarising the simulation error across the image, e.g. by summing over the individual pixel intensity values in $I_E$, which represent pixel differences between real and simulated image, to obtain a signed test statistic which is negative if the error image is predominantly negative (or positive if the image is predominantly positive). Note that alternative approaches may be used to determine the error measure. Convergence may then be determined by comparing the magnitude of the test statistic (error measure) to a threshold indicating when sufficient convergence has been achieved (though other suitable convergence criteria may be used). If the convergence criterion is met then the algorithm has converged and the iterative refinement process ends, with the system proceeding to perform post processing and produce the required outputs as described previously.

If convergence has not been achieved then the refinement loop continues. In step 848, the system compares $I_C$ to a precalculated database of direct beam (D) images and obtains non-implausible sets of μ, t at each pixel. The database of direct beam images is a stack of images of samples where for each image, the sample material corresponds entirely to a single thickness and alloy pair and thus each image shows how the intensity of the associated direct beam varies across the detector. Recall that this is not the same value at every pixel because each pixel has its own transfer function. This database is generated by computing simulated output for a direct beam over different thickness and alloy combinations and then applying the transfer function to each pixel of the resulting images.

In step 850, the prior-classified 100% soft tissue regions 852 are used to narrow down thickness estimates t for those pixels to those thicknesses which correspond to μ=100%. The prior classified soft tissue regions 852 are those originally identified based on pixel classification of the input image (though in other embodiments the classification could be updated at each iteration of the algorithm). This produces a small set of possible thickness values, and the system computes an average of the possible thickness values to obtain a thickness estimate at these 100% soft tissue pixels. The system then fits a thickness surface using the 100% soft tissue pixels as training points. This provides an estimate of thickness at all pixels and is referred to the spatial model. The system then narrows down the alloy values μ of non-100% soft tissue pixels by constraining on the new thickness obtained from the derived thickness surface of the spatial model. This results in constraining the μ, t values sets at every pixel down to a single μ, t pair, thus yielding an updated tissue model μ, t for the whole image. The process of steps 848-850 thus mirrors the creation of the initial tissue model, but applied to the current scatter-corrected image $I_C$.

In step 854, the process computes S, D, $I_C$ and $I_E$ for this updated set of μ, t estimates, in the same manner as already described for step 844. This alternative result set is labelled (B) to distinguish it from the result set (A) produced by step 844.

At this stage, there are therefore two error images $I_E$ produced by this iteration, one produced using just the μ, t from the stack as computed at 844, label (A), and one that used the output of the spatial model as computed at 850, label (B).

The results of the alternative computations are compared at step 856, by determining which of $I_E$ (A) and $I_E$ (B) is closer to the convergence threshold (in terms of the derived error measure). If the new result $I_E$ (B) is better (lower magnitude error measure, meaning the error measure is closer to zero or closer to the threshold), in step 858 the process selects the μ, t determined at step 850 (B) as the new current μ, t values for the next iteration, and the process continues from step 842. Note on subsequent iterations of the loop, calculation time in step 844 can be saved since S, D, $I_C$ and $I_E$ have already been computed at step 854 and do not need to be computed again.

If, on the other hand, step 856 determines that $I_E$ (A), the original error image, is better (has a lower magnitude error measure), then the μ, t values from the spatial model calculation in step 850 (B) gave worse results. Nevertheless, in order to improve the materials information represented by the tissue model in some way, the system then averages the μ, t estimates of alloy and thickness from (B) with the best previous estimate (from previous iterations), which should be expected to lower the convergence test statistic (error measure). Specifically, the algorithm then averages the μ, t values from the output of the spatial model computation 850 with the μ, t entry from the stack which has the lowest error measure of the opposite sign (compared to the sign of the corresponding error measure for (B)) in step 860. This produces a refined tissue model μ, t for the next iteration, and the process continues as before at step 842 by adding the newly generated, averaged μ, t values as a new entry to the stack. However, in this case, the computations at step 844 cannot be skipped, since results for these newly derived μ, t values are not already available.

The stack thus tracks past μ, t estimates, and the best past estimates are used to correct the spatial model based estimates (B) when these fail to improve the simulation results. The process iterates in the above manner until convergence is reached in step 846 (e.g. until the absolute value of the error measure falls below the convergence threshold).

Note, in the above description, μ, t generally designate arrays of alloy and thickness values for the whole image (in other words, μ, t correspond to alloy and thickness images), though depending on context these terms may also refer to individual pixel μ, t values.

Composition-Guided Post-Processing

The following sections describe techniques for processing x-ray images to generate enhanced images. The described techniques are suitable for processing of x-ray images generated in a range of clinical radiography applications, for example, digital radiography, computed tomography and digital mammography. The various enhancement processes assume that compositional information about the sample is available. This is possible e.g., via materials composition/scatter modelling and calculation, which produces scatter and material thickness/alloy estimates, for example using the methods described above. However, the compositional information may alternatively be acquired using alternative algorithms or through other means. The described techniques typically do not require perfect compositional information, but instead can operate with estimates of compositional information and are tolerant to a degree of error in those estimates.

Figure 9:
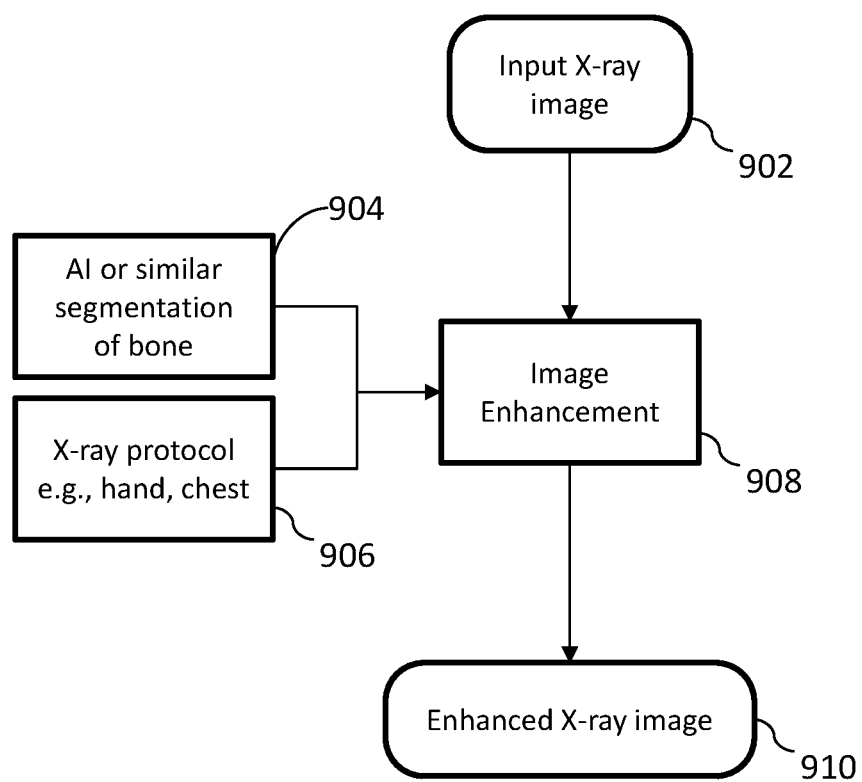
FIG. 9 illustrates an image enhancement process in overview.

A variety of post-processing techniques may be applied to enhance X-ray images, for example to improve contrast in particular regions, highlight features of interest etc. and enable improved diagnostics. FIG. 9 illustrates an image enhancement process in general terms.

The enhancement process starts from an input x-ray image 902. This may be e.g. the source image acquired by the x-ray detector (700) in unprocessed form, or may be derived from the source image using conventional pre-processing operations. For example, the image may have had standard dark and gain corrections applied, but no further enhancements.

The enhancement step 908 typically involves applying non-linear enhancements (e.g. Look-Up Tables (LUT), contrast enhancements, unsharp mask etc.) to the source image 902. As used herein, an LUT is typically in the form of a lookup table defined across the range of possible pixel intensity values that maps original image intensity values to new intensity values to implement some transformation.

The enhancement process may receive additional inputs such as image segmentation information 904 which defines a segmentation of the image into distinct regions (e.g. identifying regions of particular composition such as bone and soft tissue, possibly divided into additional distinct soft tissue types). The segmentation information (which may be generated using a suitable segmentation algorithm, e.g. AI-based) can be used to refine image enhancement for particular regions, e.g. bone regions. Further refinements can be made to the image enhancement process depending on the x-ray protocol 906 in order to optimise diagnostic image quality. The X-ray protocol may define the nature of the subject (such as body region, e.g., chest, pelvis, limb), orientation (lateral, anterior, posterior), whether or not a collimator is present, and any other relevant imaging or detector configuration parameters.

The enhancement processing outputs an enhanced X-ray image 910 for a clinician to view and perform clinical diagnosis.

Figure 10:
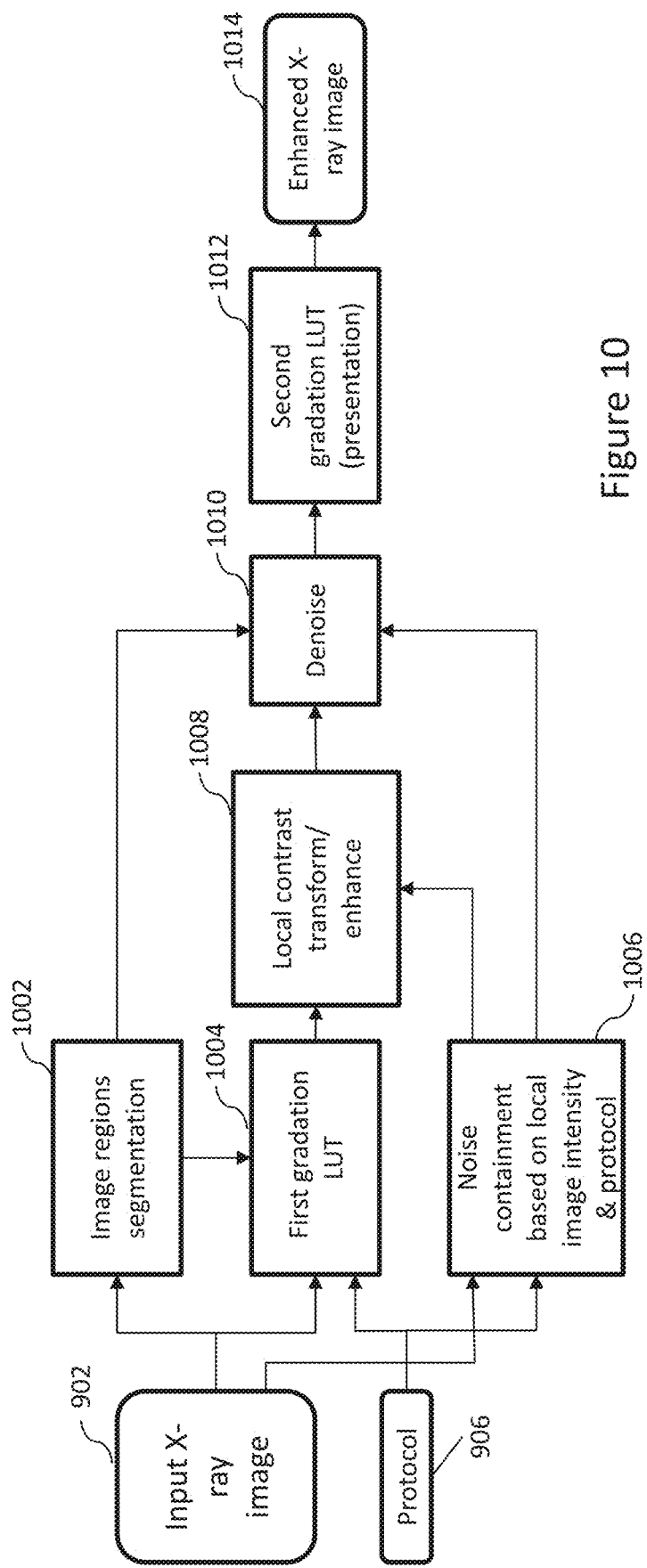
FIG. 10 illustrates an example of an image enhancement process employing a pipeline of processing operations.

FIG. 10 illustrates a more concrete example of an image enhancement pipeline in accordance with an embodiment. Here, again the input x-ray image 902 is provided as input along with X-ray protocol 906. Image segmentation process 1002 segments the image into regions. A first gradation LUT is applied in step 1004. Noise containment processing is performed in step 1006. Step 1006 does not involve direct processing of the image 902 itself but instead involves determining appropriate parameters that may be used to help prevent excessive noise amplification in the contrast enhance process 1008 (and similar structure boost processes). While the image itself is not directly processed (altered) in this step, the parameter determination still involves analysis of the image to determine how susceptible it will be to noise amplification. The resulting containment parameters act like an inhibitor to contrast enhance, which places an upper limit on the amount of contrast enhance that can be achieved.

Parameters determined in step 1006 can also be used to drive denoise image processing 1010, which seeks to remove noise that is either already present in the image 902 or has appeared due to noise amplification. This can be useful because, like noise containment, denoise trades noise for local contrast. In an embodiment, step 1010 uses compositional information as well as segmentation but also uses governing parameters that have been derived in step 1006. These might be influenced by e.g., the degree of noise containment and therefore the expected amount of denoise required. The protocol might also influence the upper/lower bounds to the strength of denoise.

The contrast transform/enhance operation 1008 may e.g. comprise a method as described in Burt, P. and Adelson, E., 1983, "The Laplacian pyramid as a compact image code", IEEE Transactions on communications, 31(4), pp. 532-540; or Stahl, M., Aach, T., Buzug, T. M., Dippel, S. and Neitzel, U., 1999, "Noise-resistant weak-structure enhancement for digital radiography", Medical Imaging 1999: Image Processing, 3661, pp. 1406-1417.

After the local contrast transform 1008 and the denoise operation 1010 are performed, a second gradation LUT is applied in step 1012 to generate the final enhanced x-ray image 1014.

Note that in some situations, the denoise operation may be implemented earlier, e.g. at the start of the process, for example being performed directly on input image 902 prior to steps 1002/1004. Thus, denoise may happen at different stages of the pipeline either removing random noise before enhancement (and hence noise amplification) or as a "tidy-up" measure after enhancement (or even both).

More generally, the order of the operations shown may be adapted to particular situations and requirements.

The enhancement processes above rely only on the source image, a segmentation derived from the source image, and the x-ray protocol to generate an enhanced image.

Preferred embodiments of the present invention additionally use compositional information of the subject being imaged to perform composition-guided post processing. Compositional information may include information directly defining composition, such as thickness and/or alloy information as previously described, as well as information that is indirectly indicative of composition, such as a scatter estimate. Many image processing operations may be adapted to use composition information; for example, any of steps 1002, 1004, 1006, 1008, 1010 and 1012 could be driven by scatter and/or materials composition information (e.g. alloy/thickness), in addition to the depicted inputs.

The composition information may be obtained as the output of a composition-based scatter correction algorithm, such as the one described previously. Use of the scatter correction algorithm previously described may be particularly convenient, since compositional information is generated as a by-product of that algorithm, in the form of the μ (material alloy fraction) and t (material thickness) data, also referred to above as the alloy image and thickness image or collectively as the tissue model. The scatter estimate (or scatter image) output by that algorithm may provide an additional form of compositional information (as it provides indirect information on the composition of the object being imaged).

Additionally, the scatter-corrected output image of the scatter-correction process may be used as the basis for the input image (e.g. 902) for the enhancement processes to be described.

However, it should be noted that use of the scatter correction algorithm is not essential, and compositional information for use in the enhancement processes can be obtained in any appropriate manner, including by way of alternative algorithms.

In particular embodiments, the enhancement process involves creating a composition-derived input image that is further corrected and enhanced by composition-guided post processing (CGPP) operations.

Figure 11:
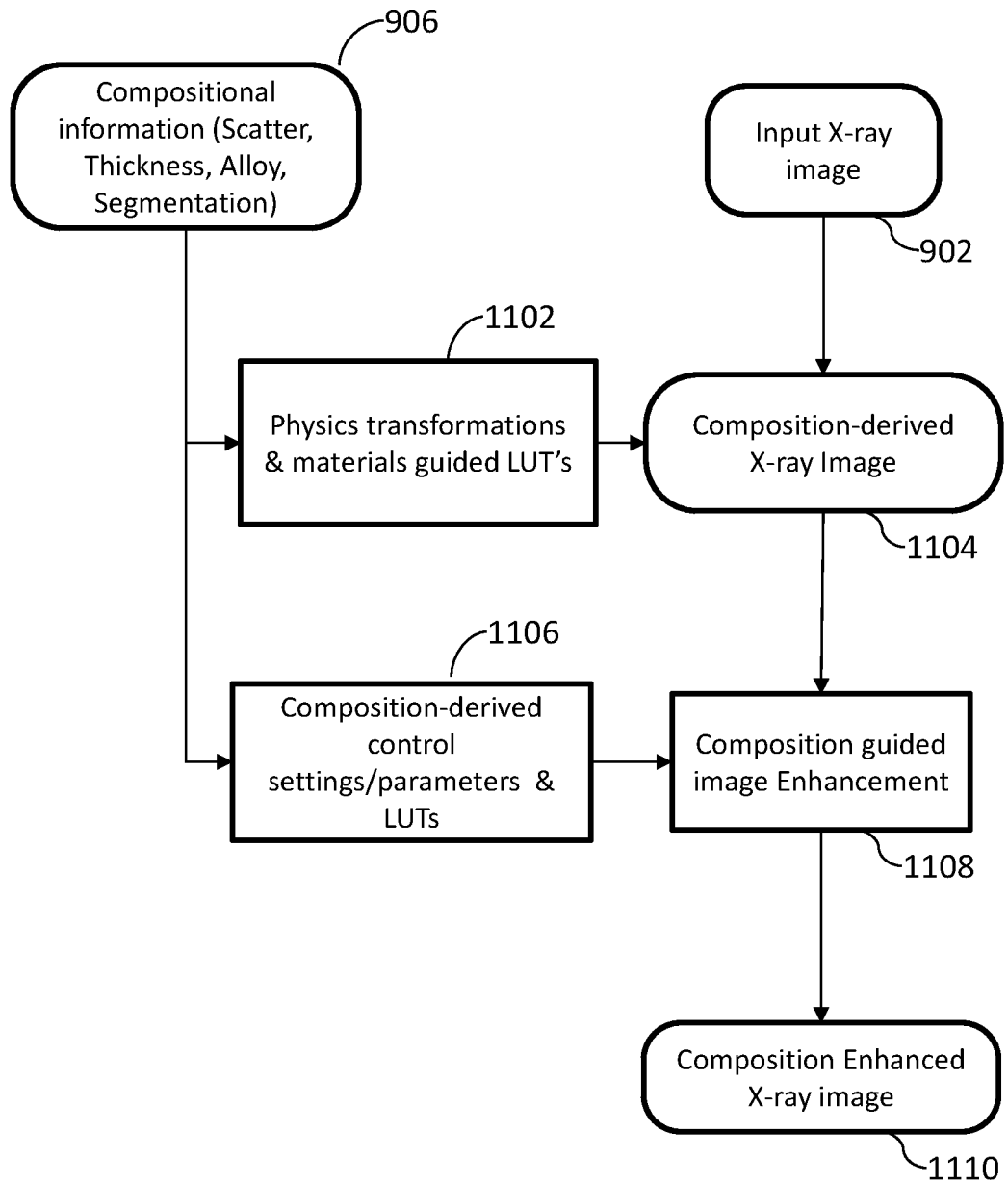
FIG. 11 illustrates a two-stage processing pipeline employing compositional information to control enhancement processing.

A composition-guided enhancement method is shown in overview in FIG. 11. In addition to the input x-ray image 902, the process receives as additional input compositional information 906, where compositional information is considered to broadly encompass any information that is representative of physical characteristics of the object being imaged, such as material composition, shape/physical extent, three-dimensional structure etc. Typically, the composition information may take the form of any of, or any combination of:

Scatter information,
Thickness information,
Alloy information,
Segmentation information Note the scatter information may be in the form of the scatter image (e.g. scatter estimate 716, see FIG. 7B) generated by the scatter correction algorithm (and which is subtracted from the input image to produce the scatter-corrected image). This therefore specifies the scatter contribution to the input image and as such provides indirect information on the composition of the image subject. The thickness and alloy information are preferably the thickness image (712) and alloy image (714), after upscaling to full image resolution (though alternatively the lower resolution data 710 could be used for any of S, µ, t).

The composition information may be pre-processed before being used for enhancement. For example, a combination of thickness and alloy data may be used to create bone (or other material) thickness data (e.g. as (1−µ)×t; again this could be generated as an "image" corresponding to the x-ray image plane with one value per image pixel). The bone thickness data could in turn be combined with bone intensity segmentation information. Other transformations could be used e.g., a region-based non-linear conversion according to bone and soft tissue regions. This might take the form of an exponential function that relates absorption to attenuation constants such that the thickness and alloy information are converted into a correction factor suitable for applying directly to the compositional image at some point in the CGPP pipeline. Similar transformed data may be applied as linear blend factors.

The segmentation information is generated by a suitable segmentation process from the source image, as described in more detail below.

The enhancement itself in this example proceeds in two stages. Firstly, one or more transformations 1102, e.g. physics transformations and/or material-guided LUTs, are applied to the source image 902 to produce the composition-derived x-ray image 1104. Generally speaking, the composition-derived X-ray image results from alterations applied to pixel data of input image 902, driven by the materials/physics transformations 1102. However, in some examples described later the composition-derived image may be derived only from compositional data 906, without use of the input image 902 (though the compositional information will have itself been derived from the x-ray source image when using the previously described scatter correction algorithm).

The modified version of the input X-ray image 902 obtained in the first stage is typically generated only using primarily global operations like LUTs and pixel-wise operations (multiply, divide, etc.) Generation of these images generally requires direct (e.g., thickness, alloy) or indirect (e.g., scatter) compositional information. The resulting image is often not directly suitable for direct viewing by a trained radiologist, but contains important modifications that relate to physical properties of the subject being imaged.

An example is a scatter-to-primary ratio (SPR) image derived from scatter information, for example obtained as SPR=S/(I−S) where S is the scatter estimate determined by the scatter correction algorithm and I is the input image 902. The SPR image can provide, in effect, an inverted representation of bone/tissue absorption in comparison to the scatter-corrected image I−S. However, other forms of composition-derived image may be used (e.g. a scatter fraction image SF=S/I, which provides a representation of bone/tissue absorption). Note that where computations are specified as above in relation to images (e.g. SPR, I, S) those computations are typically applied across the whole image on a pixel-wise basis.

In a second stage, one or more composition-guided enhancement operations 1108 are applied, for example using composition-dependent control parameters and LUTs 1106. The image enhancements can include standard and non-standard image enhancements that are adapted to use compositional information to determine one or more control parameters that control the enhancement that is performed or how the enhancement is applied. The control parameters may include LUTs, filter settings, blend coefficients (e.g. linear blend coefficients) etc. Example enhancements that can be controlled by these parameters could include e.g. noise amplification containment, strategic scatter subtraction, contrast enhancement etc. Various concrete examples of enhancements are described further below.

The parameters and LUTs 1106 driving enhancement are derived from the compositional information 906. For example, an SPR image produced in step 1104 can be enhanced by a thickness correction method wherein a combination of material thickness and segmentation from 906 are applied.

Terms such as "material guided/based" or "composition guided/based" as used herein preferably refer to the fact that one or more parameter(s) or value(s) used in the processing (e.g. a configuration setting for an enhancement algorithm, selection of a LUT, or individual LUT values) are determined at least in part based on the compositional information 906.

The output of the enhancement stage 1108 is a composition-enhanced x-ray image that can offer clinical benefits over and above the standard image, such as protocol and/or materials-specific enhancement of tissue structure (e.g. vascular, connective, bronchial granuloma), bone features (e.g. spinal pedicles, articular surfaces), and implants (e.g. bone/cement/tissue interfaces). The enhancement process may target human assessment (such that the image becomes more suited to clinical assessment) or AI (artificial intelligence) engines. For the latter case, the image may be enhanced very differently than standard clinical images in order to maximise information relating to materials based anomalies.

Note that specific embodiments may implement both processing stages or may implement only particular parts of the described process. For example, while in the described approach, composition-guided enhancements are applied to composition-derived x-ray image 1104, alternatively, composition-based image corrections/enhancements can also be applied to standard X-ray intensity images, e.g. directly to input image 902.

Image Enhancement Processing Pipeline

The general approach described above may be expanded to a potentially complex processing pipeline involving a number of different operations.

Expanding on the details provided above, inputs to such a processing pipeline may include.

System properties, such as system calibration data and the collimation region

CGPP modality/imaging objective, e.g. defining the clinical setting/purpose

X-ray protocol

Input X-Ray image (I)

Compositional information relating to the shape and/or material composition of the image subject, such as scatter estimate (S), material thickness data (t) and/or material alloy data (p)

Segmentation and spatial properties, e.g. identifying soft tissue/bone/collimator/open beam pixels and/or scattering regions The following are examples of composition-guided processing steps that may be combined (in any suitable selection and order) to form an image processing pipeline for x-ray image enhancement, based on any of the above inputs:

Materials-based contrast enhancement: Apply non-linear alteration of contrast coefficient derived from multi-spectral decomposition of image. Can be combined with composition-driven blending for strategic noise and contrast management. Operates on local contrast regions.

Materials-based contrast normalisation: Perform global (possibly multi-spectral) gain corrections based on materials thickness/alloy compositional information. Associated materials information is locally varying.

Regional based processing e.g., scatter vs non-scatter regions: Control image enhancement processes within local regions, depending on bone/tissue segmentation, collimation and open beam information.

Materials-driven image blending. Combines two or more composition-based images according to linear combinations driven by local materials blend factors.

Materials-driven data fitting: Adjust global image pixel values depending on materials alloy/thickness information.

Materials/scatter driven noise management: Inhibit noise amplification and/or perform noise reduction on strategic local regions and within multi-spectral layers depending on local scatter and/or materials properties.

These processes may determine their output using any available composition data, including scatter estimate, thickness and/or alloy data e.g. as output by the previously described scatter correction method.

Figure 12:
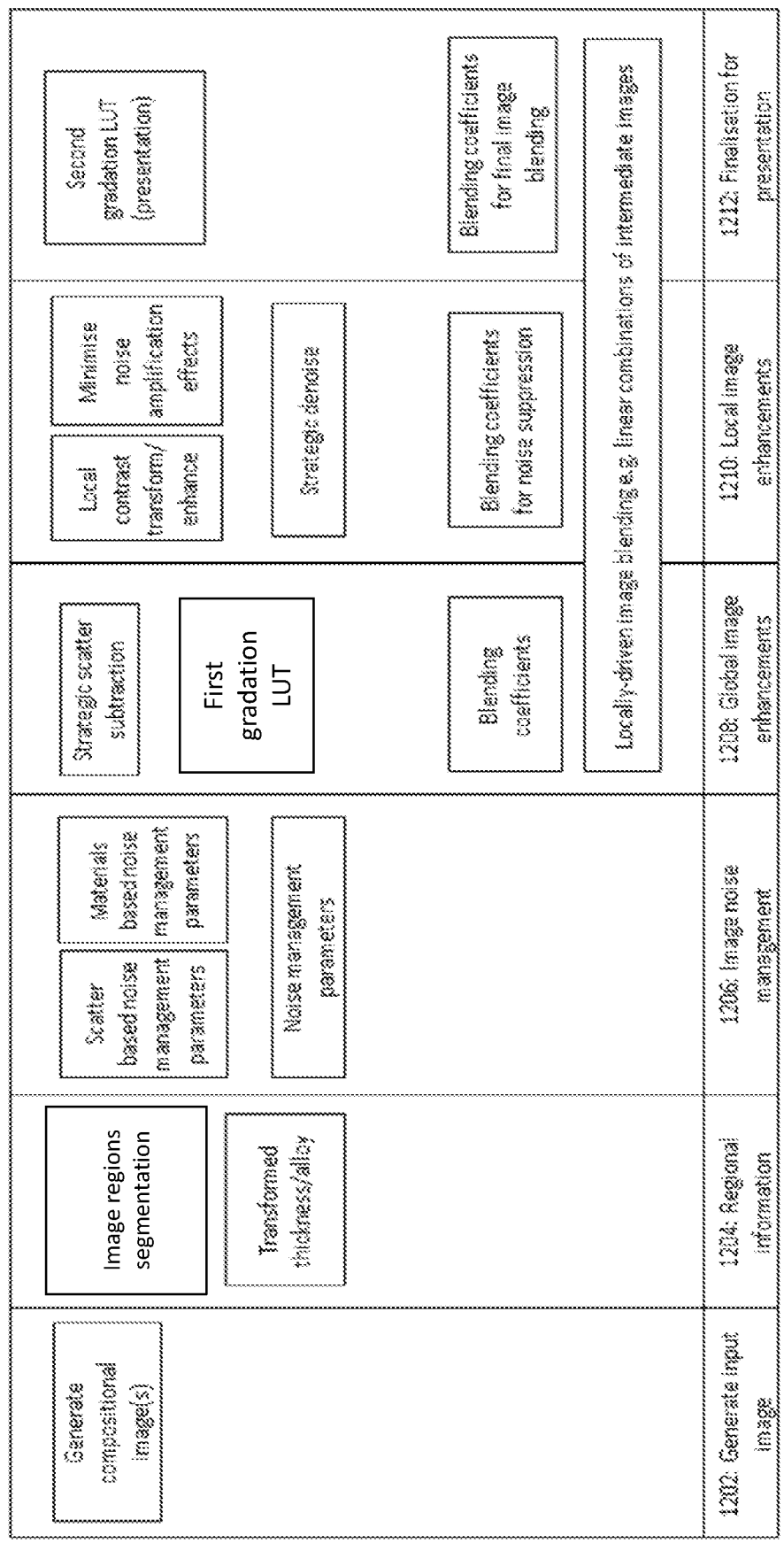
FIG. 12 illustrates operations that may be employed in an image processing pipeline.

FIG. 12 illustrates a processing pipeline in more detail, illustrating a range of possible operations arranged in different processing stages (proceeding from left to right), based on the above-described inputs. Any of these processing operations may be controlled based on composition information, though particular implementations may only implement a subset of the described operations and/or may implement some operations in a composition-guided form whilst implementing others in a more conventional form without control based on composition information. For example, in an example described below, image segmentation is performed without the use of composition information.

The process starts in stage 1202 with generation of a composition-derived image as the input image, where a "composition-derived image" is an image that is generated at least in part based on composition data (and in many cases but not necessarily in part based on the source x-ray image). It will of course be noted that, when using the described techniques, the composition data (in the form of alloy and thickness images) is itself derived from the original source x-ray image. Examples of composition-derived images can include:

Strategic scatter correction $I-f(S)$ where $f( )$ is a composition guided transform, I is the input image and S is the scatter image (where f is omitted this reduces to the ordinary scatter corrected image I−S as previously described)

Scatter to primary ratio (SPR)

$$SPR = \frac{S}{I-S}$$

Bone equivalent thickness (BET): $BET=t*(1-\mu)$

Tissue equivalent thickness (TET): $TET=t*\mu$

The last two examples thus only indirectly depend on the input image (since t, μ were derived from it).

Stage 1204 may involve regional processing such as image region segmentation, and transformations of the thickness and/or alloy data (alternatively, the segmentation may have been performed in advance/by a separate process).

Stage 1206 performs noise management, with noise management parameters optionally determined based on compositional information (e.g. based on the scatter estimate, thickness and/or alloy data).

Stage 1208 implements global image enhancements (e.g. applying a gradation LUT, scatter subtraction etc.)

Stage 1210 implements local image enhancements. This may e.g. involve applying processes such as filters, transformations or other enhancements in a variable manner across the image, with the processes controlled locally in a particular area of the image based on the local composition information defined for that area. For example, control parameters for a filter or other enhancement applied at an image pixel location may depend on composition data (such as S, t and/or μ values) at that pixel location and/or at adjacent or surrounding pixel locations. As a concrete example, a denoise filter may be applied that is dependent on local composition data e.g. to vary the amount of noise removal performed based on the composition data.

In stage 1212 the final output image is generated (including any final processing operations such as a further gradation LUT). Outputs may be in the form of one or more enhanced composition-derived X-ray image(s) for standard or non-conventional clinical presentation.

Generation of the output image may include other post-processing steps e.g. in relation to adapting the image presentation format.

As depicted, several of the processing stages may include blending operations in which any of the input image and/or intermediate processed images are combined to produce a further intermediate image or the final image. Such a blending operation may be performed using blending coefficients that are determined (e.g. selected or computed) based on compositional information. Blending is discussed in more detail below.

The pipeline features and their associated configuration parameters are preferably determined by the available inputs, for example by compositional image type, protocol and clinical purpose. Thus, different processing stages/operations may be implemented for different source images and in different situations.

While particular operations are shown in particular processing stages, this is by way of example, and processing stages may be arranged differently.

The following sections discuss some of the potential pipeline stages and operations in more detail.

Segmentation

As mentioned previously, embodiments may implement a segmentation algorithm to segment images into regions. The regions (or pixel classifications defining regions) may typically include:

Bone regions
Soft tissue regions
Collimator regions
Open beam regions

"Open beam" pixels are those that correspond to ray paths that do not pass through the subject being imaged. Collimator pixels are detector pixels outside the beam as defined by a collimator included in the imaging system. The collimated region may still allow a small number of X-rays to pass and so this region tends to contain weak contrast information that should be discounted by the image processing pipeline. Note the specific region types used may be varied depending on requirements and application domain.

Various known approaches may be used to perform segmentation, including, for example:

Direct human input to identify regions;
Direct thresholding based on pixel values and statistical algorithms such as the Otsu method for thresholding. These are often not adequate on their own for clinical X-ray images but can form part of more elaborate methods;
Segmentation algorithms that combine thresholding with morphological processing such as dilation/erosion and region growth algorithms. This approach tends to be tuned for specific body regions. An example for an approach optimised for chest X-ray images can be found in Vital et. al, "Robust pulmonary segmentation for chest radiography, combining enhancement, adaptive morphology and innovative active contours", Res. Biomed. Eng. vol. 34 no. 3 Rio de Janeiro July/September 2018 Epub Sep. 13, 2018, available at: http://www.scielo.br/scielo.php?pid=S2446-47402018005012103&script=sci_arttext;
Supervised learning algorithms and neural networks. Such AI algorithms are typically trained using pre-labelled images (e.g. labelled by a human expert) in order to learn how to segment similar images.

Different approaches may be combined to identify different regions. For example, an embodiment may use either direct human input or a neural network model for collimator detection, and another neural network model for bone/tissue/open beam segmentation of the remaining image regions.

An advantage of using both segmentation information and composition information in the described techniques is that the compositional data (e.g. thickness, alloy) is not binary but instead provides continuously variable estimates of material properties. This data can be combined with segmentation information defining distinct regions to produce variable weightings that drive enhancement algorithms. An example would be the blending coefficients that can vary across the image field and control the degree of locally applied enhancement(s) as a function of: material region (e.g., bone/soft tissue), material property (thickness, alloy) and image quality goals such as local contrast vs. noise amplification.

Global Image Correction (1208)

Correction of the composition-derived image at the macro scale can enable more consistent visibility of subtle contrast features appearing between different materials interfaces— e.g., cardiovascular structures superimposed with more dense tissue organs such as the heart, or with bone structures such as rib bones and spine vertebrae. This can be especially useful for composition-derived images.

As described previously, gradation operations may be employed at various points in the processing pipeline. Gradation refers to a process that grades the colour (or in this case grayscale/intensity values) of an image as a whole so that it matches some reference appearance. For colour gradation, this typically involves matching the hues and colour shifts to a printing process or display device; but in X-ray imaging it generally refers to matching the intensity grayscale variations to look similar to images captured using traditional film. This involves modelling the film intensity absorption to density (i.e., the amount of opacity in the film vs exposure) and recreating this with a digital image. The process can be implemented by way of a global pixel-wise LUT that is mostly linear but with curved tails (i.e., an s-curve) and where the central point of the linear part is offset so that the density has similar mean brightness to the film x-ray.

Known gradation techniques can be adapted to use composition information and utilised in novel ways, for example:

To enhance composition-derived images
Gradation is based on look up tables (LUTs) derived from coefficients, which themselves may be optimised based on compositional information
The standard gradation method typically emulates intensity-density response of non-linear film media but can be applied for use in digital enhancement techniques to calibrate subsequent enhancement steps
For non-standard composition-derived images, gradation is adjusted accordingly. For example, the SPR image may be processed using a specific LUT that restores the global appearance of tissue and bone density variations while preserving the high contrast regions unique to this image type.

In one example, a gradation enhancement operation may be implemented whose LUT is influenced by alloy/thickness information (in addition to segmentation information). This could enable improved bone and/or soft tissue visibility and generation of an improved input image for contrast enhancements. Such an enhancement could be combined with spatial blending.

Local Image Enhancement (1210)

Local enhancements include noise containment and/or denoise, strategic scatter subtraction, contrast (edge) enhance and materials normalisation algorithms. These seek to achieve the best compromise between signal-to-noise ratio—especially the general appearance of X-ray image density in relation to soft tissue and bone composition—and the local contrast-to-noise ratio for specific regions. The following provide specific examples.

Strategic Scatter Subtraction:

Weighted subtraction of the scatter estimate according to local conditions (e.g. as specified by local compositional information)
Since subtraction of the local estimated scatter incurs a decrease in the local signal-to noise-ratio, variable weighted subtraction can be employed to minimise this effect for regions where the expected gains of scatter subtraction are less important
One example is to inhibit scatter subtraction for regions where detector counts are already low However, knowledge of bone/soft tissue alloy (or density) and SPR information can also be used to modify this weighting. This can be useful when optimising composition-derived images Materials-Based Normalisation:
An example of such a correction is bone or tissue thickness gain correction that normalises variations due to bone or tissue thickness This can be applied as some modification of the raw thickness t returned by the scatter-correction algorithm: f(t: x1, x2, . . . xn) where x1, x2, . . . xn are coefficients driving the modification function f. For instance, x1, x2, . . . xn may control a global LUT that amplifies/compresses specific ranges of t Prior knowledge of the scattering centre locations can also be beneficial here as a segmentation weighting of thickness correction Similarly, bone density, alloy correction or some combination of these may also be used to derive correction factors (e.g. using a function that relates absorption to attenuation to derive correction factors for different bone/tissue types as described previously).

Scatter-Driven Denoise:
This method estimates how much random noise should be subtracted from the image depending on the local SPR conditions For example, regions of high SPR receive a higher weighted noise subtraction than regions of lower SPR The precise SPR/weighting behaviour can be defined by a LUT Compositional information can be further utilised to preserve material edge information by modifying the weights in those regions The LUT can be further influenced by e.g., X-ray protocol and thickness/alloy composition Actual noise weighting can be done by several methods e.g., within an image containing band-limited content derived from a multiscale transform.

Denoise May be Implemented as Follows:
1. Generate a noise estimate using an appropriate high-pass filter (e.g. the top level of the Laplace pyramid as might also be used for contrast enhancement, where multi-scale processing is employed)
2. Derive a matrix of denoise weightings that determine how much will be removed from each noise estimate pixel
   a. The denoise weightings can be generated by many methods; one approach uses composition information so that the weights are influenced by the scatter (and hence composition) properties of the sample. This has the advantage of allowing strategic denoise according to the direct physical properties of the sample rather than indirect properties such as absorption or edge information.
   b. The SPR is used to derive the denoise weightings. This includes smoothing filters and clipping of outlier values
   c. The denoise weightings are normalised to the range [0 1]
3. Denoise is performed by multiplying the noise estimate by the denoise weightings. This is applied only to the top pyramid level, which contains mostly noise and weak edge detail. This can remove some of the high frequency edge detail at the same time. The image is then reconstructed from the modified top level and the other levels.
4. Variations on the above include:
   d. protecting edge information by forming an edge estimate based on the top pyramid level. This might be achieved by filtering/thresholding operations. The edge estimate is applied such that the denoise weightings are inhibited in regions of strong edge information.
   e. denoising can be amplified by scaling further pyramid levels, or some combination of levels. This can be useful for situations were the noise is more structured/correlated with the sample.

Noise Containment:
Several methods for noise containment exist for limiting the amplification of noise incurred by enhancement algorithms. These are typically governed by fixed global parameters, limiting their flexibility.

Using the presently described approach, containment methods can be controlled via compositional information For example, linearisation terms within contrast enhance functions may be controlled via the local materials composition (e.g. thickness and/or alloy). This allows strategic prioritisation of noise containment (which inhibits other effects such as contrast enhance) based on alloy, thickness and local noise estimation metrics. This may also be applied in multiscale enhancement methods Composition-Driven Blending:
Enhanced outputs may be generated as a combination of two or more basis images (e.g., one enhanced image, one non-enhanced image). This is also referred to as blending. Typically, linear blending is employed, with the method relying upon blend coefficients that determine the composite output according to: Output=alpha*A+(1−alpha)*B (0<=alpha<=1), where A, B are the basis images and alpha is the blend coefficient matrix. This can be applied in a multiscale domain, wherein n alpha coefficient matrices are used for n levels. However, non-linear blending could also be implemented.

This approach can be applied for many purposes, including noise containment, where the coefficients are chosen to inhibit the most noise-impacted pixels from impacting the composite image.

The alpha coefficients in the matrix can be derived from local compositional information, e.g. by determining distinct alpha values per pixel, or for larger image regions (e.g. pixel blocks), based on the compositional data defined for those pixels/regions.

Blend Coefficients (e.g. the Alpha Matrices) May be Determined in Various Ways, for Example:
1. Directly from segmentation images, possibly after applying smoothing filters.
2. As under 1 but applying a LUT that modifies the blend values according to a predefined table.
3. From some property of the image itself e.g., image density, local noise, local contrast. This information is typically transformed into suitable coefficients by a LUT.
4. From compositional information (scatter, alloy, thickness), again typically transformed by a LUT
5. Combinations of any of 1-4, where the individual blend coefficients are combined so that blending is weighted by more than one influence. This might be achieved by multiplying the respective blend coefficients, or by applying some other function e.g., a weighted linear combination.

6. By any of the above processes, where a set of blend parameters are derived for modifying a decomposed version of the image e.g., pyramidal transform.

Composition-Weighted Convolution Kernels:

Any otherwise standard convolution kernel (e.g., Gaussian, Laplacian, etc.) can be locally weighted according to local composition information (e.g. with weights determined per pixel or per pixel region). The weighted kernel may then be applied for a variety of materials-sensitive image processing tasks such as edge detection, smoothing etc.

The composition-weighted kernels can be used to modify multi-scale domain images such as Laplacian pyramid coefficients The composition-weighted kernels can be used to create intermediate images that are combined with other intermediate images via linear blending.

Application of Global Filters:

Standard global filters such as unsharp mask filters can be weighted by compositional information that selectively inhibits (or amplifies) the action of the filter depending on the local or macro conditions (e.g. local compositional information) and the required balance of edge enhancement vs artefacts. As a further example, configuration of filters could be altered or different filters could be selected for application at an image location based on compositional information at that location.

Contrast Enhancement:

Existing contrast enhancement methods are typically controlled via fixed non-linear functions and LUTs Referring to the blending method described earlier, contrast enhance can be regulated with great precision by blend coefficients The alpha coefficient matrices are conventionally defined via fixed blend LUTs. The LUT operation governs on a pixel by pixel basis how much of a modified image is combined into a reference image. In the multi-spectral case, each decomposed image that forms the pyramidal image set may be allocated different LUTs that govern blending. Using the present approach, LUTs may be derived from some combination of compositional information. For example, a composite output that emphasises bone related enhancement can be generated from some function $g(t, \mu)$ where t is thickness and $\mu$ is alloy composition as previously described This can be further enhanced by including segmentation information e.g., for demarking chest air cavity regions in chest images From this, composition driven contrast and structure boost can be controlled by blending with appropriate coefficients in the mid frequency multiscale levels, combined with noise containment in the higher multiscale levels.

In one example, blend coefficients for a (multi-scale) contrast enhancement operations may be based on a global transform applied to a composition-enhanced image (e.g. S–I or SPR) in order to derive weightings that influence the blend coefficients. Scaling is performed since blend coefficients are normally restricted to the range [0 1]. Hence, a simple form of scaling is normalisation to this range. Alternatively, the process may scale and offset to a more limited range (to strategically limit the influence of S–I or SPR in blending). A soft clipping LUT can be added to inhibit outlier values. A concrete example is:

$\alpha_{sc} = g \cdot \{LUT[norm(S-I)] - O\}$ where $\alpha_{sc}$ is the blend factor derived from (S–I), g is a scale factor, LUT is the soft-clip operation, norm is the normalisation operation and O an offset. Other operations can be used such as spatial filtering (this is done for the noise estimate in order to smooth the noise estimate).

As a further example, the noise estimate, say an (itself transformed in a similar way), and $\alpha_{sc}$ from the above can be combined in different ways:

1) directly by multiplying them and applying as a single blend operation
2) weighted by another linear combination such as $\alpha = \beta \alpha_n + (1-\beta)\alpha_{sc}$, where $\beta$ is set according to body region or some other measure of image quality. A single blend operation is then applied using a.
3) as two separate blend operations involving different inputs. In one example, $\alpha_n$ is used to blend a sharpened (noisy) and non-sharpened output to balance enhancement and noise, while $\alpha_{sc}$ is applied to a blending of contrast enhanced vs non-enhanced images, where the enhanced image is inhibited according to the amount of scatter removal performed.

Example Enhancement Processes Based on Scatter-to-Primary (SPR) Image

Figure 13:
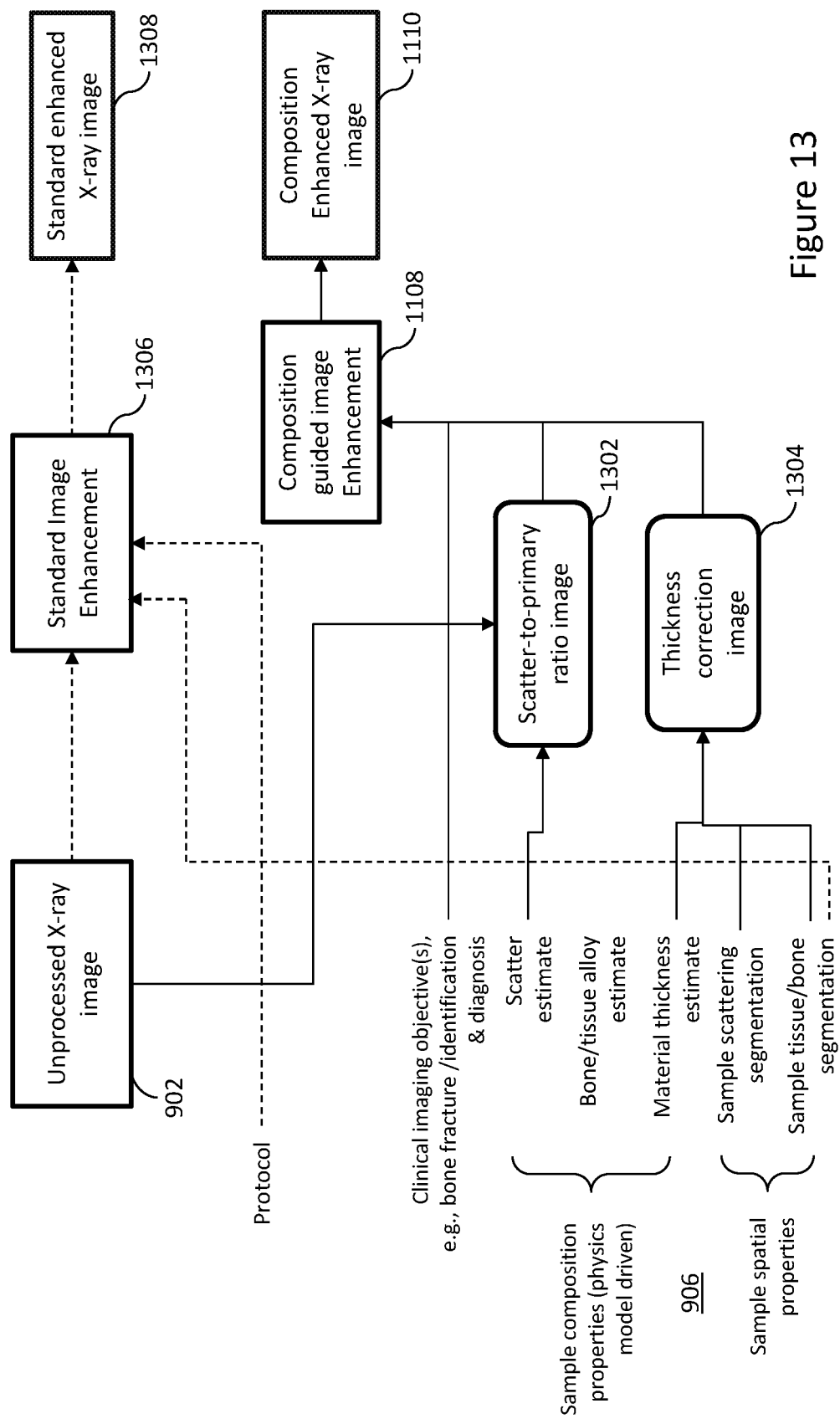
FIG. 13 illustrates a further example of an image enhancement process.

FIG. 13 illustrates an example of a composition guided image enhancement process, following the general pipeline approach outlined above. This example involves generation of a scatter-to-primary ratio (SPR) image 1302 and a thickness correction image 1304 using composition information 906 (including the original scatter estimate). A standard image enhancement process 1306 producing a standard enhanced x-ray image 1308 is also shown (that processing is shown with dashed lines whereas composition-guided processing is shown using solid lines). In some embodiments, this may be performed in addition to the composition based enhancements, and the resulting standard x-ray image 1308 and composition enhanced x-ray image 1110 may be used in further processing, for example by generating a final output image as a blended combination of those two enhanced images, as described in more detail later.

Figure 14A:
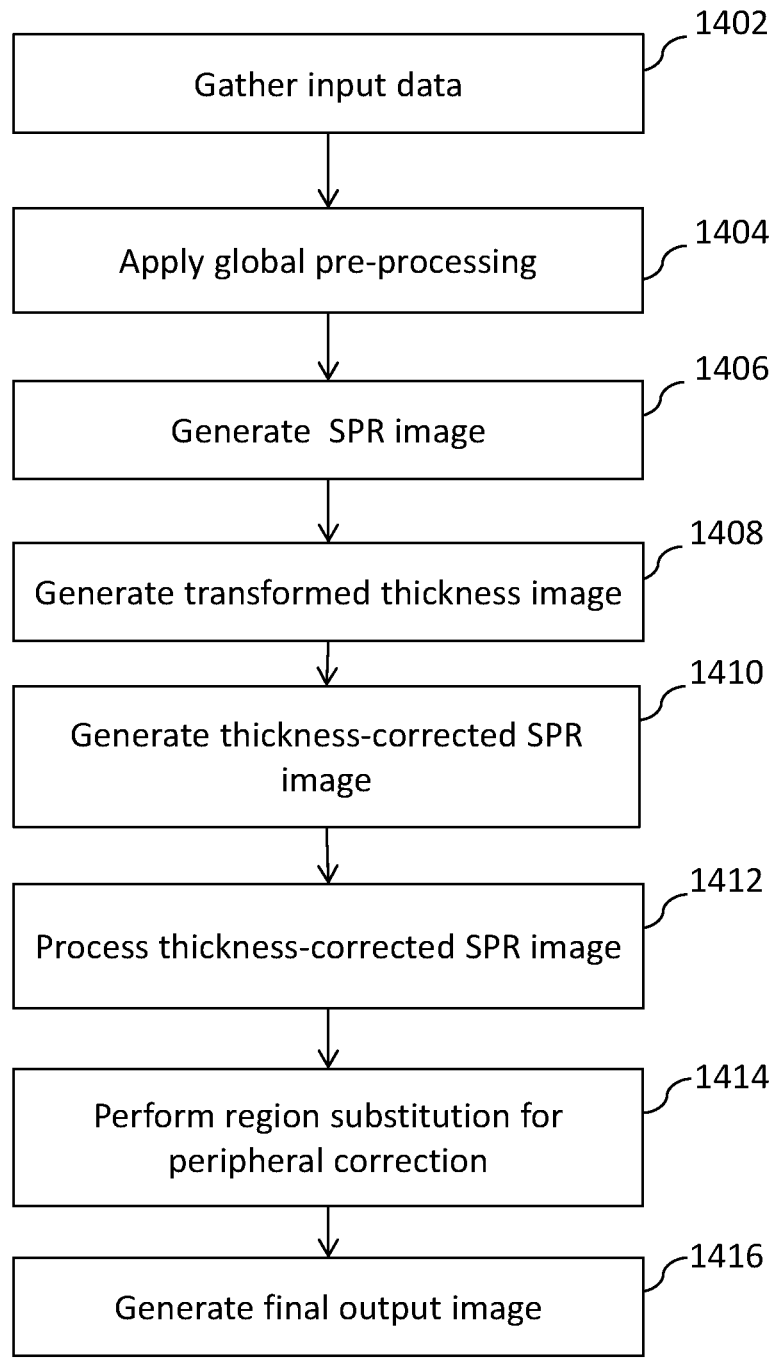
FIG. 14A illustrates an image enhancement process based on a scatter-to-primary ratio image.

FIG. 14A illustrates an SPR-based enhancement process in greater detail.

In step 1402, the required input data is obtained. This includes:

a) The source image I, e.g. as a RAW image file. It is assumed that this image has been pre-corrected via standard dark field and I0 gain correction (bright field or open beam gain correction—I0 refers to an open beam x-ray image that is taken before the sample is placed between detector and source and is used to remove fixed, system dependent global intensity variations relating to the source and detector)

b) The scatter estimate image, S, assumed to have been generated by some digital scatter estimate method, such as the method described above c) A sample thickness image, t, that contains estimates of the total sample cross-section thickness at different image locations (e.g. at individual pixel locations). Alternatively, this could be an estimate of equivalent bone or tissue thickness. The thickness image may be the thickness image output by the previously described scatter correction process.

d) Segmentation images that indicate regions in the image that correspond to collimator, bone, tissue and open beam pixels (e.g. a separate binary mask may be defined for each region type or alternatively a combined representation could be used).

e) Post processing settings that control the general behaviour of the processing pipeline (e.g., LUT bias settings and contrast enhance parameters)

In step 1404, global pre-processing steps are performed to format the image, such as crop/rotation/mirroring operations. These are applied consistently for all inputs.

In step 1406, a raw SPR composition-derived image is generated using the following process:
- a) SPR=S/(I−S), where '/' is a pixelwise divide operation. Note I−S is the scatter corrected input image, and this may have previously been computed by the scatter correction algorithm described above, if this is being used.
- b) Any offsets and/or pixel corrections are applied
- c) A non-linear LUT is applied that soft-limits SPR values beyond a given range.

The process of "soft-limiting" refers to the general s-curve shape of many LUTs that are used in image processing. In this case, the SPR image can have "spikes" in the regions of higher SPR since those regions are more error sensitive. The typical range of SPR for a given body region is generally known and so it would be possible to "hard-limit" or clip values that exceed the maximum typical SPR. However, from the image processing perspective this can introduce spatial discontinuities in the SPR image that can appear artificial. Soft-clipping uses a smooth roll-off in the LUT to apply the clipping in a more gradual way.

The resulting SPR image is a raw representation of scattering properties of the sample over local regions.

In stem 1408, a transformed thickness image, $t_{cor}$, is generated as follows:

$$t_{Mod} = f_{tLUT}(t),$$

where $f_{tLUT}(\ )$ is a transform that modifies the range and/or scaling of t pixel values. An example is non-linear LUT defined according to an exponential thickness/absorption intensity model. The resulting thickness image $t_{Mod}$ is suitable for performing thickness correction of the SPR image.

In step 1410, a corrected version of the SPR image, $SPR_{TC}$, is generated via thickness correction:

$$SPR_{TC} = \text{mean}(t_{Mod}) * SPR / t_{Mod},$$

where '/' and '*' are pixelwise divide and multiply operations respectively and mean( ) is the arithmetic mean operator This process equalises the larger scale contrast shifts occurring in the SPR image that are typically caused by tissue thickness variation. It also enhances contrast uniformity of thick bone regions.

In step 1412, $SPR_{TC\_PP}$, a non-linear processed version of $SPR_{TC}$ is generated as follows:
- a) Global bias/gain LUT's are applied to $SPR_{TC}$, (examples of standard bias/gain functions that may be used can be found in Schlick, Christophe. "Fast alternatives to Perlin's bias and gain functions." Graphics Gems IV 4 (1994): 401-403). This rearranges the histogram of lower SPR values so that they are more evenly distributed
- b) A multiscale contrast enhancement operation is applied. This applies multiple contrast amplification LUTs to different scales of the image, boosting feature visibility (examples of the generic technique can be found in Burt, P. and Adelson, E., 1983, "The Laplacian pyramid as a compact image code", IEEE Transactions on communications", 31(4), pp. 532-540 and Stahl, M., Aach, T., Buzug, T. M., Dippel, S. and Neitzel, U., 1999, "Noise-resistant weak-structure enhancement for digital radiography", Medical Imaging 1999: Image Processing, 3661, pp. 1406-1417).
- c) A non-linear, piecewise LUT is applied that compresses lower/upper range values and applies a linear gradient to other pixels. This algorithm is driven by estimated bone/tissue/open beam pixel populations generated from the segmentation images. It can be configured to subtly boost bone/tissue gradations (i.e., their local contrast) and to soft-limit harsh contrast edges. In addition to (or instead of) pixel segmentation information (e.g. bone, soft tissue), composition (alloy/thickness) data can also be used to weight bone/tissue populations.

The resulting processed SPR image $SPR_{TC\_PP}$ exhibits similar grayscale gradations as a standard clinical image but possesses local contrast enhancements that are based on sample composition. An example is visibility of cortical bone features, whose visibility is more consistent than that of a standard post processed clinical image.

In step 1414 a region substitution operation is performed.

Certain regions of $SPR_{TC\_PP}$ may be susceptible to display processing artefacts e.g., at the skin line to open beam interface. The "skin line" is defined as the outer edge of the subject being imaged, which may be detected using the segmentation, i.e. as the boundary between open beam and other pixels, where the other pixels are defined as the logical union of bone and tissue pixels or, equivalently, the non-open beam pixels (excluding collimator pixels). For some situations pixels near this boundary may need to be treated differently when performing image processing, for example, performing a contrast flattening to avoid making the skin line invisible after image enhancement. This is also referred to as peripheral correction.

The substitution involves substituting some pixels in $SPR_{TC\_PP}$ with pixels from the original SPR image or pixels from a version of the SPR that has had some but not all of the above processing applied (to reduce processing artefacts), for example a version without the thickness correction applied. Region substitution may, for example, involve the following steps:
- a) Step 1412 is repeated, but with SPR as input to generate $SPR_{PP}$, the processed version of SPR without the thickness correction applied
- b) The open beam skin line is restored to open beam interface pixels by substituting pixels from $SPR_{PP}$ into $SPR_{TC\_PP}$. This is typically performed along the entire skin line and may also involve a local interpolation process that alters the local gradient at skin line boundaries, making them easier to identify within the final enhanced and contrast windowed image.

In step 1416, the final output image $SPR_{CGPP}$ is generated. This may be simply $SPR_{TC\_PP}$ saved in a suitable image format. Alternatively, a more refined version may be generated, for example, using an alpha blending process, as some linear combination of SPR (the original SPR image) and $SPR_{TC\_PP}$:

$$SPR_{CGPP} = \alpha(S,t) * SPR + (1 - \alpha(S,t)) * SPR\text{-}TC\_PP, \quad (0 \leq \alpha \leq 1)$$

where '*' is a pixelwise multiply operation and $\alpha(S,t)$ is an array of blend coefficients derived from some function of sample compositional scatter and thickness such that the amount of $SPR_{TC\_PP}$ is locally regulated.

Further blending is possible by e.g., combining a weighted amount of $SPR_{PP}$ into the final image. More generally, any combination of the SPR image and its derived intermediate or final processed versions may be used as inputs to generate a final blended version.

The resulting $SPR_{CGPP}$ consists of a similar grayscale depiction of the sample as a standard post processed image, but can provide higher local contrast around scattering regions and automatic correction of tissue/bone visibility in peripheral and variable thickness regions.

Note that while a specific sequence of processing steps has been described by way of example, individual parts of the process could be omitted or changed as needed. For example, pre-processing step 1404 may not be needed or different pre-processing operations may be performed. One or more other ones of the sub-processes could similarly be omitted, such as thickness correction (steps 1408-1410), additional processing 1412, region substitution 1414 or alpha-blending in step 1416. Furthermore, the order of operations may be varied. Instead of a purely sequential implementation, parallelisation could be employed (e.g. by operating on regions of the image in parallel).

In the above process, composition information affects the image enhancement in a number of different ways:
Indirectly, via the scatter image S that is used to compute SPR (which depends on the composition of the subject, and, where the described scatter correction method is used, depends more specifically on the t, μ tissue model used for determining the scatter estimate S).
Directly, by using thickness data t to correct the SPR
By determining the alpha values (from scatter or thickness) for the final blend operation In this example, the alloy image μ produced by the scatter correction is not used, but this data could be used in alternative implementations. For example, the μ image could be included as a component for the alpha parameter calculation in the alpha-blending operation. Alloy data could also be useful for example, if replacing the SPR image with a bone or tissue equivalent thickness image that is enhanced in a broadly similar fashion to the SPR.

More generally, composition information in the form of thickness data t, alloy data μ and/or the scatter estimate S can be used to control any stage of the image processing pipeline.

Example of a General, Configurable Processing Pipeline

Figure 14B:
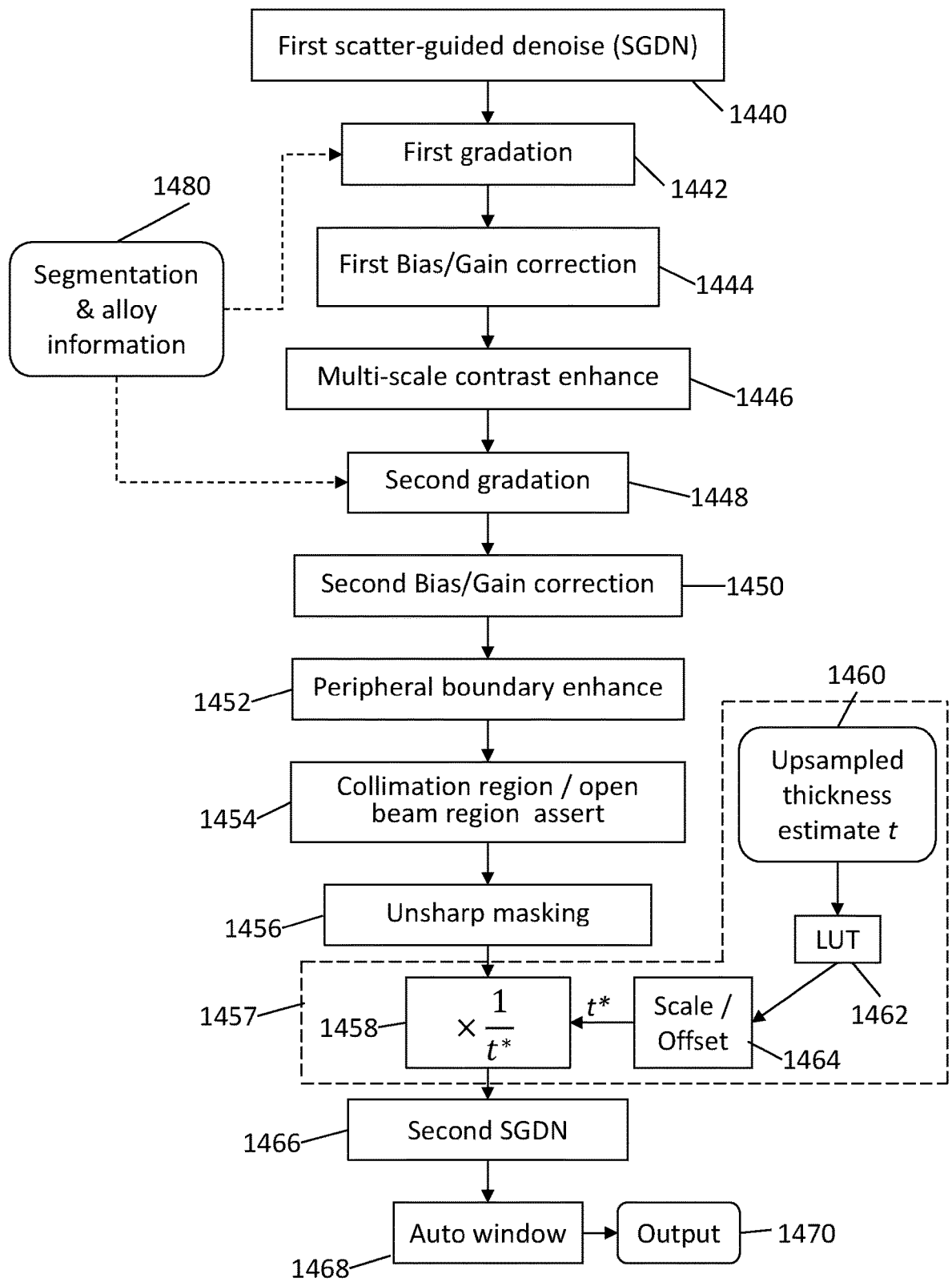
FIG. 14B illustrates a configurable enhancement pipeline for enhancement employing thickness correction.

FIG. 14B illustrates an example of a generalised processing pipeline suitable for implementation of a variety of enhancement processes. In an embodiment, the system allows the generalised pipeline to be configured to implement different enhancements. This may involve configuring which of the available operations are used, as well as configuration of the individual operations, which may be applied differently depending on the image type. In some cases, the order of operations may also be configurable.

The generalized pipeline is described below with regard to how it may be applied to implement two specific processes, including an enhanced scatter correction process (referred to as the SC process below), and a modified version of the SPR-based process of FIG. 14A (referred to as the SPR process below). Compared to the FIG. 14A process, the pipeline as shown in FIG. 14B includes additional substeps, including various pre-processing steps prior to the thickness correction step 1457. The various depicted enhancement steps may be implemented using the previously described techniques.

In the case of the SC process, the input to the pipeline is a scatter corrected intensity image, for example computed as $SC=I-f(S)$, where I is the raw intensity image (typically after standard gain & dark correction). In the case of the SPR process, the input is a scatter-to-primary ratio (SPR) compositional image, e.g. computed as $$SPR = \frac{f(S)}{I - f(S)}.$$

In both cases $f(S)$ is the scatter estimate, S, weighted according to a weighting function, $f$. If no weighting is required then S can be substituted for $f(S)$.

The processing pipeline starts with a scatter-guided denoise, SGDN, operation 1440. This is followed by various pre-processing steps, including:
a first gradation 1442 (in the SC process this can be controlled by scatter correction parameters to implement soft-clipping; in the SPR process this may be controlled by SPR parameters to recover clinical contrast)
a first bias/gain correction 1444 (to optimise contrast before enhancement),
a multi-scale contrast enhancement operation 1446— based on local blend coefficients (these may be derived e.g. based on a noise estimate and/or scaled versions of the SC or SPR images as described in the section on contrast enhancement),
a second gradation 1448—this may be optional in the SC process and may be used to soft-clip peak local contrast to preserve clinical interpretation in the SPR process
a second bias/gain correction 1450, e.g. to refine global contrast in the SC process (may be optional in the SPR process).

Note that in this example the gradation operations 1442 and 1448 are both controlled by composition information 1480 (specifically segmentation and alloy information, though thickness information could additionally be used).

The above steps are followed by a peripheral boundary enhancement operation, which corresponds to the region substitution operation 1414 of FIG. 14A, but note that in this implementation, the boundary enhancement precedes the thickness correction step 1457. In both the SC and SPR process the boundary enhancement can serve e.g. to enhance the skin line relative to SC/SPR contrast.

In step 1454, pixels in the collimator/open beam regions are strategically replaced with values derived from other intermediate images. This might be direct substitution or using some transformed version of the pixel values. This step serves to fix the background relative to the SC/SPR bone/soft tissue contrast. The relative importance of steps 1452 and 1454 can vary depending on application. For example boundary enhancement can be particularly important in mammography images but less so for other x-ray images.

An unsharp masking operation 1456 (using known techniques) may additionally be performed, based on local blend coefficients e.g. based on a noise estimate.

The composition-guided thickness correction is then applied in subprocess 1457, which corresponds to steps 1408-1410 of FIG. 14A and may be implemented as described above. Here, the correction is shown more specifically as involving a pixelwise-division of the image as processed so far by a modified thickness image t* (step 1458), derived from the original upsampled thickness estimate t (1460) via a LUT operation 1462 and a scaling/offsetting operation 1464. The LUT and scaling/offsetting may be determined according to the type of image (SC/SPR) being processed.

After thickness correction, post-processing steps include a second scatter-guided denoise operation 1466 and an auto-windowing operation 1468, yielding the output image 1470. Windowing refers to how the viewing grayscale LUT is scaled to render the final output image in the software viewer (typically a PACS viewing tool) and may be implemented using known windowing techniques.

The output image is an enhanced scatter-corrected image (with thickness correction) in the case of the SC process, and an enhanced SPR image (with thickness correction) in the case of the SPR process. However, the generalised pipeline may be adapted to implement enhancements other than the SC and SPR processes described, and those processes are provided merely by way of example. Individual enhancement operations may be omitted and/or the order of operations may be changed as needed.

In the above examples, the thickness correction (which can be considered similar in some respects to a gain correction) applies a pixelwise (global) scaling of the image that flattens global variations in the image that do not relate to the sample. In gain correction, this is done to remove slowly varying gradients in the image that arise from variations in the source illumination and detector intensity-absorption response. With thickness correction, the aim is to remove global variations, but these variations relate directly to sample thickness. This has the effect of returning an image that appears as if those variations did not exist, or had been reduced by some amount. Thickness may refer to bone equivalent thickness or tissue equivalent thickness as discussed elsewhere, but in typical embodiments combined (overall) thickness is used (i.e. thickness t as referenced elsewhere herein).

The thickness correction can serve to harmonise local and global contrast. Since the output display is (normally) set to map output density (grayscale level) on a linear scale, it is often difficult to reproduce local contrast across the complete range of global thickness. If instead a log scale representation of intensity were used this could cause problems in interpreting the linearity of local contrast. Thickness correction attempts to address this problem by "offsetting" the local contrast variations to an equal (or less variable) background offset so that local features are more easily viewed on a medical screen without losing linearity.

Enhancement Processing to Emphasise Particular Materials

While in the above examples, the enhanced image is generated from the original image utilising composition information (e.g. via the SPR image as in the FIG. 14 example), as an alternative approach a composition-derived image can be generated directly from the composition information, e.g. from the thickness/alloy data. Such a technique is described in the following section.

In this specific example, processing is applied to provide a bone-enhanced image, where regions of the image representative of bone are emphasised and/or displayed with improved contrast, whilst areas without bone are moved to a different intensity scale to allow them to be de-emphasised or suppressed. The enhancement process uses the scatter-corrected image and tissue model (y and t images) produced by the scatter correction process as the starting point for performing materials-based image enhancement.

Specifically, with reference to FIG. 7A, the following description assumes that the $\mu$ (alloy fraction) and t (thickness) images of output dataset 710 (obtained after the last iteration of the main scatter correction loop 204) are used as input to the enhancement process (rather than the upsampled final output 712, 714 of FIG. 7B). These alloy and thickness images are at the lower resolution at which the scatter correction loop operates. Furthermore, the final scatter-corrected image 718 (at full resolution) is used as input to the enhancement process.

Figure 15:
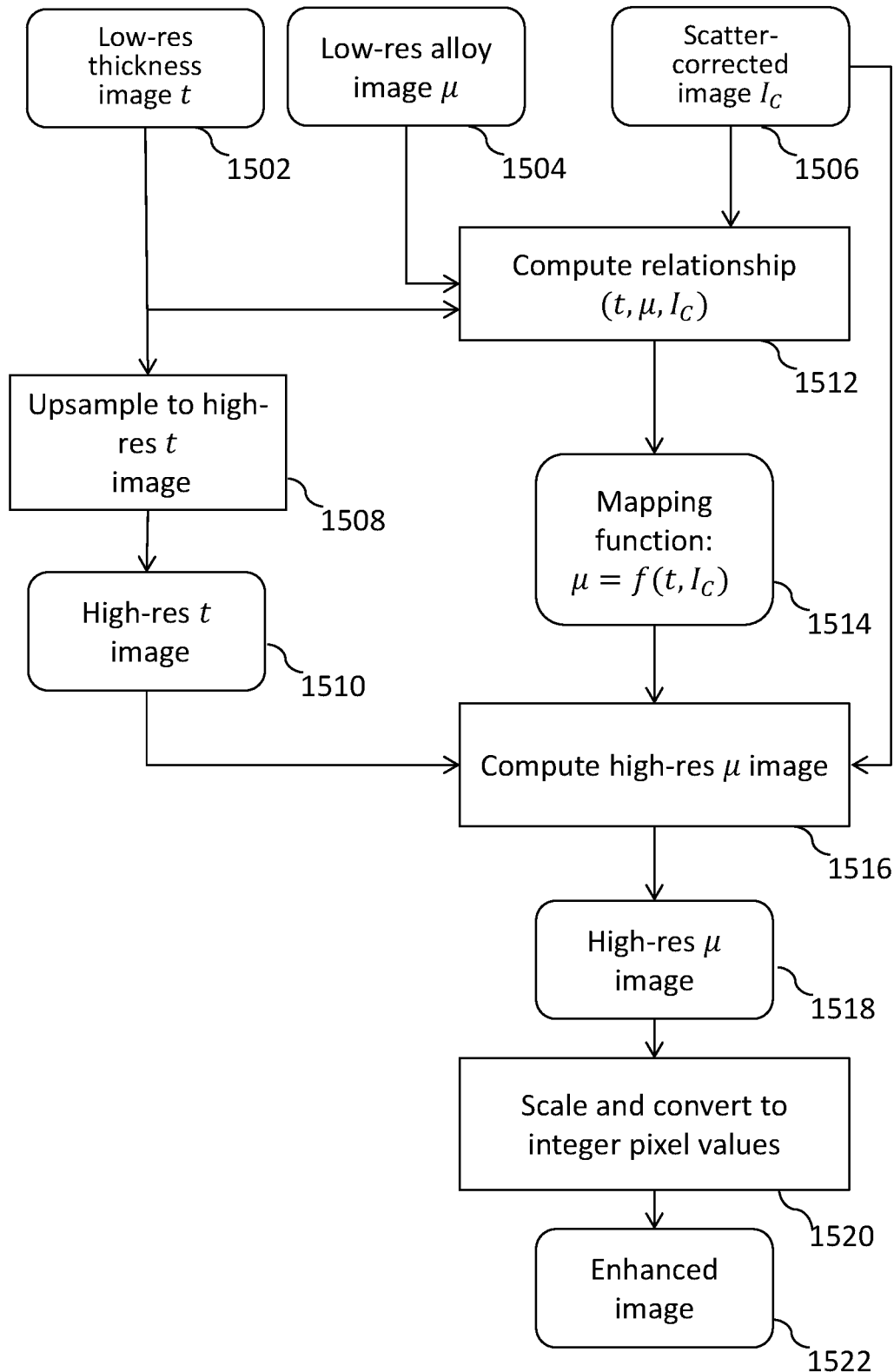
FIG. 15 illustrates an alternative image enhancement process for enhancing the image output by the scatter-correction algorithm.

The enhancement process is illustrated in FIG. 15.

The process begins with the low-resolution thickness image 1502 and alloy image 1504, as computed by the scatter correction process. The thickness image and alloy image are two-dimensional arrays comprising thickness or respectively material alloy values at respective locations of the x-ray image, but at a lower resolution than the x-ray image. Thus, each thickness value of the thickness image 1502, and each material alloy value in the alloy image 1504, may in practice correspond to a group of pixels of the x-ray image.

The low resolution thickness image 1502, low resolution alloy image 1504 and high-resolution scatter corrected image $I_C$ 1506 are provided as input to a relationship determination step 1512. $I_c$ is a monochrome image, with each pixel value of $I_C$ specifying an intensity value for the pixel.

Each pixel of the scatter-corrected image can thus be defined by a tuple $(t, \mu, I_C)$ of thickness, alloy and intensity values. The algorithm is based on the modelling assumption that any two of those three values uniquely determine the third value for a given pixel, since in the absence of scatter, the x-ray intensity recorded by a given detector pixel is directly related to the composition and thickness of the part of the object through which the detected x-ray photons pass (in practice, this is therefore an approximation, given e.g. the presence of residual scatter, other noise, and limitations in the model). Based on this assumption, the algorithm uses the tissue model derived by the scatter correction algorithm to produce new I values that produce an improved scatter-corrected image.

However, due to the limitations of the scatter correction algorithm, the t and $\mu$ values are available at lower resolution than the desired final image resolution (lower resolution is used for the model to reduce computational complexity). While in one approach, the t and $\mu$ values could simply be upsampled using conventional techniques, the alloy fraction information $\mu$ is generally high-frequency information, since material composition can change quickly, even abruptly across an imaged object, for example at boundaries between tissue types (e.g. bone and soft tissue). As a result, if conventional interpolation techniques are used to upsample the alloy information to the image resolution, inaccuracies and image artefacts can arise at tissue boundaries.

On the other hand, thickness of a biological sample generally varies only gradually over an image (and thus the thickness data is essentially low frequency). The low resolution t model output by the scatter correction algorithm thus provides a good approximation for a high resolution t model and conventional interpolation techniques such as nearest neighbour interpolation or more complex interpolation filters can be used in this case to generate a high-resolution thickness image, at the resolution of the x-ray image 1506.

Thus, in step 1508, the described process upscales the low-resolution thickness image 1502 to a corresponding high-resolution thickness image 1510, at the resolution of scatter-corrected image 1506, using conventional interpolation techniques.

However, a different approach is used to generate a high resolution $\mu$ image. In step 1512, a relationship is computed between thickness values t, material values $\mu$ and intensity values of the scatter-corrected image $I_C$. In a preferred embodiment, this involves deriving a 3D surface relating t, $\mu$, and $I_C$ values, in order to define a precise mathematical relationship. Specifically, the process involves fitting a three-dimensional surface to the available set of data points constituted by the $(t, \mu, I_C)$ tuples at each pixel. Since t and μ are at a lower resolution than $I_C$, $I_C$ may be subsampled to obtain values for the (t, μ, $I_C$) tuples (e.g. by computing an average value of multiple pixels of $I_C$ corresponding to a single (t, μ) data point of the tissue model. Alternatively, the lower resolution intermediate scatter corrected output (see output 710, scatter corrected image "S" in FIG. 7A/7B) produced by the scatter correction algorithm on the last iteration could be used (which is already at the resolution of the tissue model).

The surface is found via maximum likelihood estimation using optimisation techniques. Least squares regression is used to provide an initial guess. A variety of optimisation/regression techniques suitable for finding the surface are available to the skilled person. One particular approach that may be employed will be described later. The resulting model comprises a set of coefficients for the polynomial surface that best fits the available data points.

The resulting surface is expressed as a function of thickness t, and intensity values $I_C$ using the derived coefficients:

$$\mu = f(t, I_C)$$

Figure 16:
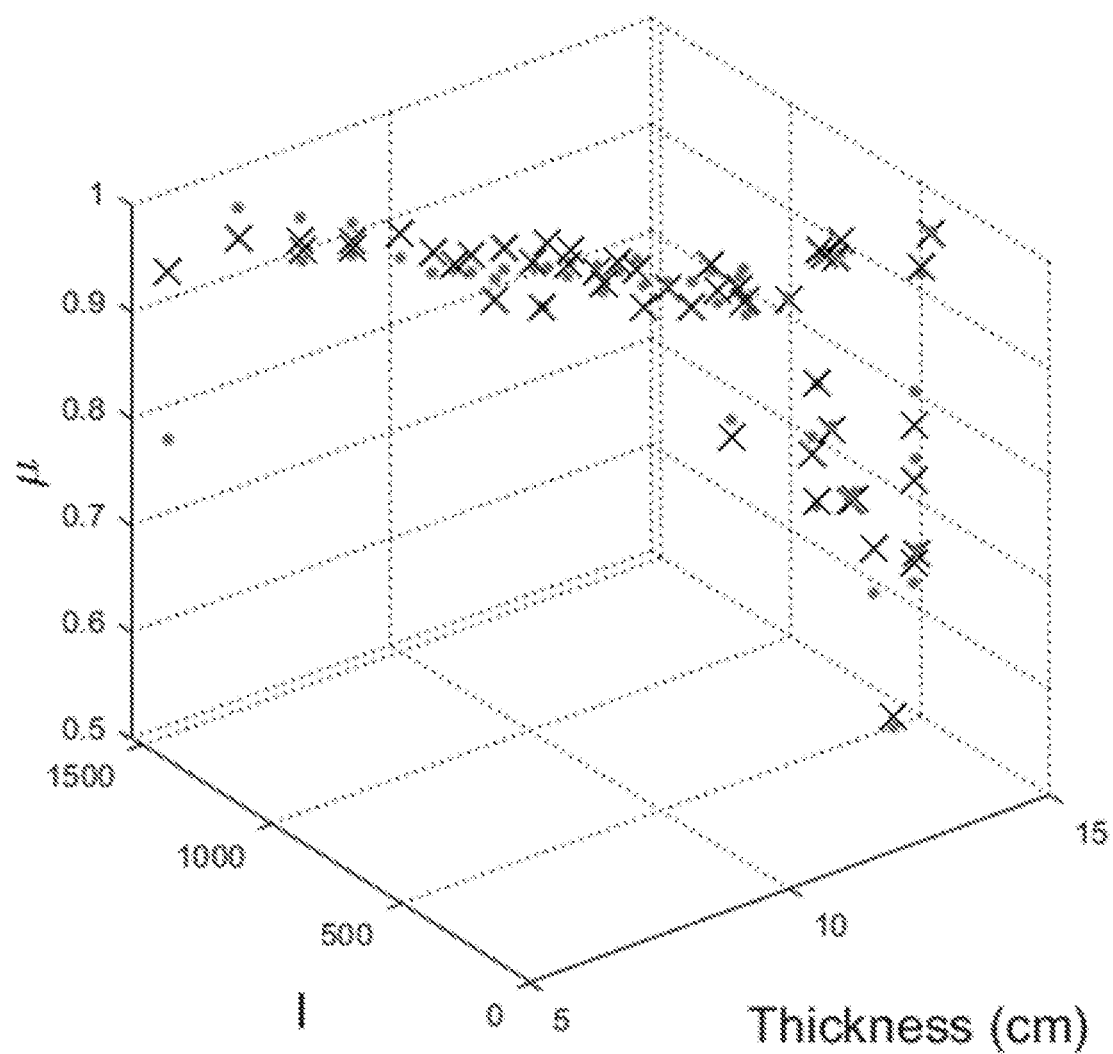
FIG. 16 illustrates a mapping between pixel intensity values, thickness values, and material composition (alloy) values.

This mapping function 1514, as defined by the derived surface coefficients, maps a pair of particular thickness (t) and image intensity values (I) to a corresponding alloy value (μ). An illustrative example of such a mapping is illustrated in FIG. 16 (note this includes a significantly reduced number of data points for the sake of clarity of illustration).

The mapping function is then used in step 1516 to compute high-resolution μ values for each pixel of the scatter-corrected image, at the full desired image resolution for the output image (which is typically the same as the resolution of $I_C$). The computation is performed by providing the upsampled t values 1510 computed in step 1508 and the full resolution intensity values $I_C$ of the scatter corrected image 1506 as inputs to the derived mapping function 1514, for each image pixel at the target resolution, yielding a new μ value for each pixel. The result is a high-resolution μ image 1518, which is used as a basis for generating an enhanced scatter-corrected image.

The described approach is based on assuming a unique relationship between (t, μ, $I_C$) values, so that μ values can be computed from the corresponding (t, $I_C$) values. The presence of scatter in the image (essentially noise in the $I_C$ values) weakens that assumption. As a result, the described approach is more effective when there is no or limited scatter present. However, conveniently, the scatter correction process previously described produces both the (t, μ) tissue model and a scatter-corrected image, allowing the technique to be applied effectively.

A variety of approaches could be adopted to generate the final enhanced image from the scatter-corrected image and from the high-resolution μ image 1518 and t image 1510 computed in steps 1516 and 1508. Two example approaches are described below.

In a first approach, the μ values are converted directly into intensity values for the final image. Specifically, in step 1520 the high-resolution μ values 1518 (which are typically represented as floating point values) are translated to new I values for the enhanced image 1522 by way of a scaling operation and conversion to integer intensity values.

Figure 17:
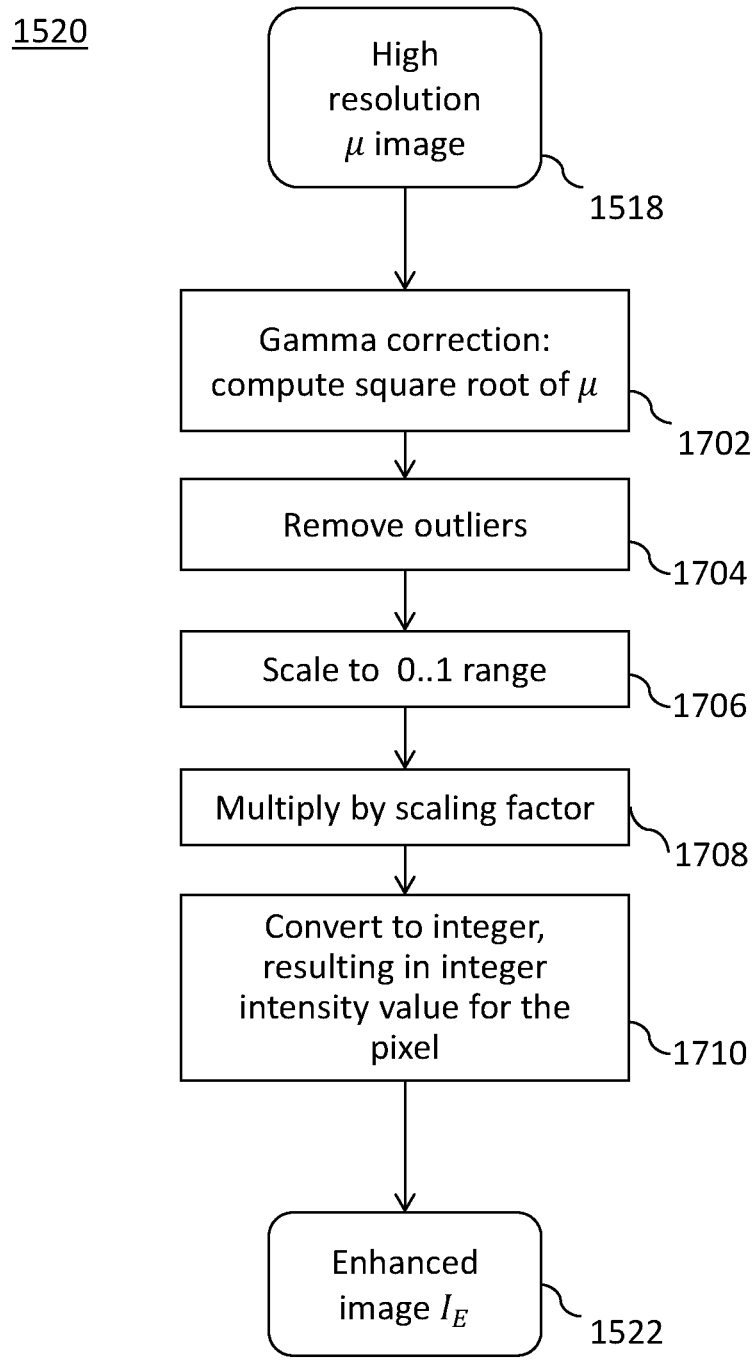
FIG. 17 illustrates a process for converting material composition data to image pixel data for an enhanced image.

An example process is illustrated in further detail in FIG. 17. This uses the high resolution μ image 1518 computed by the FIG. 15 process as input. The depicted steps 1702-1710 are performed for each pixel (this could be done iteratively, or parallel processing could be employed).

The aim of the enhancement is to emphasise bone over soft tissue to produce an image indicative of bone content or bone thickness. Recall that μ in the tissue model is a real number indicating soft tissue percentage, with μ=0 corresponding to 100% bone, μ=0.5 corresponding to 50% bone and 50% soft tissue, and μ=1 indicating 100% soft tissue Therefore, in this approach the μ values are directly converted to image intensity values for the final output image.

For each pixel, in step 1702, a non-linear transformation is applied to the μ value for that pixel. This is essentially a gamma correction, although the input values are μ values in the range of 0 . . . 1 (indicating an alloy fraction, specifically a soft tissue fraction) rather than image intensity values. In a particular embodiment, the transformation involves computing the square root of μ.

In step 1704, outliers are removed. In an example, a given percentile (e.g. the 99.9th percentile) of intensity values in the image histogram after gamma correction are selected and retained with the remaining outlier values removed. This may involve, for example, applying clipping to the values, e.g. by setting any intensity value in the histogram exceeding some threshold to the maximum of the retained range (and/or setting intensity values below a threshold to the minimum of the retained range). The resulting values for each pixel are then scaled back to the 0 . . . 1 range in step 1706. In step 1708, in order to convert the values into image intensity values, the values are then multiplied by a scaling factor depending on the bit resolution of the desired image.

Monochrome images are commonly encoded with two-byte intensity values, allowing for intensity values between 0 and 65535. In one example, a scaling factor of 65535 could therefore be used. However, in a preferred approach a value less then than the maximum intensity value is used. In one example, a scaling factor of 60000 is used. This is close to the full 2-byte value range but leaves some headroom for a user to perform manual contrast enhancements on the final image (specifically, in this example, the scaled values use 60000/65535=92% of the full two-byte range, though a larger or smaller subrange could be chosen).

After the scaling step, the resulting floating point pixel values are converted to a suitable integer format in step 1710, for example 2-byte UINT integer values. The resulting integer values form the intensity values for the pixels of the enhanced output image, $I_E$, 1522.

In this approach, the enhanced scatter-corrected image $I_E$ is thus calculated directly (and only) from the μ values of the tissue model rather than from the original scatter-corrected image, although in practice the new image $I_E$ is indirectly based on original scatter-corrected image $I_C$ since the high-resolution μ image is itself a function of the t image and the original scatter-corrected image $I_C$ (via the mapping function 1514 determined at step 1512).

In a second approach, the final intensity values for the output image 1522 are not derived solely from the high-resolution μ image but instead the thickness model t is also used. Specifically, a bone thickness value $t_B$ is computed (at each pixel) using the high-resolution p image 1518 and the upsampled t image 1510 as follows:

$$t_B = (1-\mu) \times t$$

This gives an estimate for bone thickness at each image location based on the total thickness and bone fraction (1−μ) at that location.

These final values are then translated to image intensity values using steps corresponding to those shown in FIG. 17 (e.g. gamma correction, removing outliers, scaling to a desired intensity range, and converting to integer intensity values).

In a variation of the above approaches, soft tissue could be masked completely by applying a threshold e.g. setting μ=0 for μ<threshold in the μ image 1518 prior to conversion (a threshold could equivalently be applied at a later stage of the process, e.g. after any of steps 1702-1710).

In other approaches, the final image values may be derived from any combination of μ, t and/or $I_C$ using any appropriate computational steps.

The effect of the described enhancements is to emphasise the bone content of the image, with improved contrast in those regions, while predominantly soft tissue regions are deemphasised or substantially suppressed.

Figure 18:
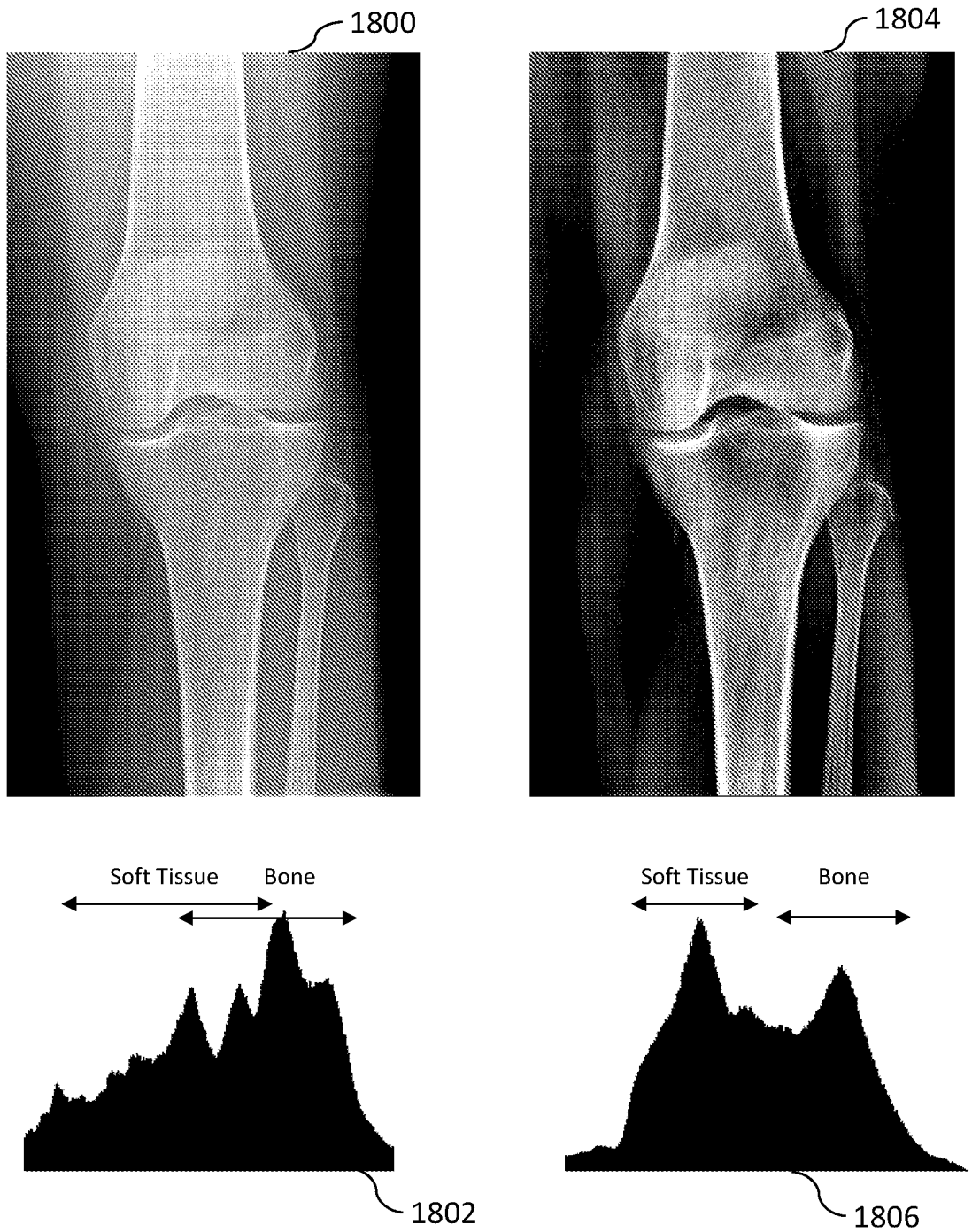
FIG. 18 illustrates sample images and image histograms before and after enhancement processing using disclosed methods.

FIG. 18 illustrates an example of the input and corresponding output of the enhancement process. Left-hand image 1800 is a standard clinical image and its intensity histogram 1802 (number of pixels of a given intensity) is shown below. Right-hand image 1804 is the same image after the described bone enhancement algorithm has been applied, again with the intensity histogram 1806 below. The histograms are labelled with different regions of intensity values contributed by soft tissue and bone respectively.

The histograms illustrate that, prior to enhancement, the bone and soft tissue contributions overlap in the histogram. After enhancement, the bone and soft tissue contributions have been moved into different regions of the intensity space, which is reflected in the improved separation of those features in the images.

Thus, the described approach makes it possible to window out soft tissue by selecting an intensity window for the image which is centred on the bone region of the intensity histogram. This is not possible with the standard image as bone and soft tissue are overlapped in intensity, preventing separate windowing for bone and soft tissue.

The described techniques can be used to enhance other aspects of the x-ray image. For example, display of soft tissue regions could be enhanced instead of bone regions. More generally, the techniques could be applied to enhance any particular material(s) in relation to other material(s) of an object being imaged.

The output of the FIG. 15/FIG. 17 process, or any intermediate processing result, may also be further enhanced using the composition-guided post processing (CGPP) techniques previously described (e.g. with reference to any of FIGS. 9-14B). For example, the output 1518 or 1522, or the output of an intermediate stage such the output of operation 1702 or 1704, may be used as input to any of the described CGPP operations (possibly omitting the remaining steps of FIG. 17), for example by forming an alternative composition-derived image that could be used as a starting point in place of, e.g., the SPR image or scatter-corrected image SC in the processes of FIGS. 14A/14B.

Surface Fitting

The following section describes an approach for implementing the surface fitting sub-process that is used to derive the mapping function.

In this example, a regression technique is used as outlined in F. Cribari-Neto, "Beta Regression in R", Journal of Statistical Software Vol 34 (2010) Issue 2, available online at https://cran.r-project.org/web/packages/betareg/vignettes/betareg.pdf. The approach is as follows:

1. The Beta distribution can be defined as:

$$f(y; \mu, \phi) = \frac{\Gamma(\phi)}{\Gamma(\mu\phi)\Gamma((1-\mu)\phi)} y^{\mu\phi-1}(1-y)^{(1-\mu)\phi-1}, 0 < y < 1,$$

where μ is the mean (note this differs from the use of μ elsewhere in this document to indicate material/alloy fraction, referred to below as "alloy") and φ is a precision parameter.

2. Let $y_1, \ldots, y_n$ be a sample from the above distribution, which in our application would be values of alloy fraction, then the model is defined as:

$$g(\mu_i) = x_i^T \beta = \eta_i,$$

where $x_i$ are the covariates, in this case 1, t, I, t*I, $t^2$, $I^2$ where t is thickness in cm and I is intensity, g( ) is a link function, in this case the "logit" function $$g(\mu) = \log\{p/(1-\mu)\}$$

and β are the unknown regression parameters (note the usage of "Beta" in this case as also being the name of the assumed distribution). Note that various changes could be made to the model, for example $x_i$ could have terms removed or added, e.g. we could include all terms up to and including cubics, or a different link function could be used, e.g. "probit" or "complementary log-log", or a distribution different to the Beta distribution could be used, e.g. the Bernoulli distribution (resulting in performing logistic regression) or a Gaussian distribution (resulting in performing standard least squares regression).

3. The log-likelihood function can then be defined as:

$$l_i(\mu_i, \phi) = \log \Gamma(\mu_i\phi) - \log \Gamma(\mu_i\phi) - \log \Gamma((1-\mu_i)\phi) + (\mu_i\phi-1)\log y_i + ((1-\mu_i)\phi-1)\log(1-y_i).$$

We replace instances of μ with $g^{-1}(x*\beta)$.

4. Parameter estimation is performed by maximising the log-likelihood over β and φ, which is a constant that goes unused. This is done by numerical optimisation. Most optimisers require a starting point so the standard least squares regression on [x, g(y)] is used for this. Both the initial guess and the optimisation uses low resolution data from the output of the scatter removal process as previously described.

5. The surface can be evaluated as $\mu = g^{-1}(x*\beta)$. The detector resolution I image and an upsampled thickness image are used to get a detector resolution alloy image. The bone enhanced image, without any post processing, is returned as (1−alloy)*thickness.

Post-processing may then optionally be applied (e.g. further contrast enhancement).

Other approaches to the regression problem could be used, for example a neural network based solution. As an example, a feed-forward network could be implemented that takes in the intensity and thickness of a pixel as the input layer and uses the logistic function as the activation function in the last layer to return values in the range [0, 1] corresponding to the alloy value. A convolutional neural network could also be used.

Final Image Output

Once generated (using any of the described techniques), the final image can then be stored in a suitable image format, output e.g. to a display or printer, and/or provided to other processing components for further processing. For example, the image could be provided to an image processing application for viewing and post-processing, e.g. to perform manual contrast enhancement as needed. Examples of final post-processing steps include e.g. generating an inverted output image, since images are frequently viewed using an inverted visual grayscale. This means the most absorbing regions (mostly bone) appear as lighter tones rather than darker (and vice versa for tissue). However, images could be inverted earlier in the processing pipeline or even at input, with enhancement operating on inverted images.

Computer System

Figure 19:
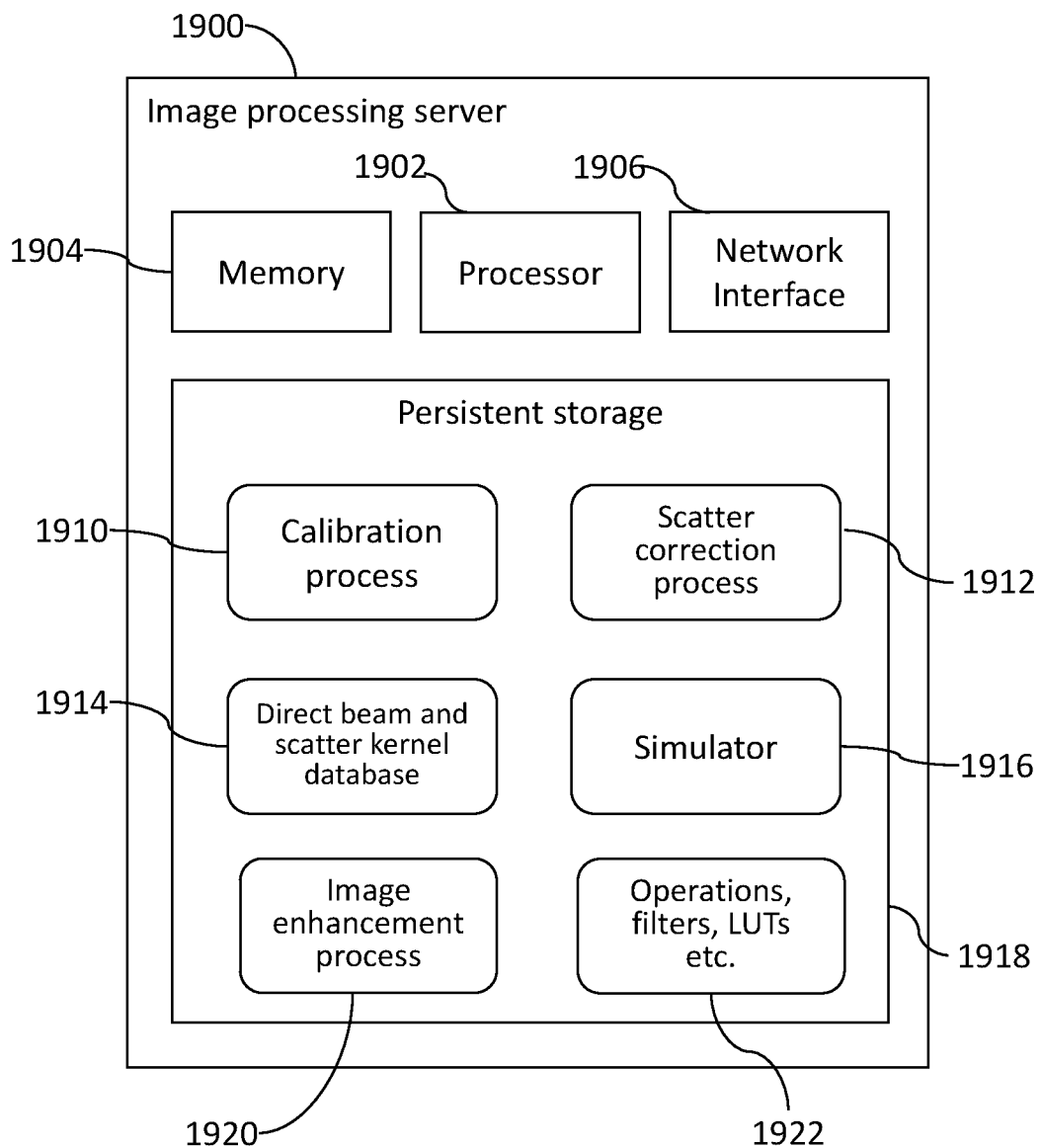
FIG. 19 illustrates a computing device suitable for carrying out described methods.

FIG. 19 illustrates an example computer system, e.g. in the form of an image processing server 1900, that may be used to implement the described algorithms. The server 1900 comprises one or more processor(s) 1902, a volatile memory (RAM) 1904 for storage of software and data during software execution, and a network interface 1906 for communication with other devices (e.g. detector 106, user interface device 114 and external storage 116 as depicted in FIG. 1).

The server further comprises persistent storage 1918 (e.g. in the form of a magnetic storage medium such as a hard disk drive, FLASH memory or the like) for persistently storing software and data, which may include inter alia a calibration software process 1910 for performing the calibration process described above, a scatter correction process 1912 for performing the scatter correction process described above, and a simulator 1916 for simulating X-ray interactions with material samples. The persistent storage may further comprise the direct beam and scatter kernel database 1914 comprising pre-calculated direct beam and scatter kernel data computed by the simulator and used during the scatter correction process 1912 to generate simulated image data for a given tissue model. Additionally the storage includes an image enhancement process 1920 for performing any of the previously described image enhancement functions, e.g. to generate a an SPR-enhanced image, bone-enhanced image, etc. The process 1920 may utilise a library 1922 of stored enhancement operations, image filters, LUTs etc. to implement a variety of enhancement processing pipelines.

The server will typically contain other conventional hardware and/or software components as will be understood by one skilled in the art (e.g. a server operating system, I/O interfaces etc.)

The described techniques provide image post processing methods that can enhance the clinical image presentation in unconventional ways. The approach falls into two broad categories:

Enhancement of images for standard clinical presentation. The resulting image quality can be beyond that normally achievable, for example by achieving superior local contrast to noise ratios or tissue visibility, whilst the visual presentation remains familiar to radiographers. Enhancement of compositional images for standard clinical presentation can lead to improved general image quality, resulting in faster read times and fewer false positive/negative diagnoses.

Enhancement of images for non-conventional clinical presentation. These images can contain intensity values that are influenced by the sample composition that are further enhanced. For example, scatter-corrected intensity; scatter to primary ratio, bone or tissue equivalent thickness. Enhancement of these images can lead to non-conventional clinical images and can enable improved visibility of key anatomical regions and assessment of conditions therein. For example visibility of tissue within the infrapatellar far pad (knee) is generally poor in standard clinical X-ray images and this may be improved using described techniques.

It will be understood that the present invention has been described above purely by way of example, and modification of detail can be made within the scope of the invention.

The invention claimed is:

1. A method of enhancing an x-ray image comprising:
   receiving an input image, wherein the input image is an x-ray image of an object and comprises a plurality of image pixel values;
   receiving a model of the object comprising:
   a thickness data set comprising thickness values specifying respective thicknesses of portions of the object corresponding to respective locations of an image plane of the input image, and
   a composition data set comprising composition values specifying respective material compositions of portions of the object corresponding to respective locations of the image plane, wherein the composition data set is defined at a first resolution;
   deriving, based on image pixel values of the input image, the thickness data set and the composition data set, a mapping which maps an image pixel value and a corresponding thickness value specified for a given location in the image plane to a corresponding composition value for the location;
   using the derived mapping to determine a second composition data set comprising composition values at a second resolution, wherein the second resolution is higher than the first resolution; and
   determining image pixel values for pixels of an output image at the second resolution based on the second composition data set.

2. A method according to claim 1, wherein:
   the thickness data set is also specified at a resolution lower than the second resolution, optionally at the first resolution; and/or
   wherein the input image is at the second resolution.

3. A method according to claim 1, comprising deriving the mapping using the thickness and composition data sets at the first resolution.

4. A method according to claim 1, wherein the step of using the derived mapping comprises applying the mapping to pixel values and thickness values at the second resolution.

5. A method according to claim 1, comprising upscaling the thickness data set to the second resolution.

6. A method according to claim 1, wherein using the mapping comprises generating composition values for a plurality of pixels by applying the mapping to corresponding image pixel values and thickness values.

7. A method according to claim 1, wherein deriving the mapping comprises deriving one or more parameters defining a mathematical relationship between image pixel values, composition values and thickness values.

8. A method according to claim 7, comprising fitting a three-dimensional surface to a set of data tuples, each tuple comprising an image pixel value, a thickness value and a composition value, optionally wherein the one or more parameters comprise coefficients of a polynomial function characterising the surface.

9. A method according to claim 8, wherein each tuple comprises image pixel, thickness and composition values specified for the same location in the image plane, the thickness and composition values taken from the thickness and composition data sets at the first resolution.

10. A method according to claim 1, wherein determining image pixel values using the second composition data set comprises processing values to convert composition values associated with respective locations in the image plane to image pixel values at the corresponding respective locations of the output image.

11. A method according to claim 10, wherein processing values comprises one or more of:
converting values to an integer data type;
performing one or more scaling operations, optionally including one or more of:
a non-linear scaling operation or gamma correction;
a linear scaling operation, optionally to scale the values to a predetermined value range;
removing one or more outliers of the processed values, optionally by setting outlier values to zero;
encoding the output pixel values as intensity values, optionally in accordance with a predetermined image format; and
computing the image pixel values for the output image from the composition values of the second composition data set without further reference to the input image pixel values and/or the thickness values.

12. A method according to claim 10, wherein each composition value represents a proportion of a given material type present in a respective portion of the object, and the converting comprises computing for each of a plurality of the composition values a respective material thickness value indicative of a thickness of material of the given material type in the respective portion, optionally wherein the material thickness values are computed based on the second composition data set at the first resolution and the thickness data set.

13. A method according to claim 1, wherein the image pixel values of the input image and/or output image are intensity values.

14. A method according to claim 1, wherein each thickness value specifies a spatial extent of a portion of the object in a direction substantially orthogonal to the image plane and/or substantially parallel to a beam direction of an x-ray beam used to acquire the input image.

15. A method according to claim 1, wherein each composition value numerically specifies a quantity of a given material type in a given portion of the object, optionally as a relative quantity relative to a total quantity of material in the portion or relative to a quantity of a second material type present in the portion, preferably wherein the composition value specifies a material fraction of the given material type in the portion.

16. A method according to claim 15, wherein the given material type is bone or soft tissue.

17. A method according to claim 16, wherein the step of determining image pixel values for pixels of the output image comprises converting the composition value of the second composition data set to image intensity values wherein:
composition values indicative of a high proportion of bone are converted to higher intensity values than composition values indicative of a low proportion of bone; and/or
composition values lower than a predetermined threshold are converted to a predetermined low intensity value, optionally zero.

18. The method according to claim 1, further comprising storing, outputting and/or displaying the output image.

19. A non-transitory computer-readable medium comprising software code for enhancing an x-ray image, the software code configured, when executed by a data processing apparatus, to perform operations including:
receiving an input image, wherein the input image is an x-ray image of an object and comprises a plurality of image pixel values;
receiving a model of the object comprising:
a thickness data set comprising thickness values specifying respective thicknesses of portions of the object corresponding to respective locations of an image plane of the input image, and
a composition data set comprising composition values specifying respective material compositions of portions of the object corresponding to respective locations of the image plane, wherein the composition data set is defined at a first resolution;
deriving, based on image pixel values of the input image, the thickness data set and the composition data set, a mapping which maps an image pixel value and a corresponding thickness value specified for a given location in the image plane to a corresponding composition value for the location;
using the derived mapping to determine a second composition data set comprising composition values at a second resolution, wherein the second resolution is higher than the first resolution; and
determining image pixel values for pixels of an output image at the second resolution based on the second composition data set.

* * * * *